US012640896B2

(12) United States Patent
He

(10) Patent No.: US 12,640,896 B2
(45) Date of Patent: May 26, 2026

(54) METHOD AND DEVICE FOR DETERMINING FREQUENCY POSITION OF SSB

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Donnguan (CN)

( * ) Notice: Subject to any disclaimer, the term of this patent is extended or adjusted under 35 U.S.C. 154(b) by 304 days.

(21) Appl. No.: 18/454,765

(22) Filed: Aug. 23, 2023

(65) Prior Publication Data

US 2023/0396402 A1     Dec. 7, 2023

Related U.S. Application Data

(63) Continuation of application No. PCT/CN2021/085693, filed on Apr. 6, 2021.

(51) Int. Cl.
H04L 5/00 (2006.01)
H04W 48/08 (2009.01)

(52) U.S. Cl.
CPC ........... H04L 5/0094 (2013.01); H04W 48/08 (2013.01)

(58) Field of Classification Search
None
See application file for complete search history.

(56) References Cited

U.S. PATENT DOCUMENTS

| | | | | |
|---|---|---|---|---|
| 2020/0084739 | A1* | 3/2020 | Si | H04W 72/0453 |
| 2020/0314778 | A1* | 10/2020 | Jung | H04W 16/14 |
| 2022/0232567 | A1* | 7/2022 | Alriksson | H04L 5/0053 |

(Continued)

FOREIGN PATENT DOCUMENTS

| | | |
|---|---|---|
| CN | 110392989 | 10/2019 |
| EP | 3567761 | 11/2019 |

(Continued)

OTHER PUBLICATIONS

Samsung, "Discussion on the synchronization raster for NR from 52.6 GHz to 71," 3GPP TSG RAN WG1 #104-e, R1-2101200, Jan. 2021.

(Continued)

*Primary Examiner* — Hong S Cho
(74) *Attorney, Agent, or Firm* — Hodgson Russ LLP

(57) ABSTRACT

A method for determining a frequency position of a synchronization signal and physical broadcast channel (PBCH) block (SSB) includes the following. A position of a first synchronization raster in a target bandwidth is determined, where the first synchronization raster is used for determining a frequency position of an SSB in the target bandwidth, and the position of the first synchronization raster in the target bandwidth is associated with one or more of following information: a subcarrier spacing of the SSB, a size of the target bandwidth, a size of a reserved bandwidth at a boundary of the target bandwidth, and information of a first channel in the target bandwidth, where a frequency range of (Continued)

the first channel does not overlap with the SSB. The frequency position of the SSB is determined according to the position of the first synchronization raster in the target bandwidth.

20 Claims, 45 Drawing Sheets

(56)                    References Cited

U.S. PATENT DOCUMENTS

| | | | |
|---|---|---|---|
| 2023/0132121 A1 | 4/2023 | He | |
| 2023/0292267 A1 | 9/2023 | He | |
| 2024/0007255 A1* | 1/2024 | Kim | .................. H04W 72/0446 |

FOREIGN PATENT DOCUMENTS

| | | |
|---|---|---|
| EP | 3790333 | 3/2021 |
| WO | 2019048483 | 3/2019 |
| WO | 2019213955 | 11/2019 |
| WO | 2020103161 | 5/2020 |
| WO | 2022021226 | 2/2022 |

OTHER PUBLICATIONS

Mediatek Inc., "Corrections on NR FR1 synchronization raster entries," 3GPP TSG-RAN WG4 AH-1801 Meeting, R4-1800297, Jan. 2018.

Huawei et al., "Detailing the GSCN calculation," 3GPP TSG RAN WG4 Meeting #87, R4-1807420, May 2018.

WIPO, International Search Report and Written Opinion for International Application No. PCT/CN2021/085693, Jan. 5, 2022.

"3rd Generation Partnership Project; Technical Specification Group Radio Access Network; NR; User Equipment (UE) radio transmission and reception; Part 1: Range 1 Standalone (Release 17)," 3GPP TS 38.101-1, Dec. 2020, v17.0.0.

"3rd Generation Partnership Project; Technical Specification Group Radio Access Network; NR; User Equipment (UE) radio transmission and reception; Part 2: Range 2 Standalone (Release 17)," 3GPP TS 38.101-2, Dec. 2020, v17.0.0.

Intel Corporation, "Summary #2 of email discussion on initial access aspect of NR extension up to 71 GHz," 3GPP TSG RAN WG1 Meeting #104-e, R1-2101905, Jan. 2020.

Intel Corporation, "Summary #3 of email discussion on initial access aspect of NR extension up to 71 GHz," 3GPP TSG RAN WG1 Meeting #104-e, R1-2101970, Jan. 2020.

Intel Corporation, "Summary #4 of email discussion on initial access aspect of NR extension up to 71 GHz," 3GPP TSG RAN WG1 Meeting #104-e, R1-2101971, Jan. 2020.

EPO, Extended European Search Report for EP Application No. 21935512.0, Feb. 15, 2024.

Nokia et al., "Remaining issues on Initial Access Signals and Channels for NR-U," 3GPP TSG RAN WG1 Meeting #100e, R1-2000500, Feb. 2020.

EPO, Extended European Search Report for EP Application No. 25196465.6, Dec. 3, 2025.

* cited by examiner

NETWORK
DEVICE

TERMINAL

Figure 2:
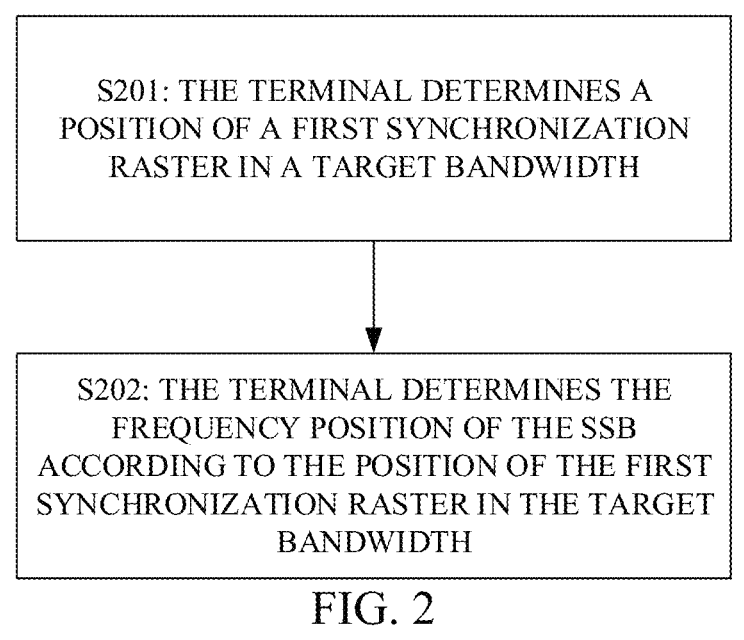

S201: THE TERMINAL DETERMINES A POSITION OF A FIRST SYNCHRONIZATION RASTER IN A TARGET BANDWIDTH

S202: THE TERMINAL DETERMINES THE FREQUENCY POSITION OF THE SSB ACCORDING TO THE POSITION OF THE FIRST SYNCHRONIZATION RASTER IN THE TARGET BANDWIDTH

METHOD AND DEVICE FOR DETERMINING FREQUENCY POSITION OF SSB

CROSS-REFERENCE TO RELATED APPLICATION(S)

This application is a continuation of International Application No. PCT/CN2021/085693, filed Apr. 6, 2021, the entire disclosure of which is incorporated herein by reference.

TECHNICAL FIELD

This disclosure relates to the field of communication technologies, and in particular to a method and device for determining a frequency position of a synchronization signal and physical broadcast channel (PBCH) block (SSB).

BACKGROUND

Positions of synchronization rasters currently defined are mainly designed according to requirements of licensed spectrums. The spacing between the synchronization rasters is 1.2 megahertz (MHz), 1.44 MHz, or 17.28 MHz, which respectively correspond to frequency ranges of 0~3 gigahertz (GHz), 324.25 GHz, and 24.25100 GHz. At present, for a licensed band below 7 GHz, in order to flexibly support various usage of channel bandwidths and licensed spectrums, a large number of synchronization rasters are defined in a new radio (NR) system. For a new radio in unlicensed spectrum (NR-U) system, since channel bandwidths and positions are relatively fixed, it is not necessary to define excessive synchronization rasters within a given channel range. Compared with the relatively dense synchronization raster design in the original NR system, there are fewer synchronization rasters in the NR-U system, thereby reducing the complexity in searching for an SSB by the terminal. Based on such consideration, within each channel bandwidth, only one synchronization raster position is reserved as the synchronization raster of the NR-U system. For example, for unlicensed band n46 and n96, only some synchronization rasters may be allowed within the band range, separated by about 20 MHz. However, in the subsequent technical evolution, for a person skilled in the art, a technical problem to be solved is how to determine a position of an allowed synchronization raster in a high-frequency bandwidth range (for example, 52.6 GHz~71 GHz) in the NR-U so as to search for the SSB.

SUMMARY

In a first aspect, a method for determining a frequency position of an SSB is disclosed in implementations of the disclosure. The method is applied to a terminal and includes the following. A position of a first synchronization raster in a target bandwidth is determined, where the first synchronization raster is used for determining a frequency position of an SSB in the target bandwidth, and the position of the first synchronization raster in the target bandwidth is associated with one or more of following information: a subcarrier spacing of the SSB, a size of the target bandwidth, a size of a reserved bandwidth at a boundary of the target bandwidth, and information of a first channel in the target bandwidth, where a frequency range of the first channel does not overlap with the SSB. The frequency position of the SSB is determined according to the position of the first synchronization raster in the target bandwidth.

In a second aspect, a method for determining a frequency position of an SSB is disclosed in implementations of the disclosure. The method is applied to a network device and includes the following. An SSB is transmitted, where a frequency position of the SSB is associated with a first synchronization raster, and the first synchronization raster is associated with one or more of following information: a subcarrier spacing of the SSB, a size of a target bandwidth, a size of a reserved bandwidth at a boundary of the target bandwidth, and information of a first channel in the target bandwidth, where a frequency range of the first channel does not overlap with the SSB.

In a third aspect, a terminal is disclosed in implementations of the disclosure. The terminal includes a processor and a memory. The memory is configured to store a computer program or instructions. The processor is configured to invoke the computer program or instructions stored in the memory to cause the device to implement the method of the first aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

FIG. 2 is a schematic diagram of a method for determining a frequency domain position of a synchronization signal and physical broadcast channel (PBCH) block (SSB) according to an implementation of the present disclosure.

DETAILED DESCRIPTION

Implementations of the present disclosure will be described below with reference to the drawings in the implementations of the present disclosure.

Figure 1A:
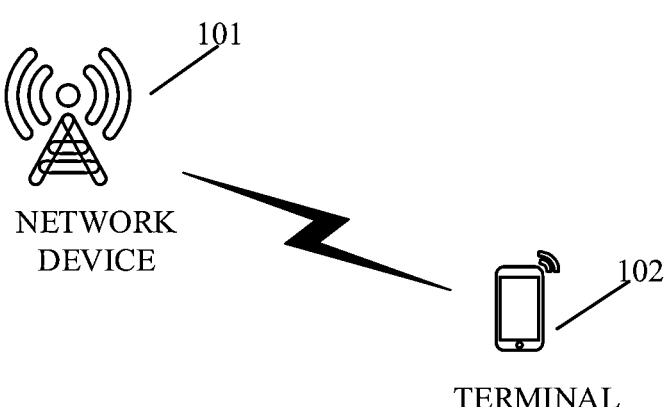
FIG. 1A is a schematic diagram of a communication system according to an implementation of the present disclosure.

FIG. 1A illustrates a communication system in the present disclosure. The communication system may operate in a high-frequency band, and may be a future evolved fifth generation mobile communication (the 5th Generation, 5G) system, a new radio (NR) system, a machine to machine (M2M) system, and the like. As illustrated in FIG. 1A, the communication system 100 may include one or more network devices 101 and one or more terminals 102. FIG. 1A illustrates only one network device 101 and one terminal 102 as an example. The network device 101 may be a base station, and the base station may be configured to communicate with one or more terminals, and may also be configured to communicate with one or more base stations having a part of terminal functions (for example, communication between a macro base station and a micro base station, such as an access point). The base station may be a base transceiver station (BTS) in a time division synchronous code division multiple access (TD-SCDMA) system, or may be an evolved Node B (eNB) in a long term evolution (LTE) system, or may be a gNB in a 5G system or an NR system. In addition, the base station may also be an access point (AP), a transport point (trans TRP), a central unit (CU), or other network entity, and may include some or all of the functions of the above network entity. The terminal 102 may be distributed in the whole communication system 100, and may be stationary or mobile. In some implementations of the present disclosure, the terminal 102 may be a mobile device (such as a smart phone), a mobile station, a mobile unit, an M2M terminal, a wireless unit, a remote unit, a user agent, a user equipment (UE), a mobile client, or the like.

It should be noted that, the communication system 100 in FIG. 1A is only illustrated for describing the technical solutions of the present disclosure more clearly, and does not constitute a limitation to the present disclosure. It can be seen by a person of ordinary skill in the art that, along with evolution of a network architecture and emergence of a new service scenario, the technical solutions provided in the present disclosure are also applicable to a similar technical problem.

Related technologies involved in the present disclosure are introduced below.

1) NR-U technology: Unlicensed spectrum is a spectrum specified by a country or region that can be used for communication between radio devices. This spectrum is usually regarded as a shared spectrum, that is, communication devices in different communication systems can use this spectrum without applying for exclusive spectrum authority from the government, as long as they meet regulatory requirements on this spectrum set by the country or region. In order to make various communication systems, which use an unlicensed spectrum for wireless communication, coexist in harmony in this spectrum, regulatory requirements on usage of this spectrum are set by the country or region. For example, in Europe, a communication device needs to follow a listen-before-talk (LBT) principle, that is, before transmitting signals on an unlicensed spectrum channel, the communication device needs to perform channel listening first, and the communication device can transmit signals only when the channel listening indicates that the channel is idle. If the channel listening of the communication device on the unlicensed spectrum channel indicates that the channel is busy, the communication device cannot transmit signals. In order to ensure fairness, in one transmission, a duration for which the communication device uses the unlicensed spectrum channel for signal transmission cannot exceed a maximum channel occupancy time (MCOT).

Figure 1B:
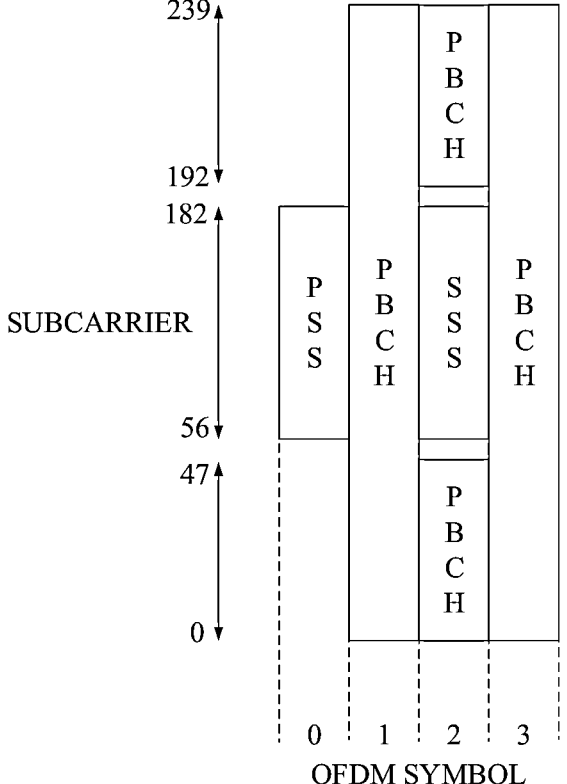
FIG. 1B is a schematic diagram of an SSB according to an implementation of the present disclosure.

2) Synchronization signal and PBCH block (SSB) in NR: An SSB is composed of three parts: a primary synchronization signal (PSS), a secondary synchronization signal (SSS) and a physical broadcast channel (PBCH). As illustrated in FIG. 1B, the SSB includes a PSS of one symbol, an SSS of one symbol, and a PBCH of two symbols. The time-frequency resources occupied by the PBCH include a demodulation reference signal (DMRS) used for demodulation of the PBCH. The SSB occupies four orthogonal frequency division multiplexing (OFDM) symbols in the time domain, which are numbered in an ascending order from 0 to 3, and the SSB occupies the 240 sub-carriers in the frequency domain, i.e., 20 physical resource blocks (PRBs), where the sub-carriers are numbered from 0 to 239. The PSS is located in the middle 127 sub-carriers of symbol 0, and the SSS is located in the middle 127 sub-carriers of symbol 2. In order to protect the PSS and SSS, there are different sub-carrier sets 0 at two ends of the PSS and SSS respectively. The PBCH is located at symbols 1, 3 and symbol 2, and occupies all sub-carriers from 0 to 239 at symbols 1 and 3 and occupies all sub-carriers except the sub-carriers occupied by the SSS and the sub-carrier set 0 protecting the SSS at symbol 2. The DMRSs are located in the middle of the PBCH at symbols 1 and 3, each symbol containing 60 DMRSs spaced by 4 sub-carriers one another.

In NR, beam scanning covers a service range of the whole cell. The beam scanning refers to transmitting a physical channel or a reference signal by using beams in different directions at different moments. The cell usually needs to transmit multiple SSBs to complete one beam scanning, and the SSBs required for one beam scanning form an SS/PBCH burst set. One SSB is used to carry a synchronization signal and a broadcast channel for one beam, and therefore, one SSB burst set may include signals for beams the number of which is equal to the number of SSBs in the cell. The maximum number L of SSBs is related to the frequency band of the system. Specifically, for system frequency range up to 3 GHz, L is 6; for system frequency range from 3 GHz to 6 GHz, L is 8; and for system frequency range from 6 GHz to 52.6 GHz, L is 8.

All SSBs in the SSB burst set are transmitted in a time window of 5 milliseconds (ms), and are repeatedly transmitted in a certain period, where the period is configured by a high-layer parameter. The period may be 5 ms, 10 ms, 20 ms, 40 ms, 80 ms, or 160 ms, and the period is indicated in a system information block type 1 (SIB1). After receiving an SSB, a UE determines an index of the SSB, where the index of the SSB corresponds to a relative position of the SSB in the 5 ms time window. The UE performs time-frequency synchronization according to the index of the SSB and a half-frame indication carried in the PBCH. The index of the SSB is indicated by the DMRS of the PBCH or information carried in the PBCH.

3) Synchronization raster: For a wireless spectrum in the NR, a frequency position of the SSB is determined through a synchronization raster. As illustrated in Table 1, synchronization rasters corresponding to different frequency ranges are given. In a range of 0~3000 MHz, the synchronization raster is 1200 kHz. In a range of 3000~24250 MHz, the synchronization raster is 1.44 MHz. In a range of 24250~100000 MHz, the synchronization raster is 17.28 MHz.

The SSB may have many possible frequency positions in the NR. There are a series of global synchronization channel numbers (GSCNs) in the NR, each of which is a channel number used for marking an SSB and corresponds to a frequency position SSREF of the SSB. The GSCNs are numbered in an ascending order according to the frequency domain. After the synchronization raster is determined, the resource mapping of the SSB may be as illustrated in Table 2. The synchronization raster is located in a resource element (RE) with the number 0 in a PRB with the number 10 in 20 PRBs of the SSB. The system will place the SSBs on these GSNs, and the UE will perform blind detection of SSB on these GSNs.

TABLE 1

| Frequency range | SSB frequency position $SS_{REF}$ | GSCN | Range of GSCN |
|---|---|---|---|
| 0-3000 MHz | N*1200 kHz + M*50 kHz, N = 1:2499, M∈{1, 3, 5} (NOTE1) | 3N + (M − 3)/2 | 2-7498 |
| 3000-24250 MHz | 3000 MHz + N * 1.44 MHz N = 0:14756 | 7499 + N | 7499-22255 |
| 24250-100000 MHz | 24250.08 MHz + N * 17.28 MHz, N = 0:4383 | 22256 + N | 22256-26639 |

(NOTE1)
The default value for operating bands with which only support SCS spaced channel raster(s) is M = 3.

TABLE 2

| Resource element index | 0 |
|---|---|
| Physical resource block number $n_{PRB}$ of the SSB | $n_{PRB} = 10$ |

In the frequency ranges FR1 and FR2, for each operating band, the range of GSCNs is as illustrated in Table 3. In NR, according to different subcarrier spacings (SCSs), there are five different cases of the time position of the SSB, which are Case A, Case B, Case C, Case D and Case E, corresponding the SCSs of 15 kHz, 30 kHz, 30 kHz, 120 kHz and 240 kHz respectively. For example, for the operating band n77, the GSCNs are numbered from 7711 to 8329, with totally 619 synchronization rasters.

TABLE 3

| NR operating band | SSB SCS | SSB pattern | Range of GSCN (First-<Step size>-Last) |
|---|---|---|---|
| n1 | 15 kHz | Case A | 5279-<1>-5419 |
| n2 | 15 kHz | Case A | 4829-<1>-4969 |
| n3 | 15 kHz | Case A | 4517-<1>-4693 |
| n5 | 15 kHz | Case A | 2177-<1>-2230 |
| | 30 kHz | Case B | 2183-<1>-2224 |
| n7 | 15 kHz | Case A | 6554-<1>-6718 |
| n8 | 15 kHz | Case A | 2318-<1>-2395 |
| n12 | 15 kHz | Case A | 1828-<1>-1858 |
| n13 | 15 kHz | Case A | 1871-<1>-1885 |
| n14 | 15 kHz | Case A | 1901-<1>-1915 |
| n18 | 15 kHz | Case A | 2156-<1>-2182 |
| n20 | 15 kHz | Case A | 1982-<1>-2047 |
| n25 | 15 kHz | Case A | 4829-<1>-4981 |
| n26 | 15 kHz | Case A | 2153-<1>-2230 |
| n28 | 15 kHz | Case A | 1901-<1>-2002 |
| n29 | 15 kHz | Case A | 1798-<1>-1813 |
| n30 | 15 kHz | Case A | 5879-<1>-5893 |
| n34 | 15 kHz | Case A | NOTE 5 |
| | 30 kHz | Case C | 5036-<1>-5050 |
| n38 | 15 kHz | Case A | NOTE 2 |
| | 30 kHz | Case C | 6437-<1>-6538 |
| n39 | 15 kHz | Case A | NOTE 6 |
| | 30 kHz | Case C | 4712-<1>-4789 |
| n40 | 30 kHz | Case C | 5762-<1>-5989 |

TABLE 3-continued

| NR operating band | SSB SCS | SSB pattern | Range of GSCN (First-<Step size>-Last) |
|---|---|---|---|
| n41 | 15 kHz | Case A | 6246-<3>-6717 |
| | 30 kHz | Case C | 6252-<3>-6714 |
| n46 [NOTE 3] | 30 kHz | Case C | 8993-<1>-9530 |
| n48 | 30 kHz | Case C | 7884-<1>-7982 |
| n50 | 30 kHz | Case C | 3590-<1>-3781 |
| n51 | 15 kHz | Case A | 3572-<1>-3574 |
| n53 | 15 kHz | Case A | 6215-<1>-6232 |
| n65 | 15 kHz | Case A | 5279-<1>-5494 |

TABLE 3-continued

| NR operating band | SSB SCS | SSB pattern | Range of GSCN (First-<Step size>-Last) |
|---|---|---|---|
| n66 | 15 kHz | Case A | 5279-<1>-5494 |
| | 30 kHz | Case B | 5285-<1>-5488 |
| n70 | 15 kHz | Case A | 4993-<1>-5044 |
| n71 | 15 kHz | Case A | 1547-<1>-1624 |
| n74 | 15 kHz | Case A | 3692-<1>-3790 |
| n75 | 15 kHz | Case A | 3584-<1>-3787 |
| n76 | 15 kHz | Case A | 3572-<1>-3574 |
| n77 | 30 kHz | Case C | 7711-<1>-8329 |
| n78 | 30 kHz | Case C | 7711-<1>-8051 |
| n79 | 30 kHz | Case C | 8480-<16>-8880 |
| n90 | 15 kHz | Case A | 6246-<1>-6717 |
| | 30 kHz | Case C | 6252-<1>-6714 |
| n91 | 15 kHz | Case A | 3572-<1>-3574 |
| n92 | 15 kHz | Case A | 3584-<1>-3787 |
| n93 | 15 kHz | Case A | 3572-<1>-3574 |
| n94 | 15 kHz | Case A | 3584-<1>-3787 |
| n96 [NOTE 4] | 30 kHz | Case C | 9531-<1>-10363 |

NOTE 2:
The applicable SS raster entries are GSCN = {6432, 6443, 6457, 6468, 6479, 6493, 6507, 6518, 6532, 6543};
[NOTE 3]:
The following GSCN are allowed for operation in band n46:
GSCN = 8996, 9010, 9024, 9038, 9051, 9065, 9079, 9093, 9107, 9121, 9218, 9232, 9246, 9260, 9274, 9288, 9301, 9315, 9329, 9343, 9357, 9371, 9385, 9402, 9416, 9430, 9444, 9458, 9472, 9485, 9499, 9513;
[NOTE 4]:
The following GSCN are allowed for operation in band n96:
GSCN = 9548, 9562, 9576, 9590, 9603, 9617, 9631, 9645, 9659, 9673, 9687, 9701, 9714, 9728, 9742, 9756, 9770, 9784, 9798, 9812, 9826, 9840, 9853, 9867, 9881, 9895, 9909, 9923, 9937, 9951, 9964, 9978, 9992, 10006, 10020, 10034, 10048, 10062, 10076, 10090, 10103, 10117, 10131, 10145, 10159, 10173, 10187, 10201, 10214, 10228, 10242, 10256, 10270, 10284, 10298, 10312, 10325, 10339, 10353;
NOTE 5:
The applicable SS raster entries are GSCN = {5032, 5043, 5054};
NOTE 6:
The applicable SS raster entries are GSCN = {4707, 4715, 4718, 4729, 4732, 4743, 4747, 4754, 4761, 4768, 4772, 4782, 4786, 4793};

Currently defined synchronization rasters are designed mainly according to a requirement of a licensed spectrum, and a spacing between the synchronization rasters is 1.2 MHz, 1.44 MHz, or 17.28 MHz, which corresponds to frequency ranges of 0-3 GHz, 3-24.25 GHz, and 24.25-100 GHz, respectively. The reason of a relatively small spacing between the synchronization rasters is that the licensed band supports different channel bandwidths and band allocation, and it is necessary to allow the SSB to be transmitted at as many positions as possible to deploy cells. However, the unlicensed spectrum has a channel bandwidth of 20 MHz and is shared by multiple operators, and thus it is not necessary to define too many positions of the synchronization raster in the 20 MHz channel bandwidth. In order to flexibly support various usage of channel bandwidths and licensed spectrum, a large number of synchronization rasters defined in the NR system. In the NR-U system, the positions of the synchronization raster where an SSB is located is redefined. For the NR-U system, since the channel bandwidth and the channel position are relatively fixed, there is no need for too many synchronization rasters in a given channel range. Compared with the NR system, the number of synchronization rasters in the NR-U system is reduced, so as to reduce the complexity of the UE searching for the SSB. Based on this consideration, only one synchronization raster with a position within each channel bandwidth is reserved as the synchronization raster of the NR-U system. As illustrated in Table 3 above, for unlicensed bands n46 and n96, only some synchronization rasters are allowed in the band range, and these synchronization rasters are spaced at about 20 MHz.

4) In an initial cell search process, for an initial access UE, a common search space needs to be defined for receiving common control information. To this end, the concept of a control resource set (CORESET) is introduced, in which the CORESET is defined as a resource set for carrying control information. The UE obtains master information block (MIB) information through a PBCH, where the MIB information includes a frequency, a system frame number (SFN), a subcarrier spacing, etc. However, these pieces of information are not sufficient for the UE to further perform random access. Therefore, the UE needs to continue to receive the SIB1 information, which is transmitted in a physical downlink shared channel (PDSCH) through downlink control information (DCI) scheduling of a physical downlink control channel (PDCCH). Specifically, the type of the common search space of the PDCCH scheduling the SIB1 is Type0-PDCCH, and a CORESET associated therewith is CORESET #0, where the CORESET #0 is a control resource set of the Type0-PDCCH and is used for carrying DCI scheduling information for the SIB1.

Figure 1C:
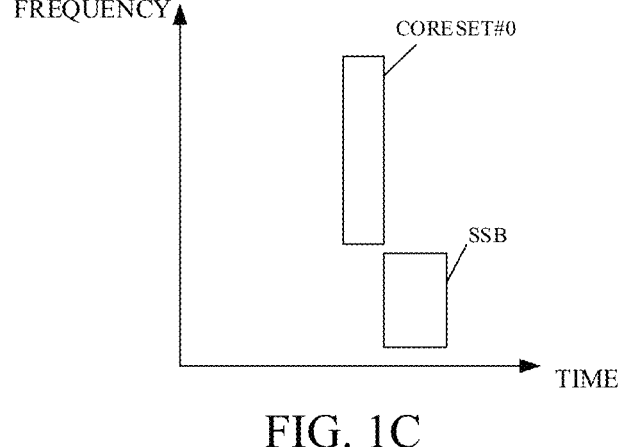
FIG. 1C is a schematic diagram illustrating time division multiplexing of an SSB and a CORESET #0 in a time domain according to an implementation of the present disclosure.
Figure 1D:
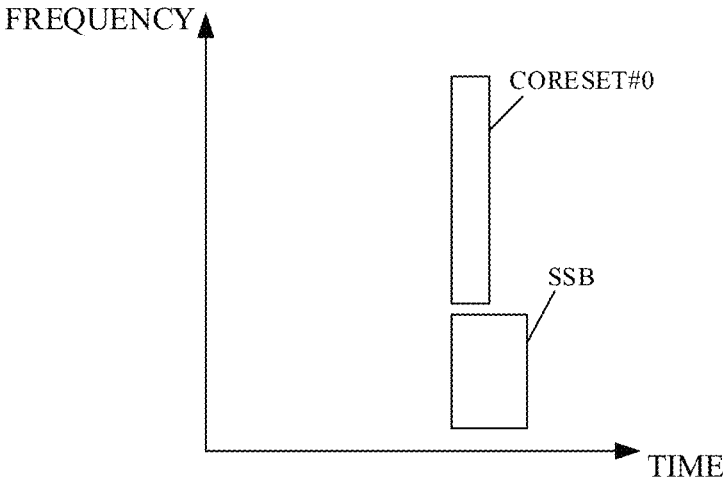
FIG. 1D is a schematic diagram illustrating frequency division multiplexing of an SSB and a COREST #0 in a frequency domain according to an implementation of the present disclosure.

FIG. 1C illustrates time division multiplexing of SSB and CORESET #0 in the time domain, that is, SSB and CORESET #0 are located on different symbols in the time domain, and the frequency range of CORESET #0 should include the SSB. FIG. 1D illustrates frequency division multiplexing of SSB and CORESET #0 in the frequency domain.

In the current NR system, the channel bandwidth is designed to be 20 MHz, the subcarrier spacing is 15 kHz and 30 kHz, and the position of the allowed synchronization raster is designed according to the channel bandwidth, the subcarrier spacing, and the like. However, in the NR-U system, especially in a high-frequency band of the NR-U system, channel environment changes a lot, and the original design of synchronization raster is no longer applicable. For example, in the high-frequency band (such as 52.6 GHz~71 GHz) in NR-U, the channel bandwidth and the subcarrier spacing are not fixed, and a determined position of the synchronization raster cannot be designed by using the existing method. Therefore, it is a technical problem to be solved by those skilled in the art that how to determine a position of an allowed synchronization raster in the high-frequency band range (for example, 52.6 GHz~71 GHz) of the NR-U, so as to search for an SSB.

In view of the above problems, the present disclosure provides the following implementations, which will be described in detail below in conjunction with the accompanying drawings.

Referring to FIG. 2, FIG. 2 illustrates a method for determining a frequency position of an SSB provided in implementations of the present disclosure. The method is applied to the example communication system described above. The method includes the following.

At block 201, the terminal determines a position of a first synchronization raster in a target bandwidth.

The first synchronization raster is used for determining a frequency position of an SSB in the target bandwidth, and the position of the first synchronization raster in the target bandwidth is associated with one or more of the following information: a subcarrier spacing of the SSB, a size of the target bandwidth, a size of a reserved bandwidth at a boundary of the target bandwidth, and information of a first channel in the target bandwidth, where a frequency range of the first channel does not overlap with the SSB.

The target bandwidth refers to a high-frequency bandwidth in the NR-U. The high-frequency bandwidth may in a range of 52.6 GHz to 71 GHz. The first synchronization raster may refer to a synchronization raster that is allowed in the high-frequency bandwidth in the NR-U. In the target bandwidth, the subcarrier spacing of the SSB may differ, e.g., the subcarrier spacing of the SSB may be 240 kHz, 480 kHz and 960 kHz. The size of the target bandwidth is related to the subcarrier spacing of the SSB, for example, the subcarrier spacing of the SSB is 120 kHz, 480 kHz, and 960 kHz, and correspondingly, the target bandwidth may be 400 MHz, 1600 MHz, and 2160 MHz respectively. The size of the reserved bandwidth at the boundary of the target bandwidth may refer to the size of the reserved bandwidth at the edge of the target bandwidth, and may also refer to the size of the reserved bandwidth at an upper boundary of the target bandwidth or the size of the reserved bandwidth at a lower boundary of the target bandwidth. The first channel may be a channel occupied by a control resource set (CORESET). Further, the first channel may be a channel occupied by CORESET #0.

The target bandwidth may be a channel bandwidth, an LBT bandwidth, or a nominal bandwidth. The channel bandwidth is a bandwidth for transmission supported on a target frequency band, and a size of the channel bandwidth is related to the frequency band and the subcarrier spacing. The LBT bandwidth is a bandwidth for performing channel listening on the unlicensed spectrum, and may be equal to the channel bandwidth, for example, equal to a minimum channel bandwidth supported or a sum of multiple minimum channel bandwidths supported. The nominal bandwidth may be specified according to a relevant regulation for the unlicensed band. The target bandwidth may also be a fixed bandwidth, for example, a fixed bandwidth used for channel listening.

In one possible example, the associated information of the position of the first synchronization raster in the target bandwidth includes the size of the target bandwidth. In a high-frequency bandwidth range, for example, 52.6 GHz~71 GHz, there may be multiple sizes of target bandwidths. The size of the target bandwidth may be related to the subcarrier spacing of the SSB. For example, the subcarrier spacing of the SSB is 120 kHz, 480 kHz, and 960 kHz, and the corresponding target bandwidths may be 400 MHz, 1600 MHz, and 2160 MHz respectively. Therefore, in the implementations of the present disclosure, there are multiple sizes of the target bandwidth in the high-frequency bandwidth range, for example, 52.6 GHz~71 GHz. For the same high-frequency bandwidth range, the position of the first synchronization raster in the target bandwidth is related to the size of the target bandwidth.

Figure 3:
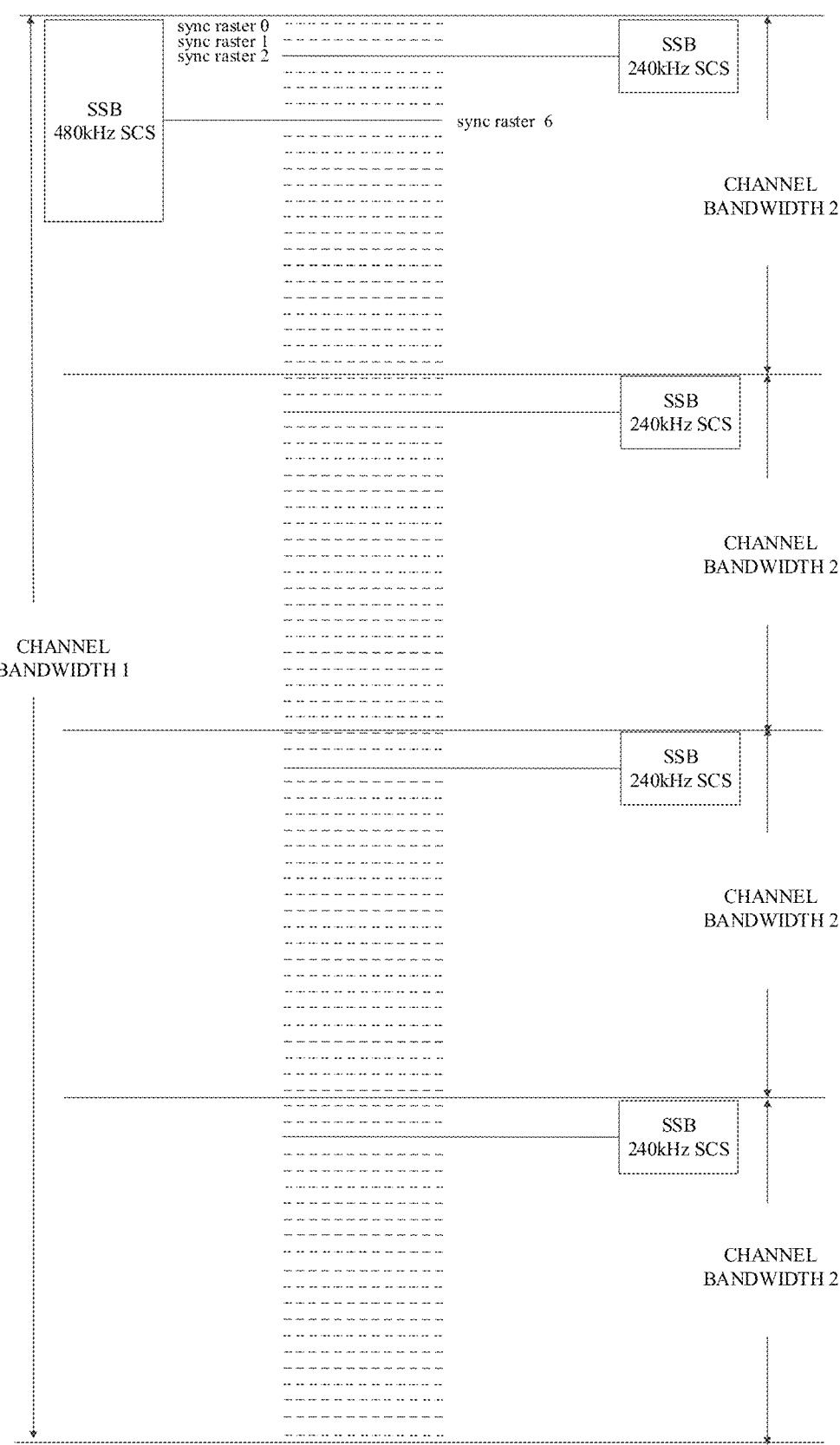
FIG. 3 to FIG. 42 are schematic diagrams illustrating positions of a first synchronization raster in a target bandwidth according to an implementation of the present disclosure.

When the size of the target bandwidth is a first value, the position of the first synchronization raster is a first position. When the size of the target bandwidth is a second value, the position of the first synchronization raster is a second position different from the first position. The first value is greater than the second value, and the first position is lower than the second position. The first position being lower than the second position refers to that the frequency position of the first position is lower than the frequency position of the second position, and may also be understood as that the value of the GSCN corresponding to the first position is smaller than the value of the GSCN corresponding to the second position. As illustrated in FIG. 3, assume that an index of the position of the first synchronization raster is numbered in a direction from an upper boundary to a lower boundary of the target bandwidth. For the same high-frequency bandwidth range, assume that available target bandwidths are channel bandwidth 1 and channel bandwidth 2, where channel bandwidth 1 is 1600 MHz and channel bandwidth 2 is 400 MHz. For channel bandwidth 1, the subcarrier spacing of the SSB is 480 kHz, and the index of the position of the corresponding first synchronization raster is 6. For channel bandwidth 2, the subcarrier spacing of the SSB is 240 kHz, and the index of the position of the corresponding first synchronization raster is 2. That is, when the target bandwidth is 1600 MHz, i.e., the first value is 1600 MHz, the position of the first synchronization raster is the first position, where the index of the first position is 6. When the target bandwidth is 400 MHz, i.e., the second value is 400 MHz, the position of the first synchronization raster is the second position, where the index of the second position is 2. The first position with the index of 6 is lower than the second position with an index of 2.

Figure 4:
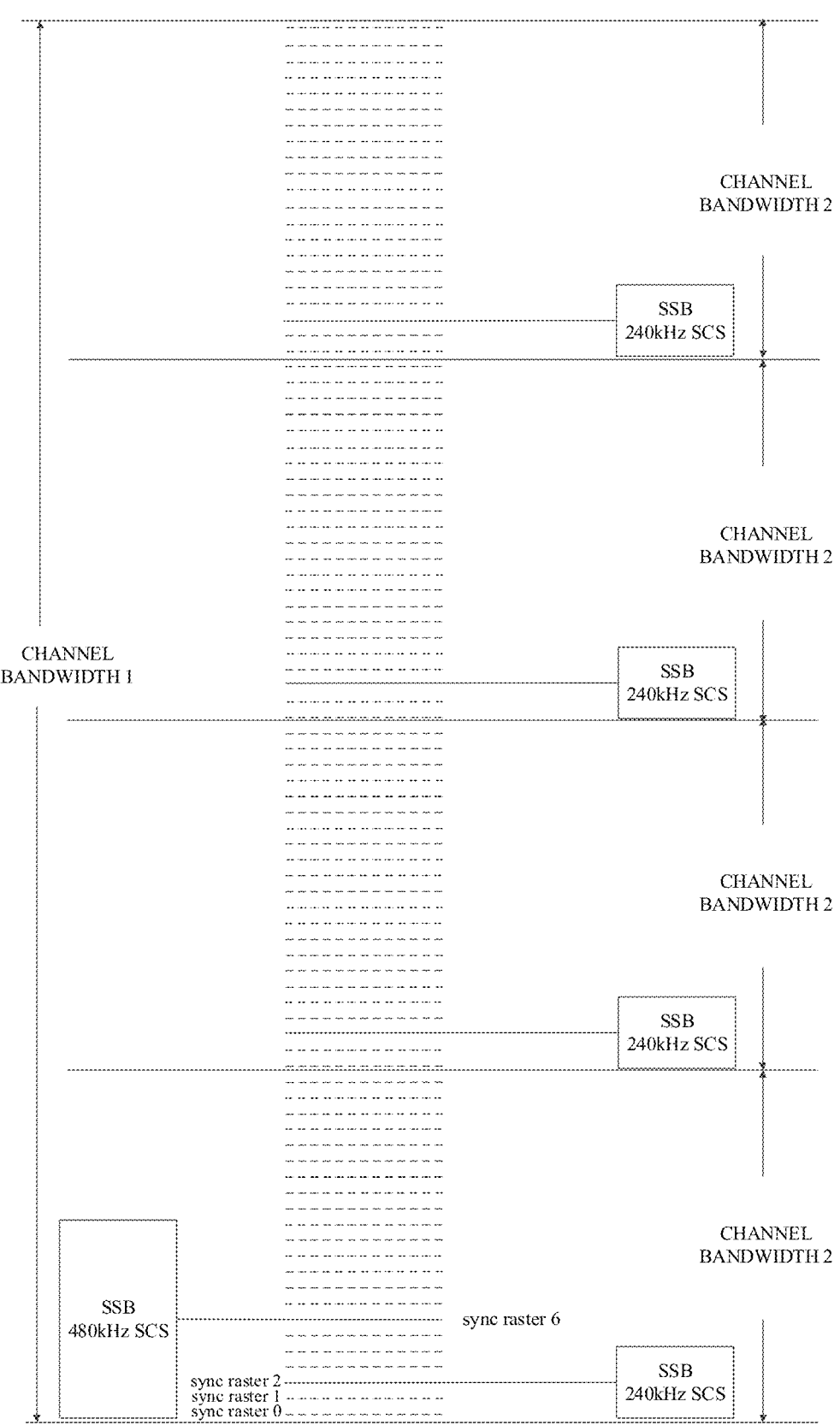

When the size of the target bandwidth is a first value, the position of the first synchronization raster is a first position. When the size of the target bandwidth is a second value, the position of the first synchronization raster is a second position different from the first position. The first value is greater than the second value, and the first position is higher than the second position. The first position being higher than the second position refers to that the frequency position of the first position is higher than the frequency position of the second position, and may also be understood as that the value of the GSCN corresponding to the first position is greater than the value of the GSCN corresponding to the second position. As illustrated in FIG. 4, assume that an index of the position of the first synchronization raster is numbered in a direction from a lower boundary to an upper boundary of the target bandwidth. For the same high-frequency bandwidth range, assume that available target bandwidths are channel bandwidth 1 and channel bandwidth 2, where channel bandwidth 1 is 1600 MHz and channel bandwidth 2 is 400 MHz. For channel bandwidth 1, the subcarrier spacing of the SSB is 480 kHz, and the index of the position of the corresponding first synchronization raster is 6. For channel bandwidth 2, the subcarrier spacing of the SSB is 240 kHz, and the index of the position of the corresponding first synchronization raster is 2. That is, when the target bandwidth is 1600 MHz, i.e., the first value is 1600 MHz, the position of the first synchronization raster is the first position, where the index of the first position is 6. When the target bandwidth is 400 MHz, i.e., the second value is 400 MHz, the position of the first synchronization raster is the second position, where the index of the second position is 2. The first position with the index of 6 is higher than the second position with an index of 2.

In one possible example, the associated information of the position of the first synchronization raster in the target bandwidth includes the subcarrier spacing of the SSB. That is to say, the position of the first synchronization raster in the target bandwidth is related to the subcarrier spacing of the SSB. In a high-frequency bandwidth range such as 52.6 GHz~71 GHz, multiple subcarrier spacings of the first channel may be supported, such as 240 kHz, 480 kHz, and 960 kHz.

Figure 5:
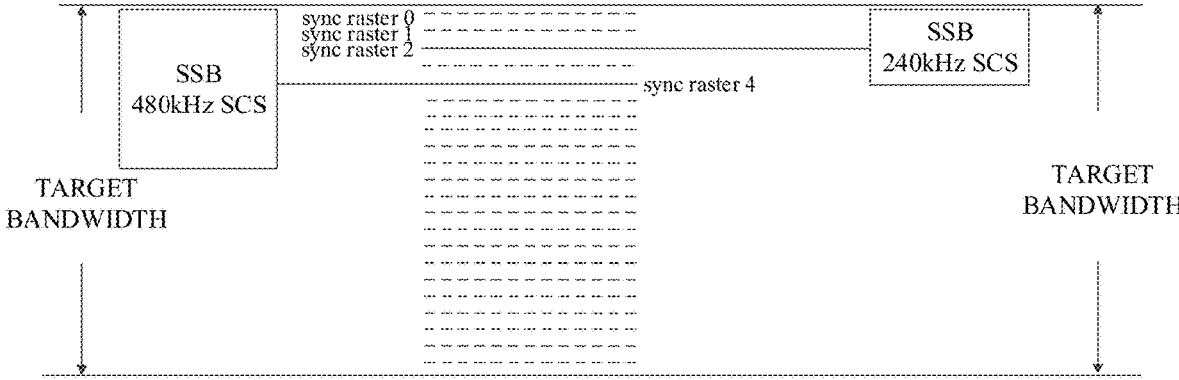

When the subcarrier spacing of the SSB is a first subcarrier spacing, the position of the first synchronization raster is a third position, and when the subcarrier spacing of the SSB is a second subcarrier spacing, the position of the first synchronization raster is a fourth position different from the third position. The first subcarrier spacing is greater than the second subcarrier spacing, and the third position is lower than the fourth position. The third position being lower than the fourth position refers to that the frequency position of the third position is lower than the frequency position of the fourth position, and may also be understood as that the value of the GSCN corresponding to the third position is smaller than the value of the GSCN corresponding to the fourth position. Assume that the index of the position of the first synchronization raster is numbered in a direction from an upper boundary to a lower boundary of the target bandwidth. As illustrated in FIG. 5, assuming that the subcarrier spacing of the SSB is 240 kHz, the index of the position of the corresponding first synchronization raster may be 2. Specifically, since the subcarrier spacing of the SSB is 240 kHz, the bandwidth occupied by the SSB is 57.6 MHz, and the half of the bandwidth occupied by the SSB is 28.8 MHz. The spacing between the synchronization rasters is 17.28 MHz in the range from 24250 MHz to 100000 MHz, and then 28.8/17.28=1.66. Since the bandwidth occupied by the SSB should be in the target bandwidth, 1.66 is rounded down to 2. Therefore, when the subcarrier spacing of the SSB is 240 kHz, the index of the position of the corresponding first synchronization raster is 2. Assuming that the subcarrier spacing of the SSB is 480 kHz, the index of the position of the corresponding first synchronization raster may be 4. That is, when the subcarrier spacing of the SSB is 480 kHz. i.e., the first subcarrier spacing is 480 kHz, the position of the first synchronization raster is the third position, where the index of the third position is 4. When the subcarrier spacing of the SSB is 240 kHz, i.e., the second subcarrier spacing is 240 kHz, the position of the first synchronization raster is the fourth position, where the index of the fourth position is 2. The third position with the index of 4 is lower than the fourth position with the index of 2.

Figure 6:
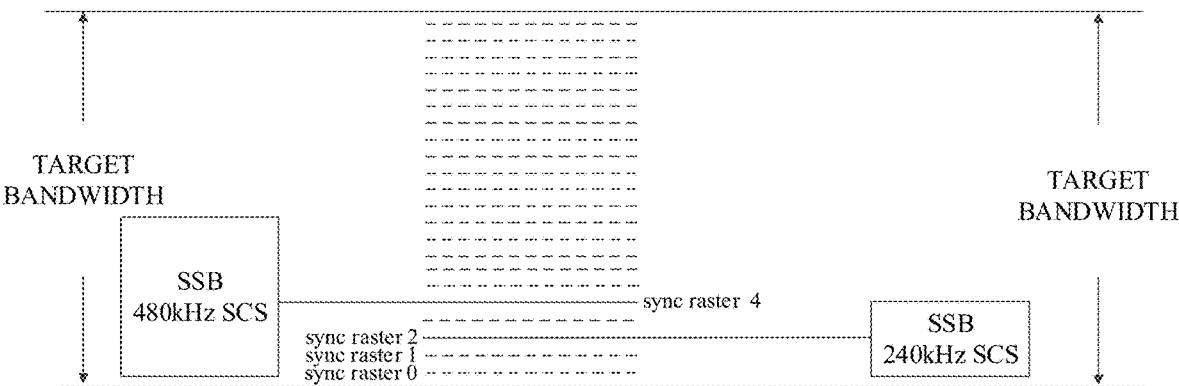

When the subcarrier spacing of the SSB is a first subcarrier spacing, the position of the first synchronization raster is a third position, and when the subcarrier spacing of the SSB is a second subcarrier spacing, the position of the first synchronization raster is a fourth position different from the third position. The first subcarrier spacing is greater than the second subcarrier spacing, and the third position is higher than the fourth position. The third position being higher than the fourth position refers to that the frequency position of the third position is higher than the frequency position of the fourth position, and may also be understood as that the value of the GSCN corresponding to the third position is greater than the value of the GSCN corresponding to the fourth position. Assume that the index of the position of the first synchronization raster is numbered in a direction from a lower boundary to an upper boundary of the target bandwidth. As illustrated in FIG. 6, assuming that the subcarrier spacing of the SSB is 240 kHz, the index of the position of the corresponding first synchronization raster may be 2. Assuming that the subcarrier spacing of the SSB is 480 kHz, the index of the position of the corresponding first synchronization raster may be 4. That is, when the subcarrier spacing of the SSB is 480 kHz. i.e., the first subcarrier spacing is 480 kHz, the position of the first synchronization raster is the third position, where the index of the third position is 4. When the subcarrier spacing of the SSB is 240 kHz, i.e., the second subcarrier spacing is 240 kHz, the position of the first synchronization raster is the fourth position, where the index of the fourth position is 2. The third position with the index of 4 is higher than the fourth position with the index of 2.

In one possible example, the associated information of the position of the first synchronization raster in the target bandwidth includes the size of the reserved bandwidth at the boundary of the target bandwidth. That is to say, the position of the first synchronization raster in the target bandwidth is related to the size of the reserved bandwidth located at the boundary of the target bandwidth. The size of the reserved bandwidth at the boundary of the target bandwidth may be determined by receiving, by the terminal, first indication information from the network device, where the first indication information indicates the size of the reserved bandwidth at the boundary of the target bandwidth.

When the reserved bandwidth is a third value, the position of the first synchronization raster is a fifth position, and when the reserved bandwidth is a fourth value, the position of the first synchronization raster is a sixth position different from the fifth position. The third value is greater than the fourth value, the fourth value is greater than or equal to 0 Hz, and the fifth position is lower than the sixth position. The fifth position being lower than the sixth position refers to that the frequency position of the fifth position is lower than the frequency position of the sixth position, and may also be understood as that the value of the GSCN corresponding to the fifth position is smaller than the value of the GSCN corresponding to the sixth position. Assume that the index of the position of the first synchronization raster is numbered in a direction from an upper boundary to a lower boundary of the target bandwidth, and the size of the reserved bandwidth refers to the size of the reserved bandwidth located at the upper boundary of the target bandwidth. As illustrated in (a) of FIG. 7, assuming that the size of the reserved bandwidth is 50 MHz, the index of the position of the corresponding first synchronization raster is 5. As illustrated in (b) in FIG. 7, assuming that the size of the reserved bandwidth is 0 MHz, the index of the position of the corresponding first synchronization raster is 2. That is, when the reserved bandwidth is 50 MHz, i.e., the third value is 50 MHz, the position of the first synchronization raster is the fifth position, where the index of the fifth position is 5. When the reserved bandwidth is 0 MHz, i.e., the fourth value is 0 MHz, the position of the first synchronization raster is the sixth position, where the index of the sixth position is 2. The fifth position with the index of 5 is lower than the sixth position with the index of 2.

Figure 8:
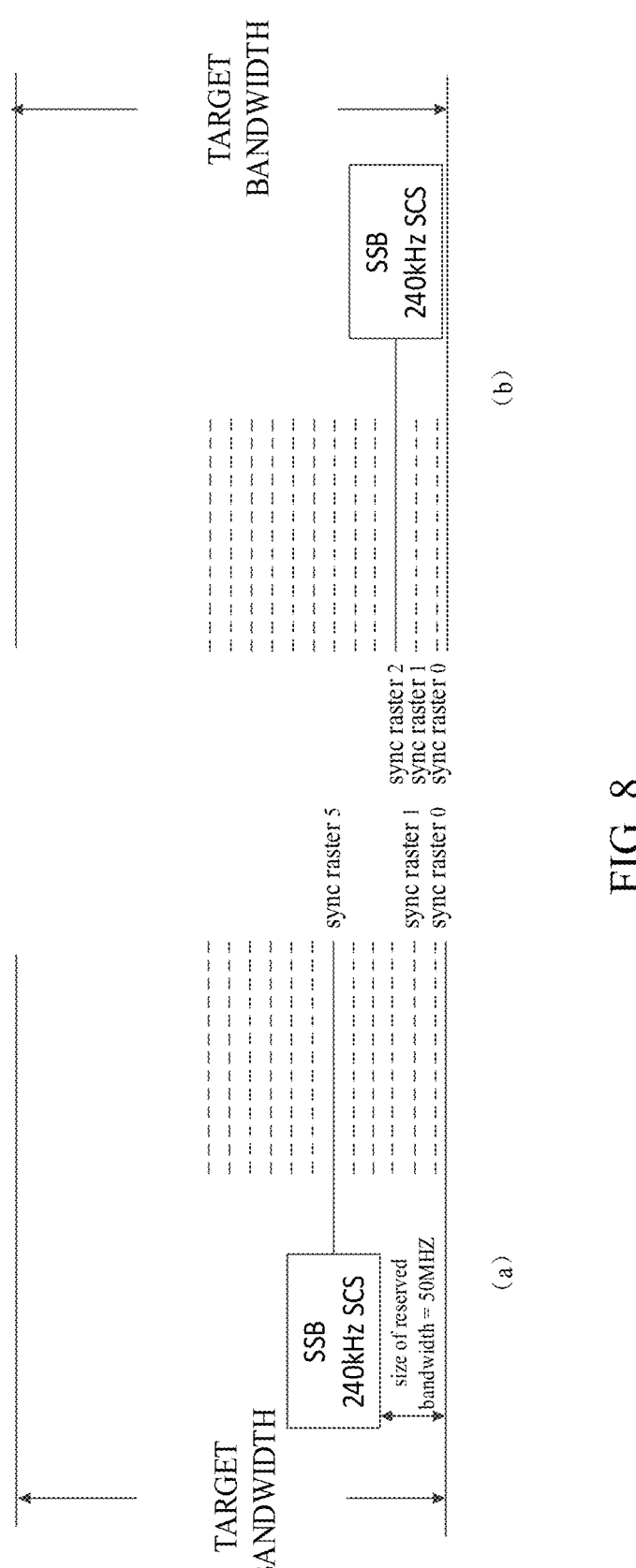

When the reserved bandwidth is a third value, the position of the first synchronization raster is a fifth position, and when the reserved bandwidth is a fourth value, the position of the first synchronization raster is a sixth position different from the fifth position. The third value is greater than the fourth value, the fourth value is greater than or equal to 0 Hz, and the fifth position is higher than the sixth position. The fifth position being higher than the sixth position refers to that the frequency position of the fifth position is higher than the frequency position of the sixth position, and may also be understood as that the value of the GSCN corresponding to the fifth position is greater than the value of the GSCN corresponding to the sixth position. Assume that the index of the position of the first synchronization raster is numbered in a direction from a lower boundary to an upper boundary of the target bandwidth, and the size of the reserved bandwidth refers to the size of the reserved bandwidth located at the lower boundary of the target bandwidth. As illustrated in (a) of FIG. 8, assuming that the size of the reserved bandwidth is 50 MHz, the index of the position of the corresponding first synchronization raster is 5. As illustrated in (b) in FIG. 8, assuming that the size of the reserved bandwidth is 0 MHz, the index of the position of the corresponding first synchronization raster is 2. That is, when the reserved bandwidth is 50 MHz, i.e., the third value is 50 MHz, the position of the first synchronization raster is the fifth position, where the index of the fifth position is 5. When the reserved bandwidth is 0 MHz, i.e., the fourth value is 0 MHz, the position of the first synchronization raster is the sixth position, where the index of the sixth position is 2. The fifth position with the index of 5 is higher than the sixth position with the index of 2.

In one possible example, the associated information of the position of the first synchronization raster in the target bandwidth includes the information of the first channel. The information of the first channel includes one or more of the following items: a subcarrier spacing of the first channel, a bandwidth size of the first channel, a type of the first channel, the number of the first channels, and a frequency position of the first channel.

Multiple subcarrier spacings of the first channel may be supported, for example, 120 kHz, 480 kHz, and 960 kHz. The bandwidth size of the first channel is related to the subcarrier spacing of the first channel. Because multiple subcarrier spacings of the first channel are supported, multiple bandwidth sizes of the first channel are also supported. The type of the first channel may be a PDCCH, a PDSCH, etc.

For example, the associated information of the position of the first synchronization raster in the target bandwidth includes the subcarrier spacing of the first channel. The PDCCH is taken as an example of the first channel for description.

When the subcarrier spacing of the PDCCH is a third subcarrier spacing, the position of the first synchronization raster is a seventh position, and when the subcarrier spacing of the PDSCH is a fourth subcarrier spacing, the position of the first synchronization raster is an eighth position different from the seventh position. The third subcarrier spacing is greater than the fourth subcarrier spacing, and the seventh position is lower than the eighth position. The seventh position being lower than the eighth position refers to that the frequency position of the seventh position is lower than the frequency position of the eighth position, and may also be understood as that the value of the GSCN corresponding to the seventh position is smaller than the value of the GSCN corresponding to the eighth position. Assume that the index of the position of the first synchronization raster is numbered in a direction from an upper boundary to a lower boundary of the target bandwidth. As illustrated in (a) of FIG. 9, assuming that the subcarrier spacing of the PDCCH is 480 kHz, the subcarrier spacing of the SSB is 120 kHz, and the index of the position of the first synchronization raster is 18. As illustrated in (b) of FIG. 9, assuming that the subcarrier spacing of the PDCCH is 120 kHz, the subcarrier spacing of the SSB is 120 kHz, the index of the position of the first synchronization raster is 6. That is, when the subcarrier spacing of the PDCCH is 480 kHz, the third subcarrier spacing is 480 kHz, the position of the first synchronization raster is the seventh position, where the index of the seventh position is 18. When the subcarrier spacing of the PDCCH is 120 kHz, the fourth subcarrier spacing is 120 kHz, the position of the first synchronization raster is the eighth position, where the index of the eighth position is 6. The seventh position with the index of 18 is lower than the eighth position with the index of 6.

Figure 10:
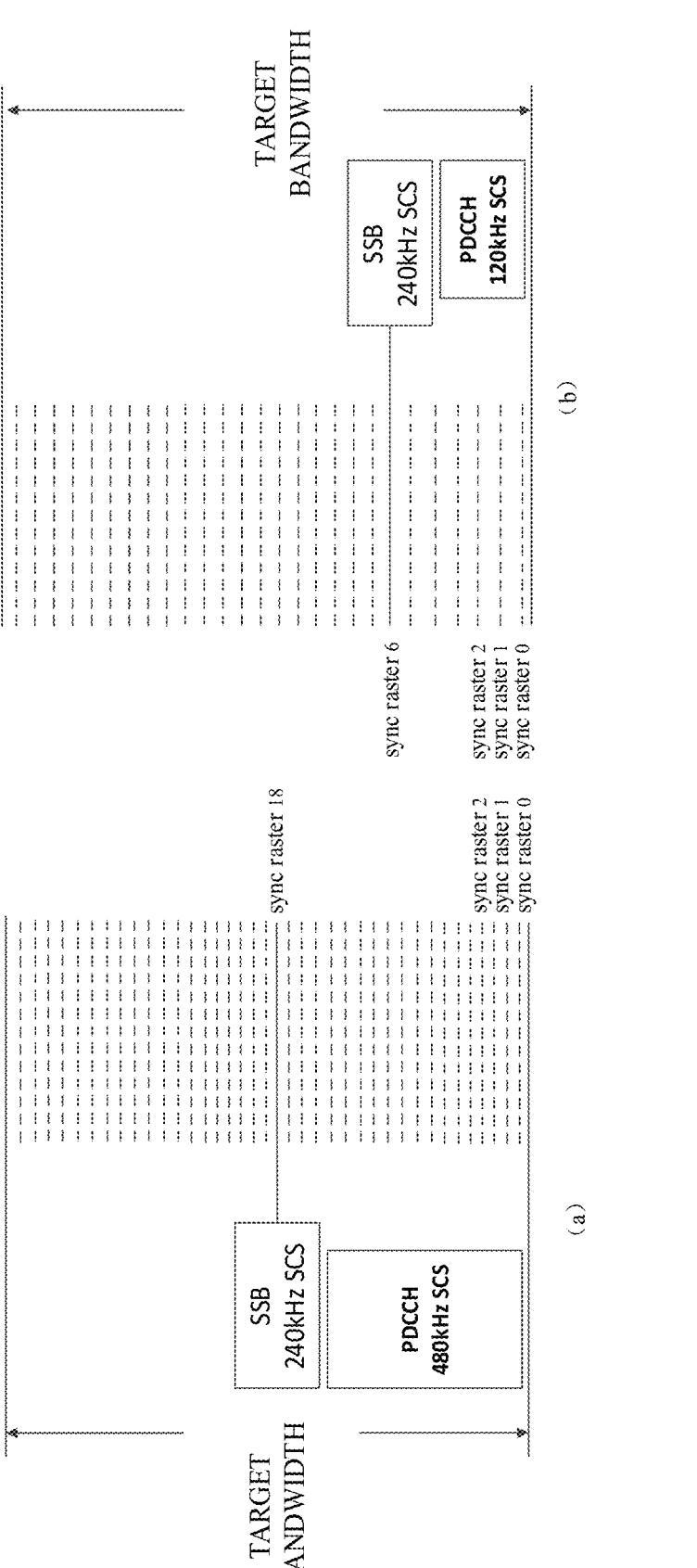

When the subcarrier spacing of the PDCCH is a third subcarrier spacing, the position of the first synchronization raster is a seventh position, and when the subcarrier spacing of the PDSCH is a fourth subcarrier spacing, the position of the first synchronization raster is an eighth position different from the seventh position. The third subcarrier spacing is greater than the fourth subcarrier spacing, and the seventh position is higher than the eighth position. The seventh position being higher than the eighth position refers to that the frequency position of the seventh position is higher than the frequency position of the eighth position, and may also be understood as that the value of the GSCN corresponding to the seventh position is greater than the value of the GSCN corresponding to the eighth position. Assume that the index of the position of the first synchronization raster is numbered in a direction from a lower boundary to an upper boundary of the target bandwidth. As illustrated in (a) of FIG. 10, assuming that the subcarrier spacing of the PDCCH is 480 kHz, the subcarrier spacing of the SSB is 120 kHz, and the index of the position of the first synchronization raster is 18. As illustrated in (b) of FIG. 10, assuming that the subcarrier spacing of the PDCCH is 120 kHz, the subcarrier spacing of the SSB is 120 kHz, the index of the position of the first synchronization raster is 6. That is, when the subcarrier spacing of the PDCCH is 480 kHz, the third subcarrier spacing is 480 kHz, the position of the first synchronization raster is the seventh position, where the index of the seventh position is 18. When the subcarrier spacing of the PDCCH is 120 kHz, the fourth subcarrier spacing is 120 kHz, the position of the first synchronization raster is the eighth position, where the index of the eighth position is 6. The seventh position with the index of 18 is higher than the eighth position with the index of 6.

Since the bandwidth size of the first channel is related to the subcarrier spacing of the first channel, when multiple subcarrier spacing of the first channel are supported, multiple corresponding bandwidth sizes of the first channel may also be supported. For example, the subcarrier spacing of the first channel is 120 kHz and 480 kHz, and correspondingly, the bandwidth size of the first channel is 69.12 MHz and 276.48 MHz respectively. Here, for example, the associated information of the position of the first synchronization raster in the target bandwidth includes the bandwidth size of the first channel, and reference for this example may be made to FIG. 9 and FIG. 10, which will not be repeatedly described herein.

For example, the associated information of the position of the first synchronization raster in the target bandwidth includes the type of the first channel, where the type of the first channel may be a PDCCH, a PDSCH, etc.

Figure 11:
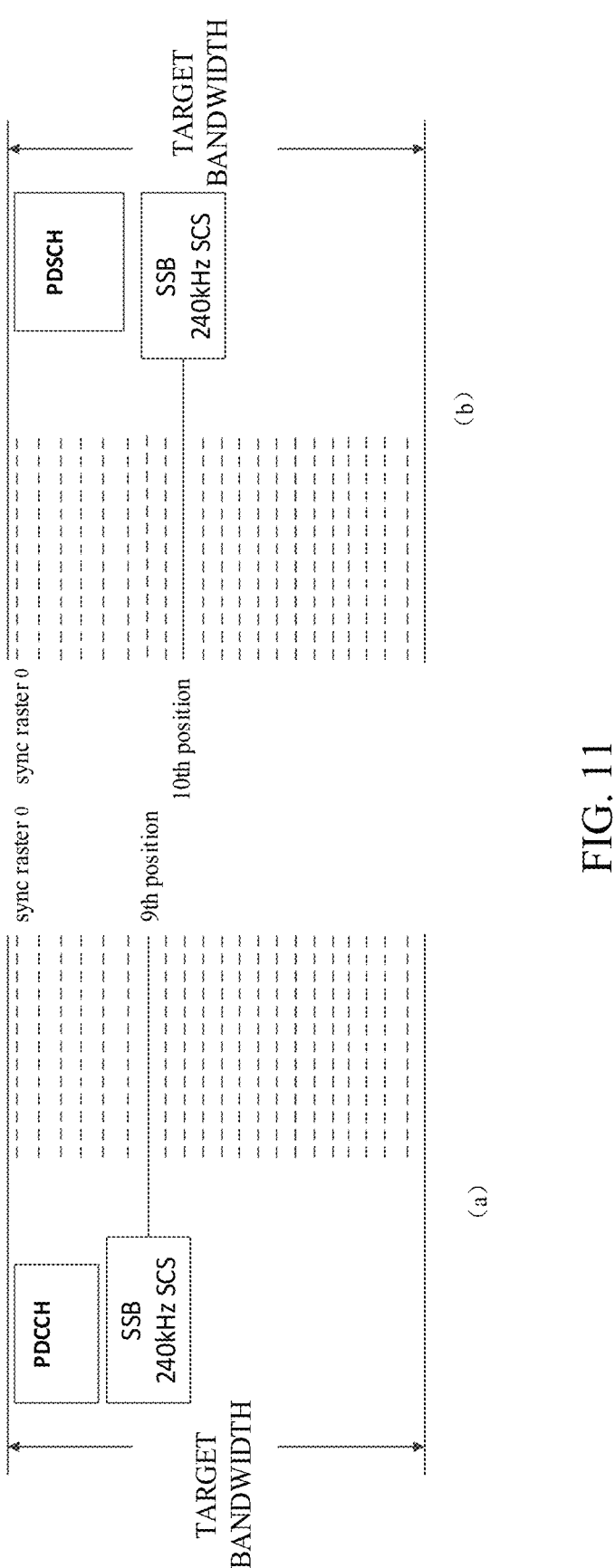

When the type of the first channel is type 1, the position of the first synchronization raster is a ninth position, and when the type of the first channel is type 2, the position of the first synchronization raster is a tenth position different from the ninth position. Assume that the index of the position of the first synchronization raster is numbered in a direction from an upper boundary to a lower boundary of the target bandwidth. As illustrated in (a) of FIG. 11, when the type of the first channel is the PDCCH, the position of the first synchronization raster is the ninth position. As illustrated in (b) of FIG. 11, when the type of the first channel is the PDSCH, the position of the first synchronization raster is the tenth position. The ninth position is different from the tenth position.

Figure 12:
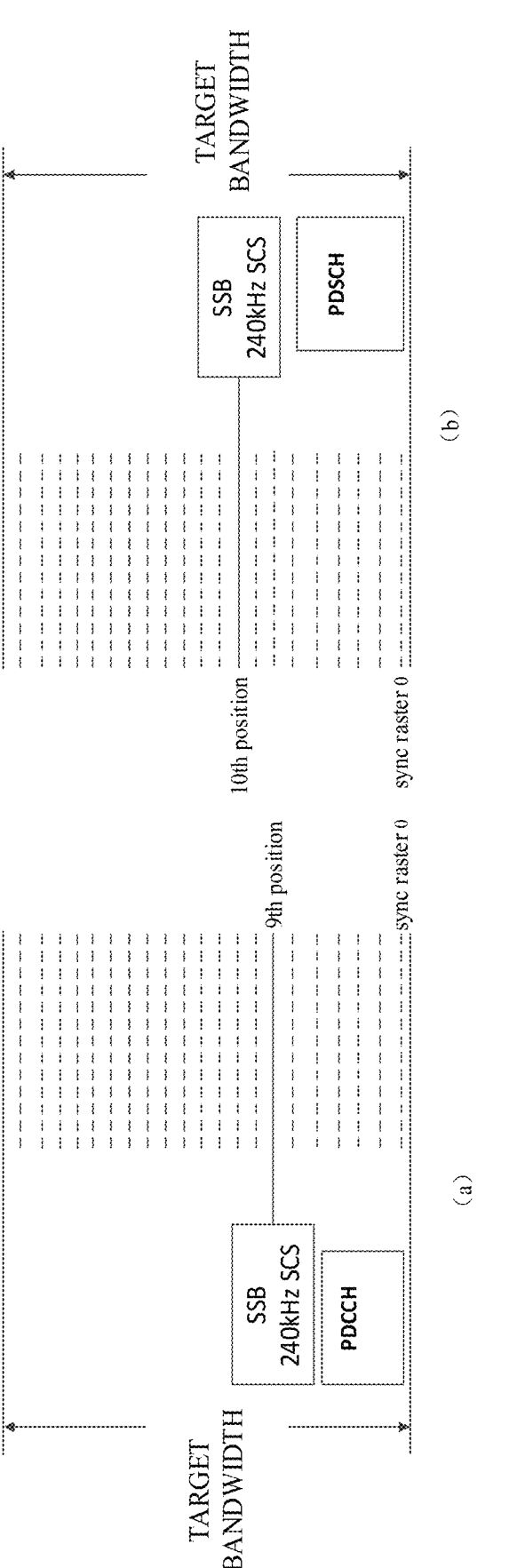

When the type of the first channel is type 1, the position of the first synchronization raster is a ninth position, and when the type of the first channel is type 2, the position of the first synchronization raster is a tenth position different from the ninth position. Assume that the index of the position of the first synchronization raster is numbered in a direction from a lower boundary to an upper boundary of the target bandwidth. As illustrated in (a) of FIG. 12, when the type of the first channel is the PDCCH, the position of the first synchronization raster is the ninth position. As illustrated in (b) of FIG. 12, when the type of the first channel is the PDSCH, the position of the first synchronization raster is the tenth position. The ninth position is different from the tenth position.

For example, the associated information of the position of the first synchronization raster in the target bandwidth includes the number of first channels. The PDCCH is taken as an example of the first channel for description.

When the number of PDCCHs is a fifth value, the position of the first synchronization raster is an eleventh position, and when the number of PDCCHs is a sixth value, the position of the first synchronization raster is a twelfth position different from the eleventh position. The fifth value is greater than the sixth value, and the sixth value is greater than or equal to 0. The eleventh position is lower than the twelfth position. The eleventh position being lower than the twelfth position means that the frequency position of the eleventh position is lower than the frequency position of the twelfth position, and may also be understood as that the value of the GSCN corresponding to the eleventh position is smaller than the value of the GSCN corresponding to the twelfth position. Assume that the index of the position of the first synchronization raster is numbered in a direction from an upper boundary to a lower boundary of the target bandwidth. As illustrated in (a) of FIG. 13, assuming that the number of PDCCHs is 1, the index of the position of the first synchronization raster is 6. As illustrated in (b) of FIG. 13, assuming that the number of PDCCHs is 0, the index of the position of the first synchronization raster is 2. That is, when the number of PDCCHs is the fifth value and the fifth value is 1, the position of the first synchronization raster is the eleventh position and the index of the eleventh position is 6. When the number of PDCCHs is the sixth value and the sixth value is 0, the position of the first synchronization raster is the twelfth position and the index of the twelfth position is 2. The eleventh position with the index of 6 is lower than the twelfth position with the index of 2.

Figure 14:
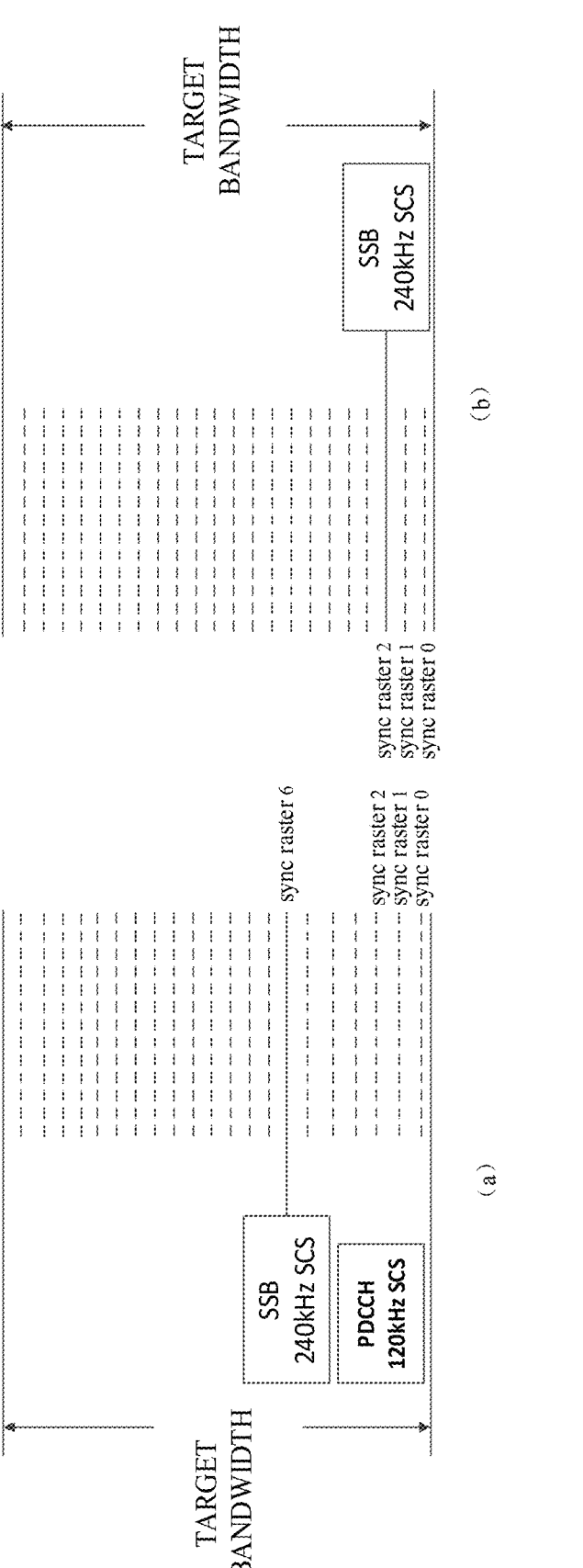

When the number of PDCCHs is a fifth value, the position of the first synchronization raster is an eleventh position, and when the number of PDCCHs is a sixth value, the position of the first synchronization raster is a twelfth position different from the eleventh position. The fifth value is greater than the sixth value, and the sixth value is greater than or equal to 0. The eleventh position is higher than the twelfth position. The eleventh position being higher than the twelfth position means that the frequency position of the eleventh position is higher than the frequency position of the twelfth position, and may also be understood as that the value of the GSCN corresponding to the eleventh position is greater than the value of the GSCN corresponding to the twelfth position. Assume that the index of the position of the first synchronization raster is numbered in a direction from a lower boundary to an upper boundary of the target bandwidth. As illustrated in (a) of FIG. 14, assuming that the number of PDCCHs is 1, the index of the position of the first synchronization raster is 6. As illustrated in (b) of FIG. 14, assuming that the number of PDCCHs is 0, the index of the position of the first synchronization raster is 2. That is, when the number of PDCCHs is the fifth value and the fifth value is 1, the position of the first synchronization raster is the eleventh position and the index of the eleventh position is 6. When the number of PDCCHs is the sixth value and the sixth value is 0, the position of the first synchronization raster is the twelfth position and the index of the twelfth position is 2. The eleventh position with the index of 6 is higher than the twelfth position with the index of 2.

For example, the associated information of the position of the first synchronization raster in the target bandwidth includes the frequency position of the first channel. The PDCCH is taken as an example of the first channel for description.

When the frequency position of the PDCCH is higher than the channel of the SSB, the position of the first synchronization raster is a thirteenth position; and when the frequency position of the PDCCH is lower than the channel of the SSB, the position of the first synchronization raster is a fourteenth position different from the thirteenth position, where the thirteenth position is lower than the fourteenth position. The thirteenth position being lower than the fourteenth position refers to that the frequency position of the thirteenth position is lower than the fourteenth position, and may also be understood as that the value of the GSCN corresponding to the thirteenth position is smaller than the value of the GSCN corresponding to the fourteenth position. Assume that the index of the position of the first synchronization raster is numbered in a direction from an upper boundary to a lower boundary of the target bandwidth. As illustrated in (a) of FIG. 15, when the frequency position of the PDCCH is located above the frequency position of the SSB, the position of the first synchronization raster is the thirteenth position, and the index of the thirteenth position is 6. As illustrated in (b) of FIG. 15, when the frequency position of the PDCCH is located below the frequency position of the SSB, the position of the first synchronization raster is the fourteenth position, and the index of the fourteenth position is 2. The thirteenth position with the index of 6 is lower than the fourteenth position with the first index of 2.

In a possible example, the first channel may be a channel occupied by the control resource set CORESET, and the associated information of the position of the first synchronization raster in the target bandwidth includes information of the first channel. The information of the first channel includes a multiplexing pattern of the CORESET and the SSB, where the multiplexing pattern indicates a time-frequency position relationship between the CORESET and the SSB. The information of the first channel includes a subcarrier spacing of the CORESET and/or a bandwidth size of the CORESET. The first channel is a channel with a frequency position higher than the SSB in the target bandwidth.

The multiplexing pattern of the CORESET and the SSB may include three patterns, which are respectively multiplexing pattern 1, multiplexing pattern 2 and multiplexing pattern 3. In multiplexing pattern 1, time division multiplexing of the SSB and CORESET #0 in the time domain may be as illustrated in FIG. 1C, that is, the SSB and CORESET

0 are located on different symbols in the time domain, and the frequency range of the CORESET #0 should include the SSB. Frequency division multiplexing of the SSB and CORESET #0 in the frequency domain is as illustrated in FIG. 1D.

For example, the associated information of the position of the first synchronization raster in the target bandwidth includes the information of the first channel, where the information of the first channel includes the multiplexing pattern of the CORESET and the SSB.

When the multiplexing pattern of the CORESET and the SSB is multiplexing pattern 2, the position of the first synchronization raster in the target bandwidth is a fifteenth position. When the multiplexing pattern of the CORESET and the SSB is multiplexing pattern 3, the position of the first synchronization raster in the target bandwidth is a sixteenth position. The fifteenth position is different from the sixteenth position.

For example, the associated information of the position of the first synchronization raster in the target bandwidth includes the information of the first channel, where the information of the first channel includes the subcarrier spacing of the CORESET.

Figure 16:
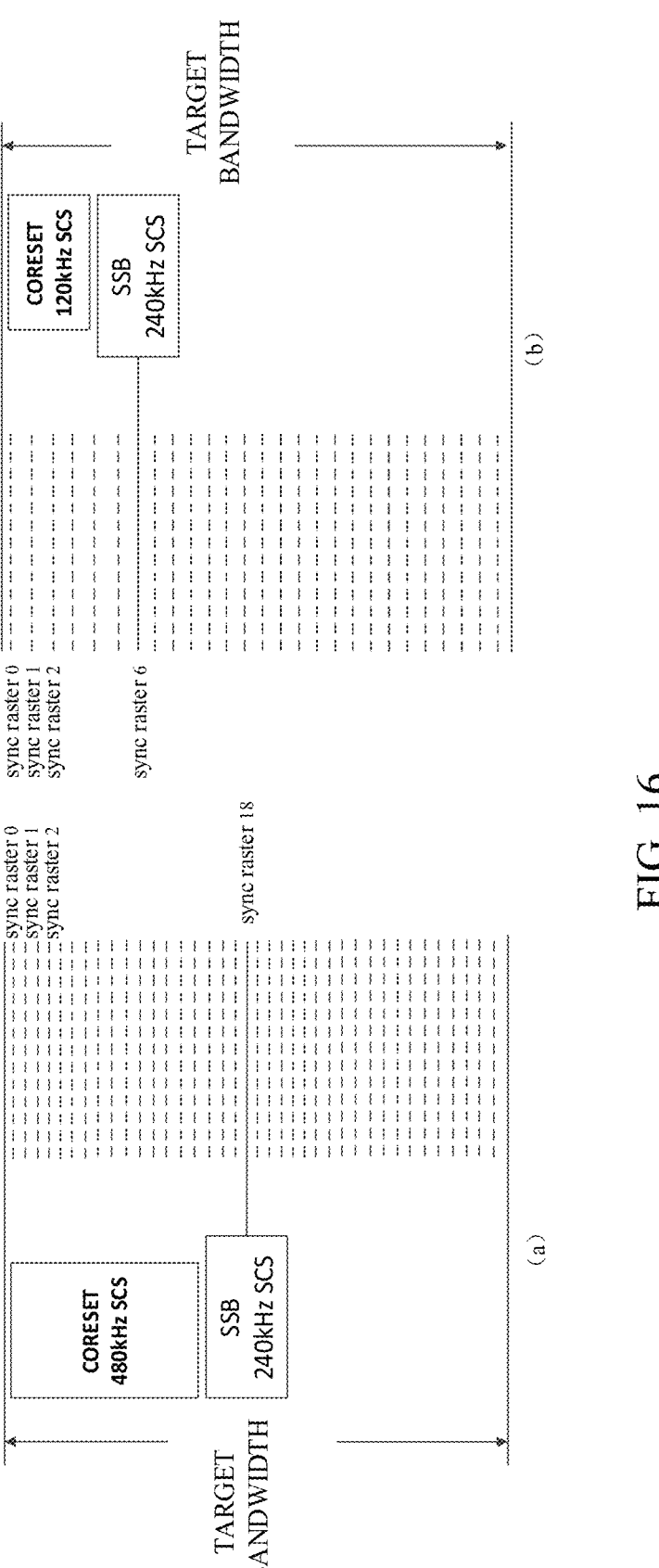

When the subcarrier spacing of the CORESET is a fifth subcarrier spacing, the position of the first synchronization raster in the target bandwidth is a seventeenth position, and when the subcarrier spacing of the CORESET is a sixth subcarrier spacing, the position of the first synchronization raster in the target bandwidth is an eighteenth position. The fifth subcarrier spacing is greater than the sixth subcarrier spacing, and the seventeenth position is lower than the eighteenth position. The seventeenth position being lower than the eighteenth position refers to that the frequency position of the seventeenth position is lower than the frequency position of the eighteenth position, and may also be understood as that the value of the GSCN corresponding to the seventeenth position is smaller than the value of the GSCN corresponding to the eighteenth position. As illustrated in (a) of FIG. 16, assuming the subcarrier spacing of the CORESET is 480 kHz, the subcarrier spacing of the SSB is 120 kHz, and the index of the position of the first synchronization raster is 18. As illustrated in (b) of FIG. 16, assuming that the subcarrier spacing of the CORESET is 120 kHz, the subcarrier spacing of the SSB is 120 kHz, the index of the position of the first synchronization raster is 6. That is, when the subcarrier spacing of the CORESET is 480 kHz, the fifth subcarrier spacing is 480 kHz, the position of the first synchronization raster is the seventeenth position, and the index of the seventeenth position is 18. When the subcarrier spacing of the CORESET is 120 kHz, the fourth subcarrier spacing is 120 kHz, the position of the first synchronization raster is the eighteenth position, and the index of the eighteenth position is 6. The seventeenth position with the index of 18 is lower than the eighteenth position with the index of 6.

Since the bandwidth size of the CORESET is related to the subcarrier spacing of the CORESET, when multiple subcarrier spacing of the CORESET are supported, multiple corresponding bandwidth sizes of the CORESET may also be supported. For example, the subcarrier spacing of the CORESET is 120 kHz and 480 kHz, and correspondingly, the bandwidth size of the CORESET is 69.12 MHz and 276.48 MHz respectively. Here, for example, the associated information of the position of the first synchronization raster in the target bandwidth includes the bandwidth size of the CORESET, and reference for this example may be made to FIG. 16, which will not be repeatedly described herein.

The items included in the associated information of the position of the first synchronization raster in the target bandwidth may be combined with each other, thereby affecting the position of the first synchronization raster in the target bandwidth. Specifically, some examples are given below for description.

For example, the associated information of the position of the first synchronization raster in the target bandwidth includes the subcarrier spacing of the SSB and the size of the reserved bandwidth located at the boundary of the target bandwidth. If the subcarrier spacing of the SSB and the size of the reserved bandwidth located at the boundary of the target bandwidth are a first combination, the position of the first synchronization raster in the target bandwidth is a nineteenth position. If the subcarrier spacing of the SSB and the size of the reserved bandwidth at the boundary of the target bandwidth are a second combination, the position of the first synchronization raster in the target bandwidth is a twentieth position. The nineteenth position is different from the twentieth position. The first combination is a value of the subcarrier spacing of the SSB and a value of the size of the reserved bandwidth at the boundary of the target bandwidth. The second combination is a value of the subcarrier spacing of the SSB and a value of the size of the reserved bandwidth at the boundary of the target bandwidth.

Figure 7:
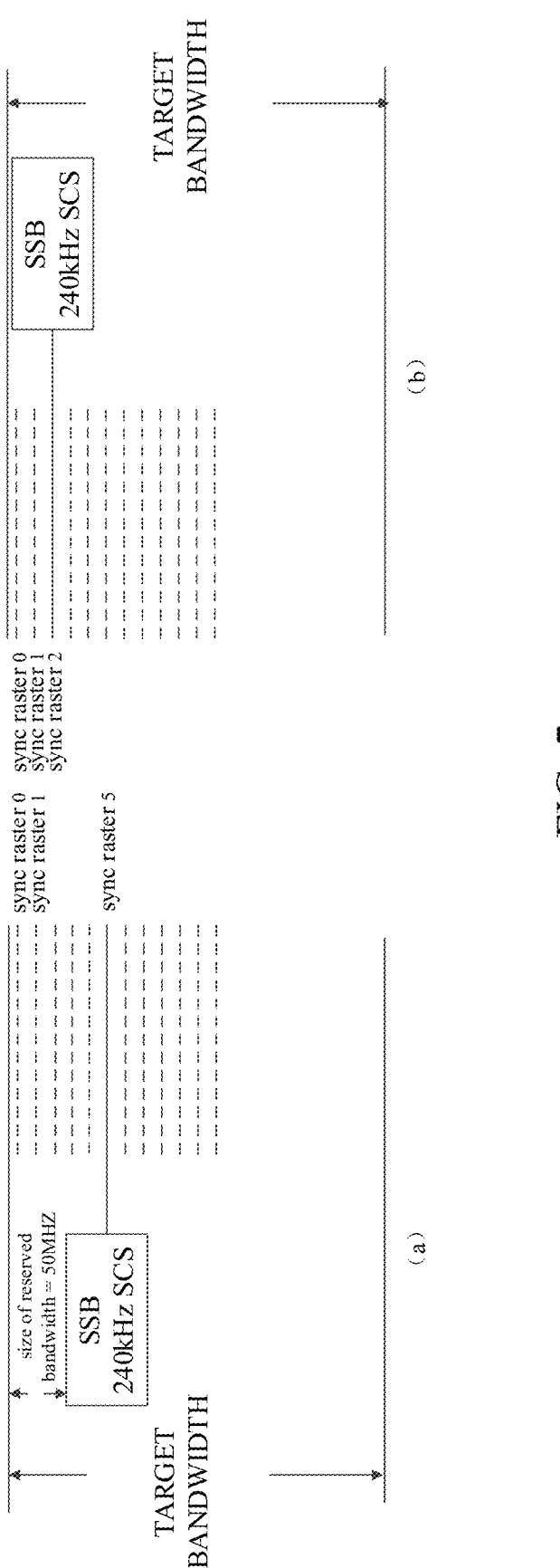

As illustrated in (a) of FIG. 7, when the first combination is the subcarrier spacing of SSB being 240 kHz and the size of the reserved bandwidth at the boundary of the target bandwidth being 50 MHz, the position of the first synchronization raster in the target bandwidth is a nineteenth position, and the index of the nineteenth position is 5. As illustrated in (b) of FIG. 7, when the second combination is the subcarrier spacing of SSB being 240 kHz and the size of the reserved bandwidth at the boundary of the target bandwidth being 0 MHz, the position of the first synchronization raster in the target bandwidth is a twentieth position, and the index of the twentieth position is 2. The nineteenth position with the index of 5 is lower than the twentieth position with the index of 2.

As illustrated FIG. 5, when the first combination is the subcarrier spacing of SSB being 480 kHz and the size of the reserved bandwidth at the boundary of the target bandwidth being 0 MHz, the position of the first synchronization raster in the target bandwidth is a nineteenth position, and the index of the nineteenth position is 5. When the second combination is the subcarrier spacing of SSB being 240 kHz and the size of the reserved bandwidth at the boundary of the target bandwidth being 0 MHz, the position of the first synchronization raster in the target bandwidth is a twentieth position, and the index of the twentieth position is 2. The nineteenth position with the index of 4 is lower than the twentieth position with the index of 2.

Figure 17:
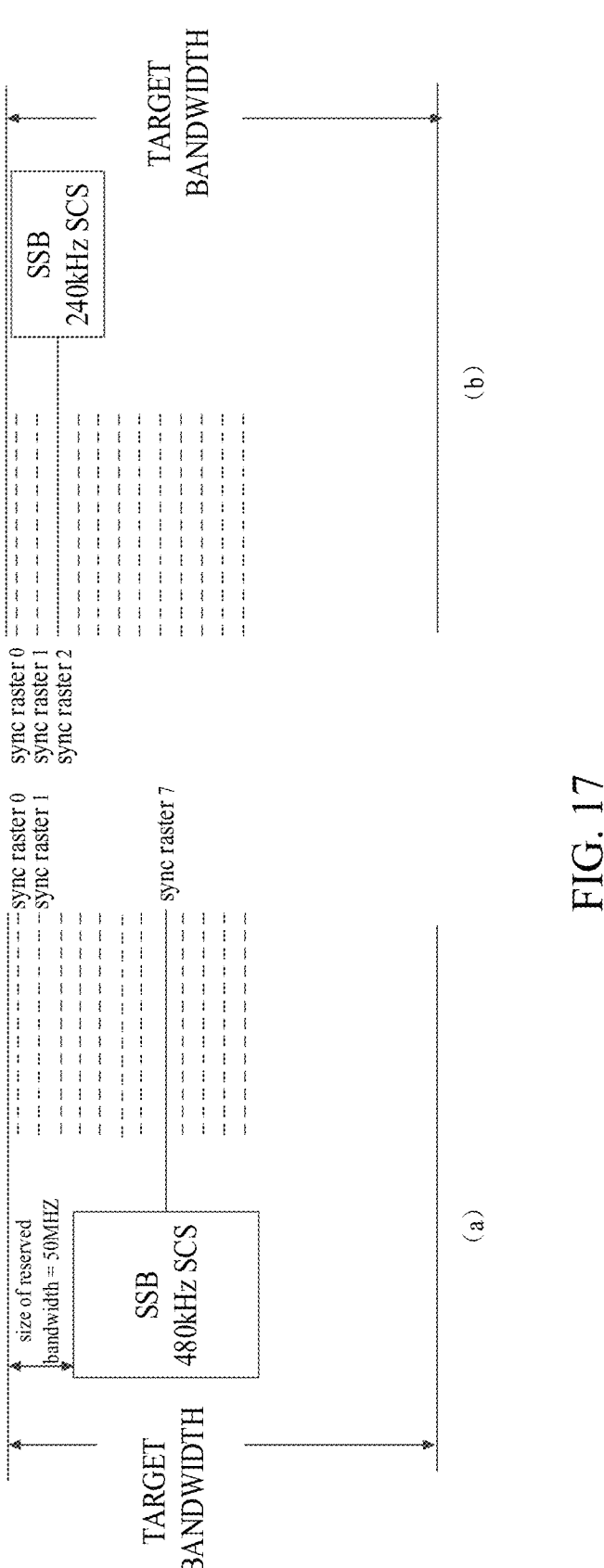

As illustrated in (a) of FIG. 17, when the first combination is the subcarrier spacing of SSB being 480 kHz and the size of the reserved bandwidth at the boundary of the target bandwidth being 50 MHz, the position of the first synchronization raster in the target bandwidth is a nineteenth position, and the index of the nineteenth position is 7. When the second combination is the subcarrier spacing of SSB being 240 kHz and the size of the reserved bandwidth at the boundary of the target bandwidth being 0 MHz, the position of the first synchronization raster in the target bandwidth is a twentieth position, and the index of the twentieth position is 2. The nineteenth position with the index of 7 is lower than the twentieth position with the index of 2.

For example, the associated information of the position of the first synchronization raster in the target bandwidth includes the subcarrier spacing of the SSB and the subcarrier spacing of the first channel. If the subcarrier spacing of the SSB and the subcarrier spacing of the first channel are a third combination, the position of the first synchronization raster in the target bandwidth is a twenty-first position. If the subcarrier spacing of the SSB and the subcarrier spacing of the first channel are a fourth combination, the position of the first synchronization raster in the target bandwidth is a twenty-second position. The twenty-first position is different from the twenty-second position. The third combination is a value of the subcarrier spacing of the SSB and a value of the subcarrier spacing of the first channel. The fourth combination is a value of the subcarrier spacing of the SSB and a value of the subcarrier spacing of the first channel. The PDCCH is taken as an example of the first channel for description.

Figure 9:
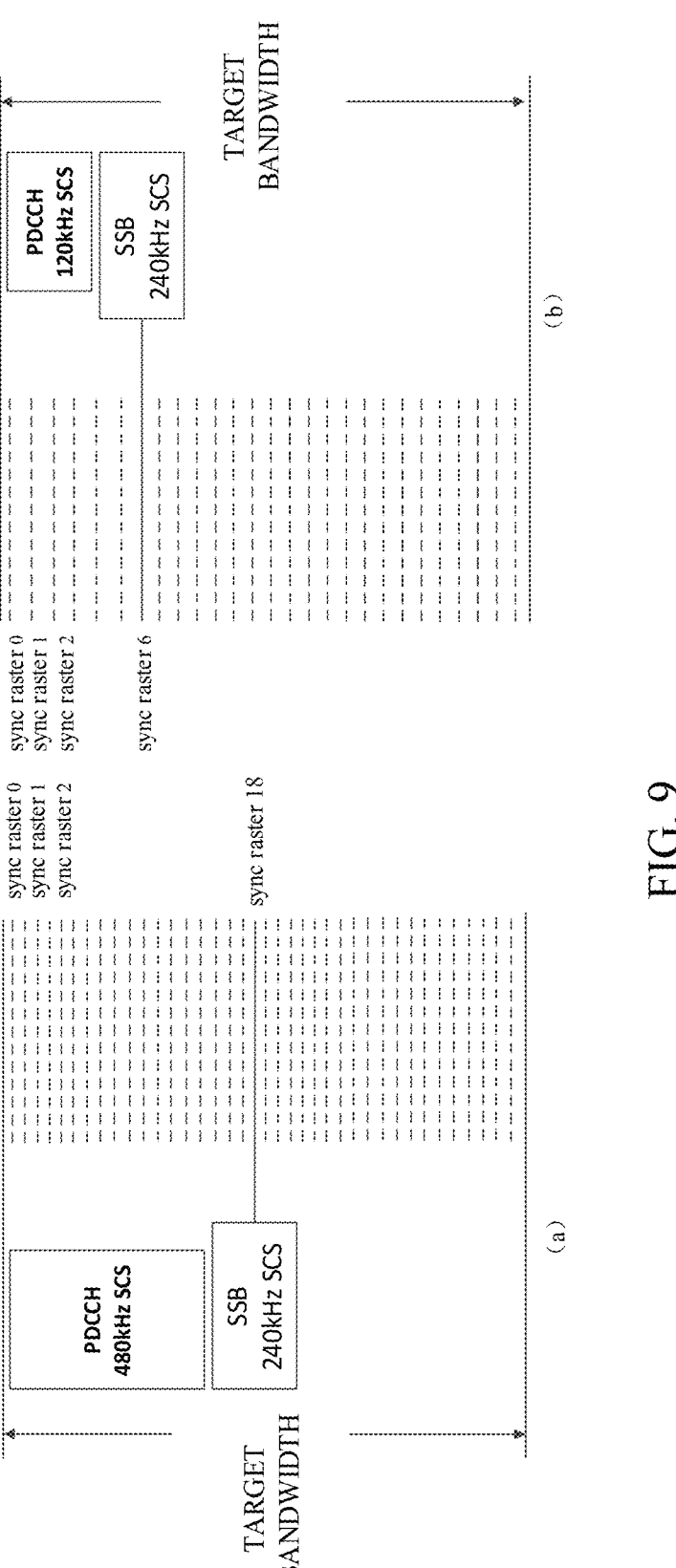

As illustrated in (a) of FIG. 9, when the third combination is the subcarrier spacing of the SSB being 240 kHz and the subcarrier spacing of the PDCCH being 480 kHz, the position of the first synchronization raster in the target bandwidth is the twenty-first position, and the index of the twenty-first position is 18. As illustrated in (b) of FIG. 9, when the fourth combination is the subcarrier spacing of the SSB being 240 kHz and the subcarrier spacing of PDCCH being 120 kHz, the position of the first synchronization raster in the target bandwidth is the twenty-second position, and the index of the twenty-second position is 6. The twenty-first position with the index of 18 is lower than the twenty-second position with the index of 6.

Figure 18:
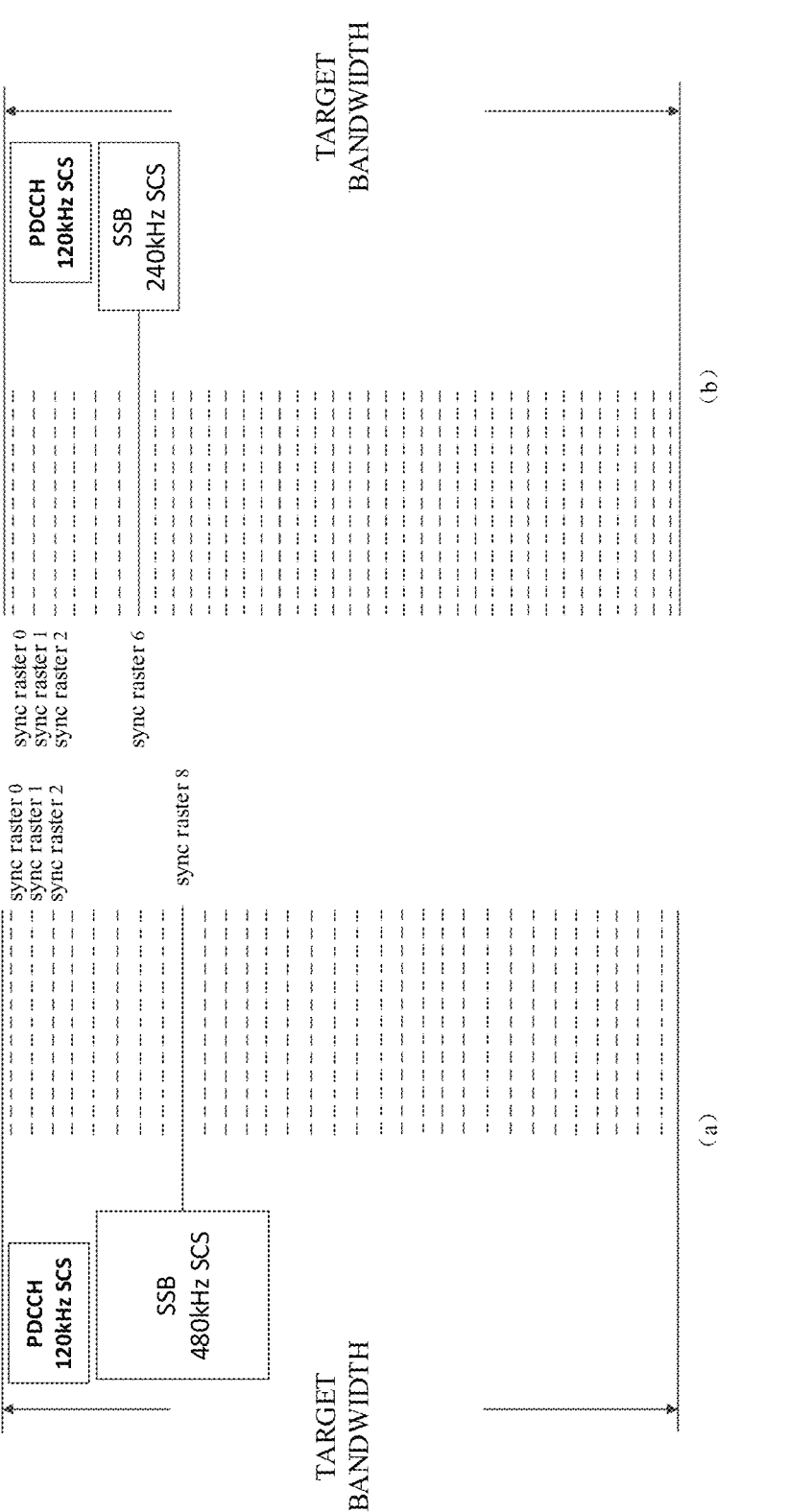

As illustrated in (a) of FIG. 18, when the third combination is the subcarrier spacing of the SSB being 480 kHz and the subcarrier spacing of the PDCCH being 120 kHz, the position of the first synchronization raster in the target bandwidth is the twenty-first position, and the index of the twenty-first position is 8. As illustrated in (b) of FIG. 18, when the fourth combination is the subcarrier spacing of the SSB being 240 kHz and the subcarrier spacing of the PDCCH being 120 kHz, the position of the first synchronization raster in the target bandwidth is the twenty-second position, and the index of the twenty-second position is 6. The twenty-first position with the index of 8 is lower than the twenty-second position with the index of 6.

Figure 19:
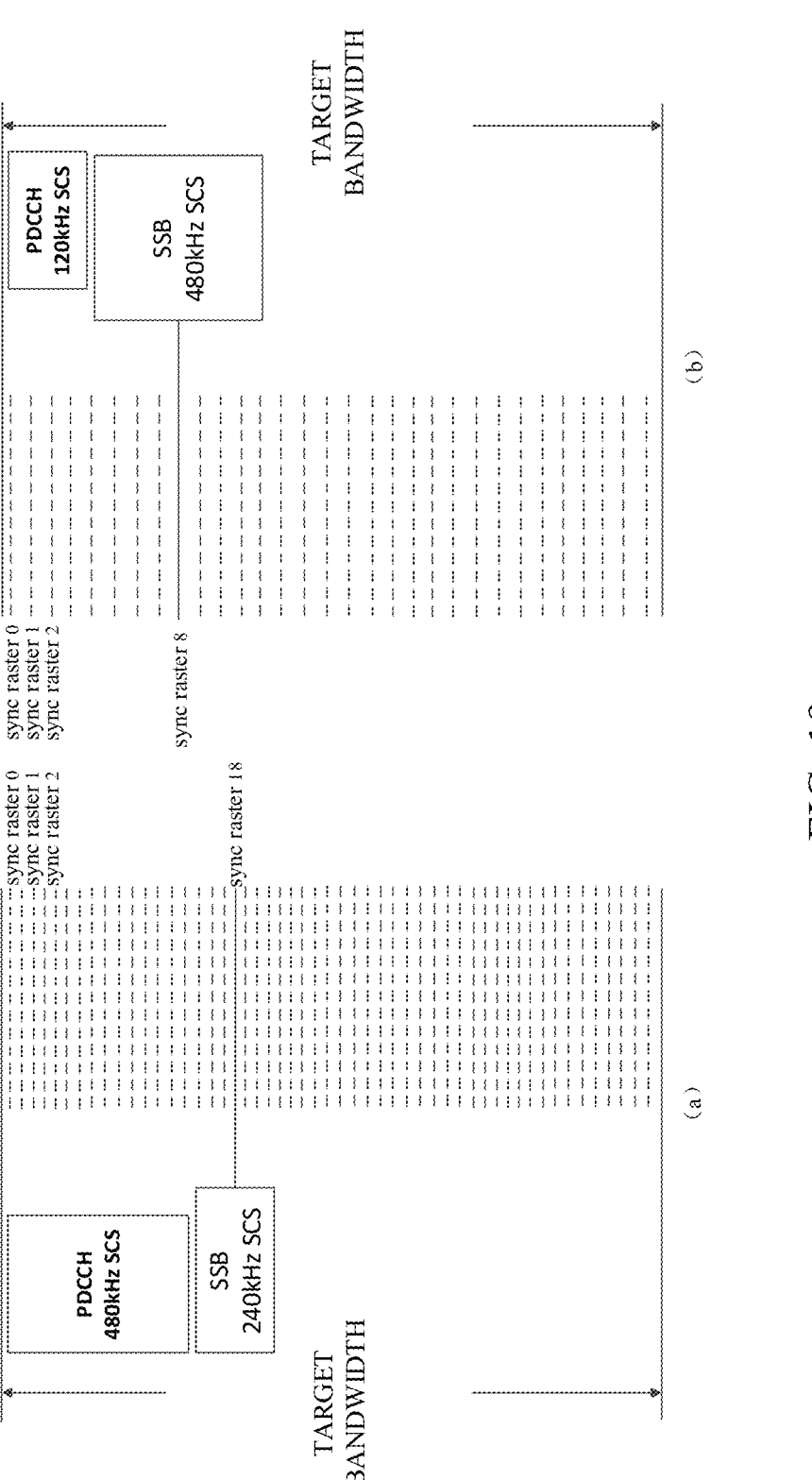

As illustrated in (a) of FIG. 19, when the third combination is the subcarrier spacing of the SSB being 480 kHz and the subcarrier spacing of the PDCCH being 240 kHz, the position of the first synchronization raster in the target bandwidth is the twenty-first position, and the index of the twenty-first position is 18. As illustrated in (b) of FIG. 19, when the fourth combination is the subcarrier spacing of the SSB being 120 kHz and the subcarrier spacing of the PDCCH being 480 kHz, the position of the first synchronization raster in the target bandwidth is the twenty-second position, and the index of the twenty-second position is 8. The twenty-first position with the index of 18 is lower than the twenty-second position with the index of 8.

For example, the associated information of the position of the first synchronization raster in the target bandwidth includes the subcarrier spacing of the SSB and the bandwidth size of the first channel, where the bandwidth size of the first channel is related to the subcarrier spacing of the first channel. Specifically, reference may be made to FIGS. 9, 18 and 19, which will not be repeated herein.

For example, the associated information of the position of the first synchronization raster in the target bandwidth includes the subcarrier spacing of the SSB and the type of the first channel. If the subcarrier spacing of the SSB and the type of the first channel are a fifth combination, the position of the first synchronization raster in the target bandwidth is a twenty-third position. If the subcarrier spacing of the SSB and the type of the first channel are a sixth combination, the position of the first synchronization raster in the target bandwidth is a twenty-fourth position different from the twenty-third position.

Figure 20:
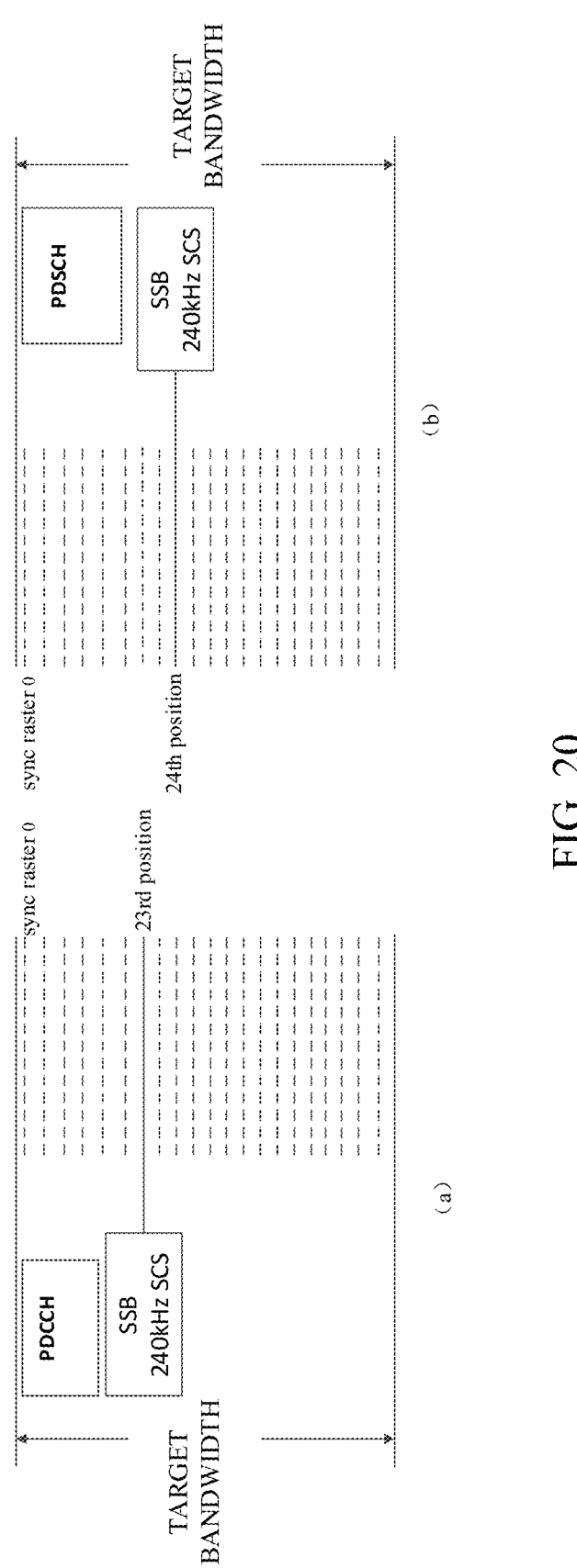

As illustrated in (a) of FIG. 20, when the fifth combination is the subcarrier spacing of the SSB being 240 kHz and the type of the first channel being the PDCCH, the position of the first synchronization raster in the target bandwidth is the twenty-third position. As illustrated in (b) in FIG. 20, when the sixth combination is the subcarrier spacing of the SSB being 240 kHz and the type of the first channel being the PDSCH, the position of the first synchronization raster in the target bandwidth is the twenty-fourth position different from the twenty-third position.

Figure 21:
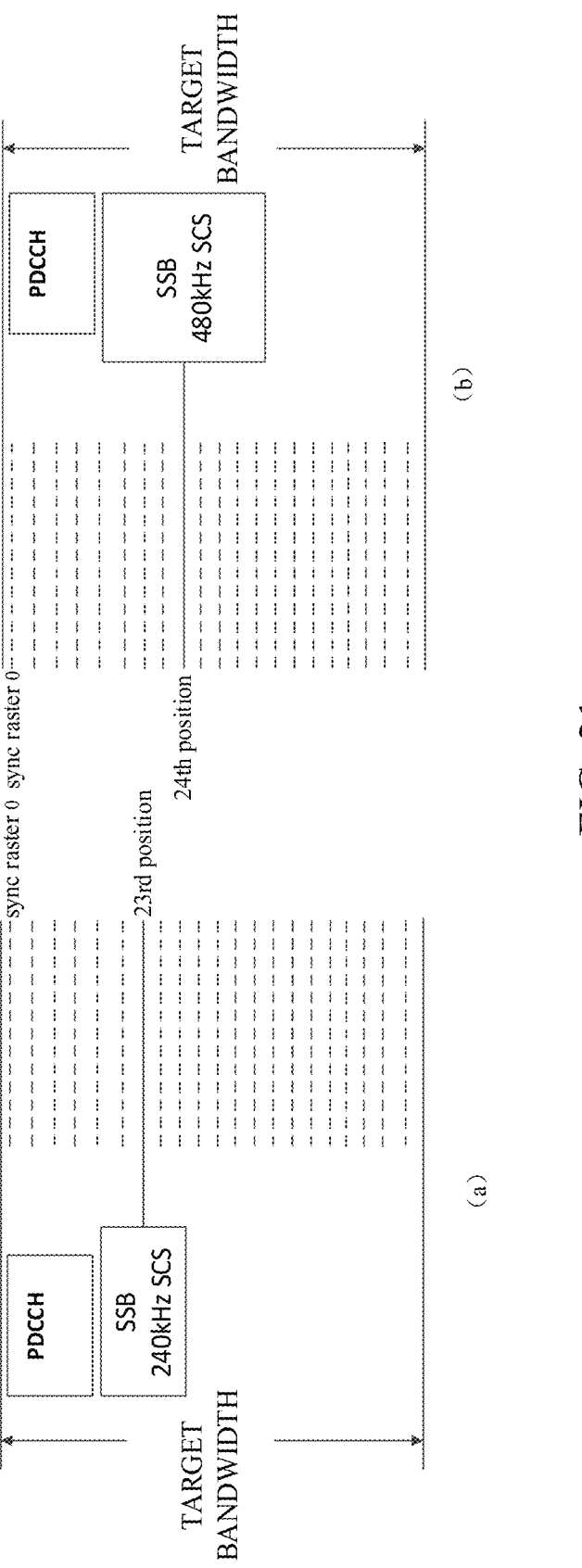

As illustrated in part (a) of FIG. 21, when the fifth combination is the subcarrier spacing of the SSB being 240 kHz and the type of the first channel being the PDCCH, the position of the first synchronization raster in the target bandwidth is the twenty-third position. As illustrated in (b) in FIG. 21, when the sixth combination is the subcarrier spacing of the SSB being 480 kHz and the type of the first channel being the PDCCH, the position of the first synchronization raster in the target bandwidth is the twenty-fourth position different from the twenty-third position.

Figure 22:
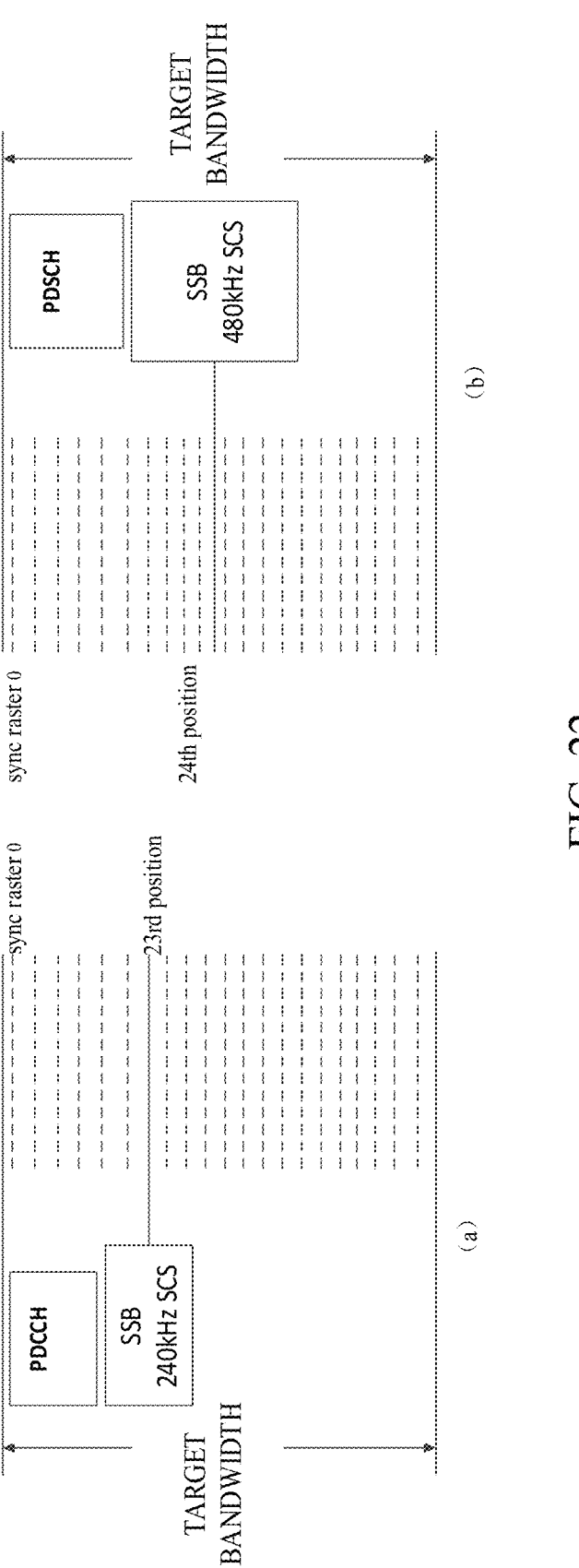

As illustrated in part (a) of FIG. 22, when the fifth combination is the subcarrier spacing of the SSB being 240 kHz and the type of the first channel being the PDCCH, the position of the first synchronization raster in the target bandwidth is the twenty-third position. As illustrated in (b) in FIG. 22, when the sixth combination is the subcarrier spacing of the SSB being 480 kHz and the type of the first channel being the PDSCH, the position of the first synchronization raster in the target bandwidth is the twenty-fourth position different from the twenty-third position.

For example, the associated information of the position of the first synchronization raster in the target bandwidth includes the subcarrier spacing of the SSB and the number of the first channels. If the subcarrier spacing of the SSB and the number of the first channels are a seventh combination, the position of the first synchronization raster in the target bandwidth is a twenty-fifth position. If the subcarrier spacing of the SSB and the number of the first channels are an eighth combination, the position of the first synchronization raster in the target bandwidth is a twenty-sixth position. The twenty-fifth position is different from the twenty-sixth position. The seventh combination is a value of the subcarrier spacing of the SSB and a value of the number of the first channels. The eighth combination is a value of the subcarrier spacing of the SSB and a value of the number of the first channels. The PDCCH is taken as an example of the first channel for description.

Figure 13:
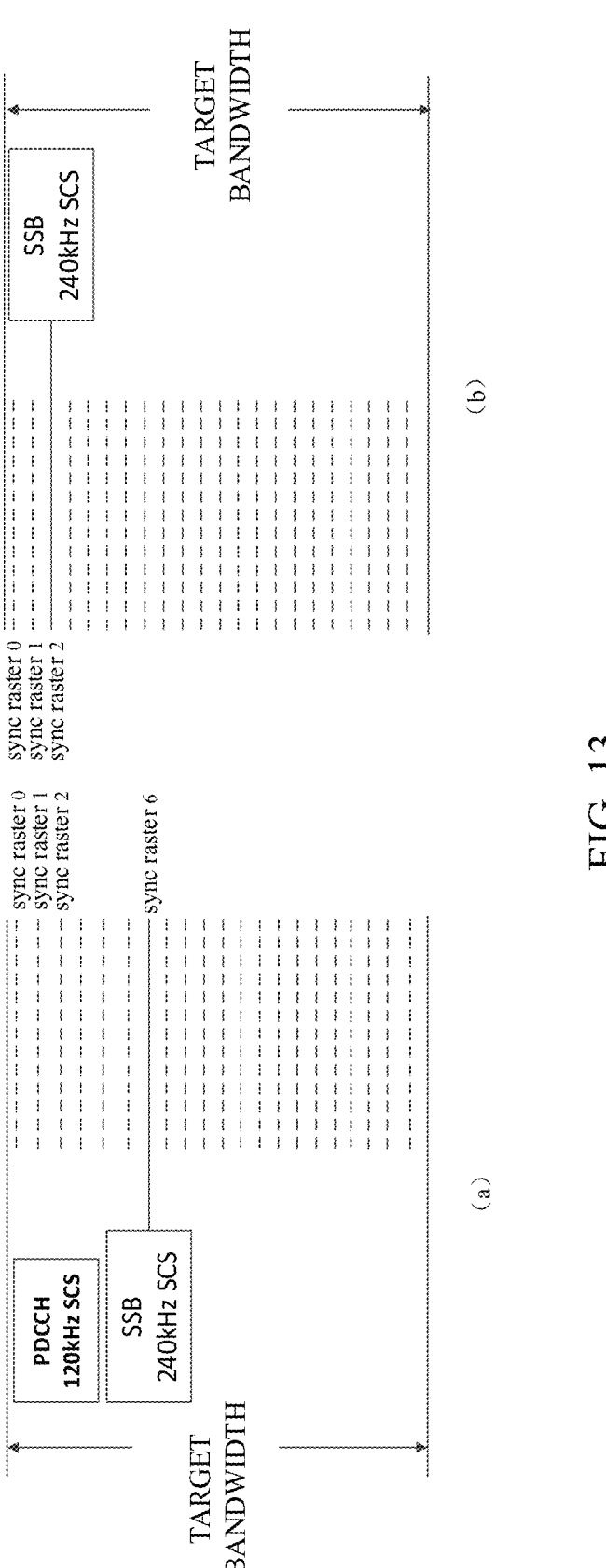

As illustrated in (a) of FIG. 13, when the seventh combination is the subcarrier spacing of the SSB being 240 kHz and the number of first channels being 1, the position of the first synchronization raster in the target bandwidth is the twenty-fifth position, and the index of the twenty-fifth position is 6. As illustrated in (b) of FIG. 13, when the eighth combination is the subcarrier spacing of the SSB being 240 kHz and the number of first channels being 0, the position of the first synchronization raster in the target bandwidth is the twenty-sixth position, and the index of the twenty-sixth position is 2. The twenty-fifth position with the index of 6 is different from the twenty-sixth position with the index of 2.

As illustrated in FIG. 5, when the seventh combination is the subcarrier spacing of the SSB being 480 kHz and the number of first channels being 0, the position of the first synchronization raster in the target bandwidth is the twenty-fifth position, and the index of the twenty-fifth position is 4. When the eighth combination is the subcarrier spacing of the SSB being 240 kHz and the number of first channels being 0, the position of the first synchronization raster in the target bandwidth is the twenty-sixth position, and the index of the twenty-sixth position is 2. The twenty-fifth position with the index of 4 is different from the twenty-sixth position with the index of 2.

Figure 23:
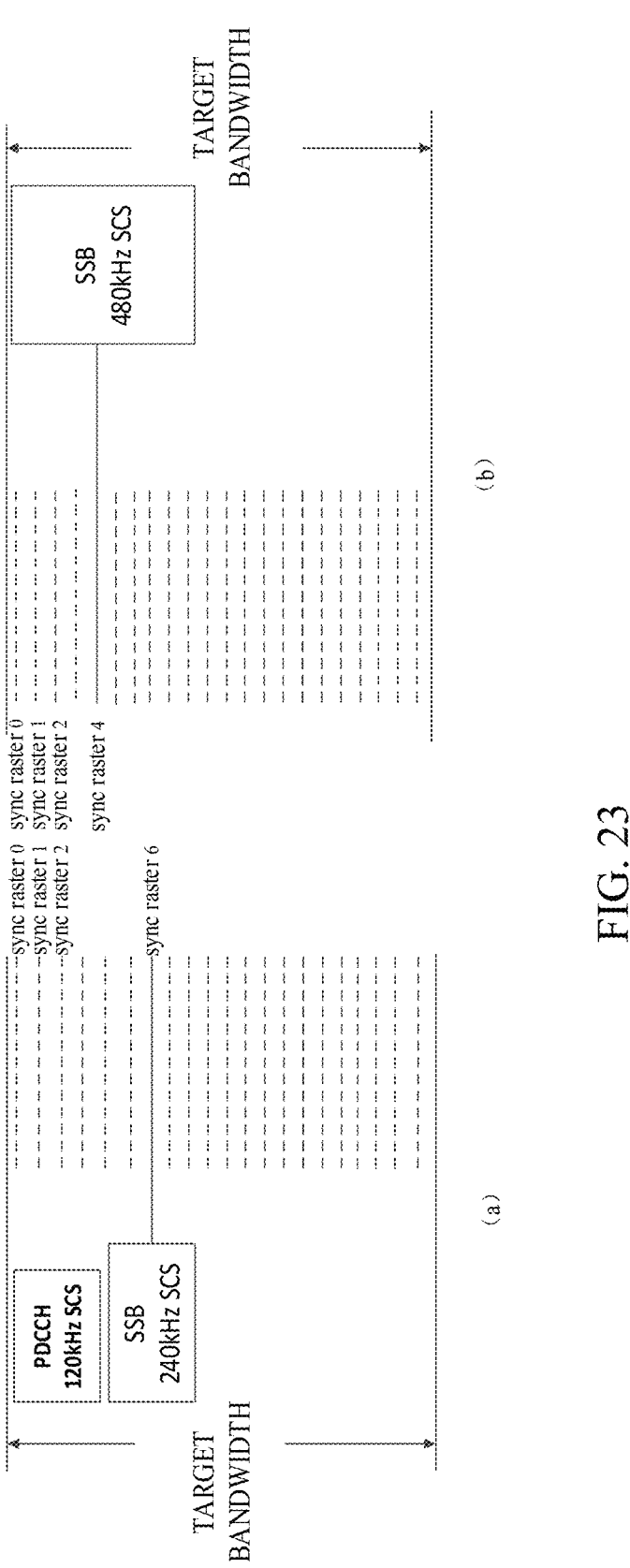

As illustrated in (a) of FIG. 23, when the seventh combination is the subcarrier spacing of the SSB being 240 kHz and the number of first channels being 1, the position of the first synchronization raster in the target bandwidth is the twenty-fifth position, and the index of the twenty-fifth position is 6. As illustrated in (b) of FIG. 13, when the eighth combination is the subcarrier spacing of the SSB being 480 kHz and the number of first channels being 0, the position of the first synchronization raster in the target bandwidth is the twenty-sixth position, and the index of the twenty-sixth position is 4. The twenty-fifth position with the index of 6 is different from the twenty-sixth position with the index of 4.

For example, the associated information of the position of the first synchronization raster in the target bandwidth includes the subcarrier spacing of the SSB and the frequency position of the first channel. If the subcarrier spacing of the SSB and the frequency position of the first channel are a ninth combination, the position of the first synchronization raster in the target bandwidth is a twenty-seventh position. If the subcarrier spacing of the SSB and the frequency position of the first channel are a tenth combination, the position of the first synchronization raster in the target bandwidth is a twenty-eighth position. The twenty-seventh position is different from the twenty-eighth position. The PDCCH is taken as an example of the first channel for description.

Figure 15:
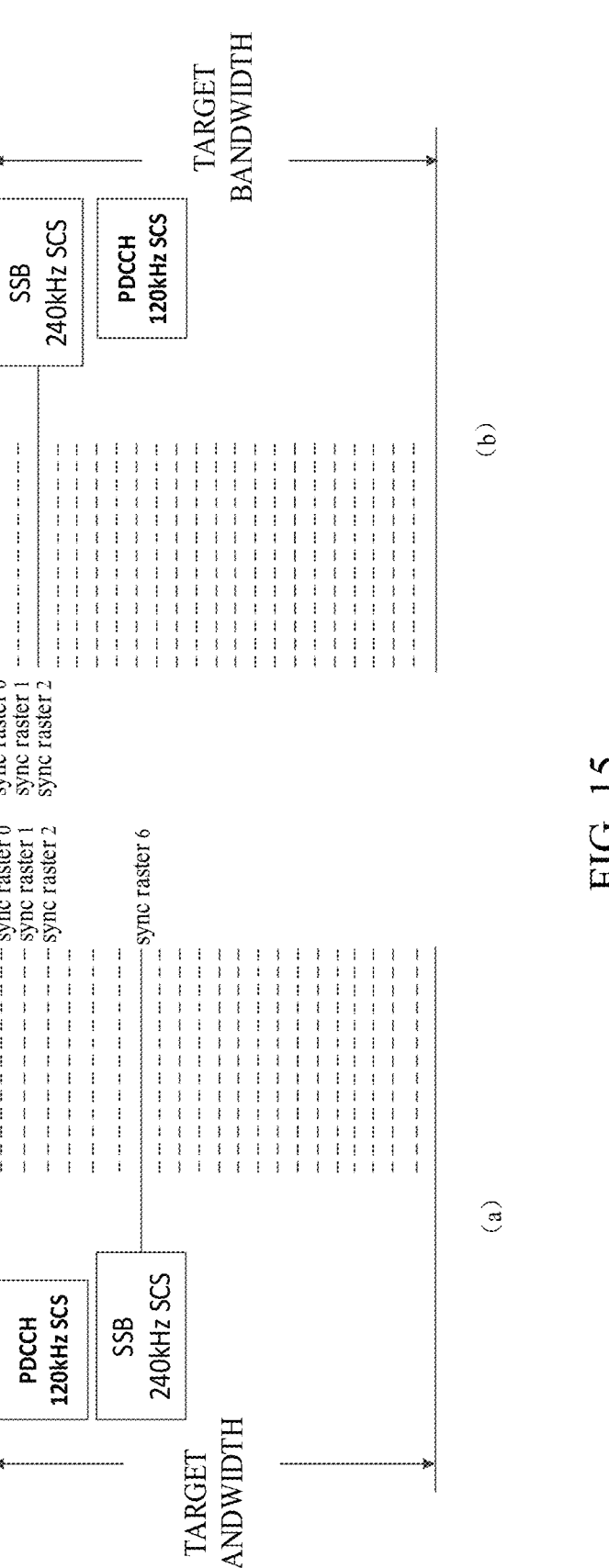

As illustrated in (a) of FIG. 15, when the ninth combination is the subcarrier spacing of the SSB being 240 kHz and the frequency position of the PDCCH being higher than that of the channel of the SSB, the position of the first synchronization raster in the target bandwidth is the twenty-seventh position, and the index of the twenty-seventh position is 6. As illustrated in (b) of FIG. 15, when the tenth combination is the subcarrier spacing of the SSB being 240 kHz and the frequency position of the PDCCH being lower than that of the channel of the SSB, the position of the first synchronization raster in the target bandwidth is the twenty-eighth position, and the index of the twenty-eighth position is 2. The twenty-seventh position is different from the twenty-eighth position.

Figure 24:
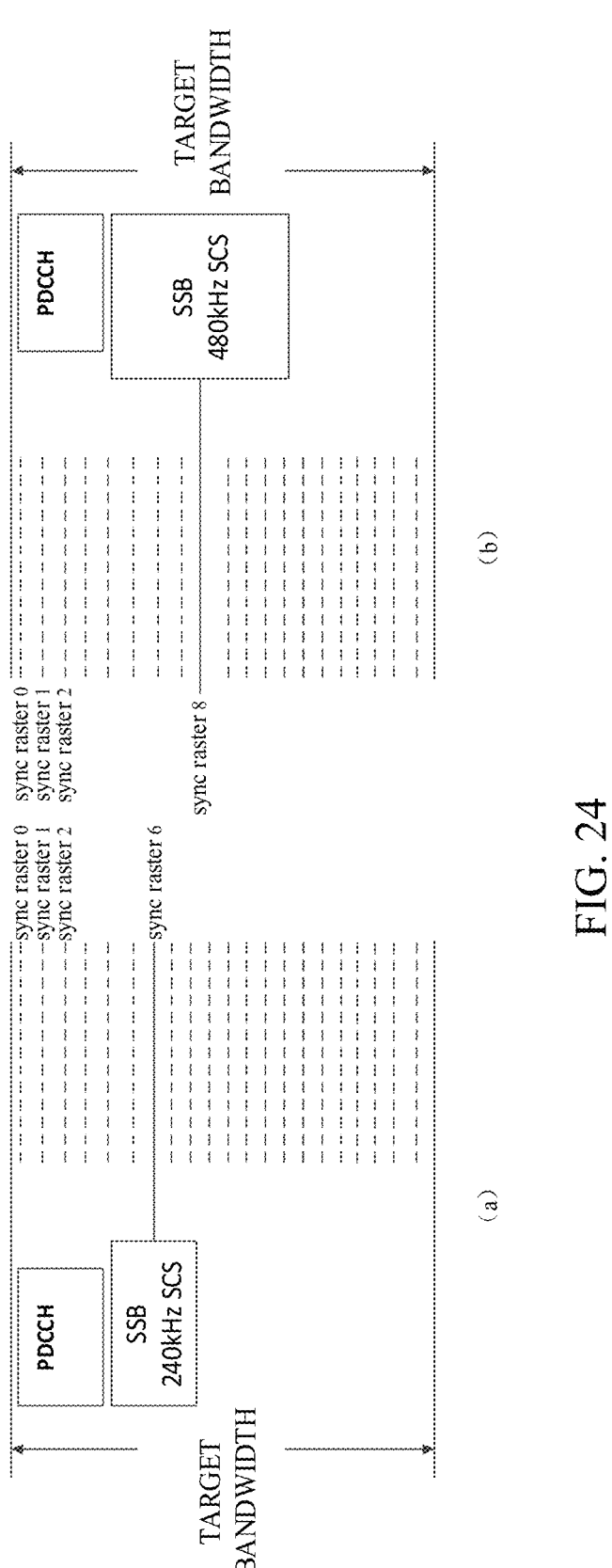

As illustrated in (a) of FIG. 24, when the ninth combination is the subcarrier spacing of the SSB being 240 kHz and the frequency position of the PDCCH being higher than that of the channel of the SSB, the position of the first synchronization raster in the target bandwidth is the twenty-seventh position, and the index of the twenty-seventh position is 6. As illustrated in (b) of FIG. 24, when the tenth combination is the subcarrier spacing of the SSB being 480 kHz and the frequency position of the PDCCH being higher than that of the channel of the SSB, the position of the first synchronization raster in the target bandwidth is the twenty-eighth position, and the index of the twenty-eighth position is 8. The twenty-seventh position is different from the twenty-eighth position.

Figure 25:
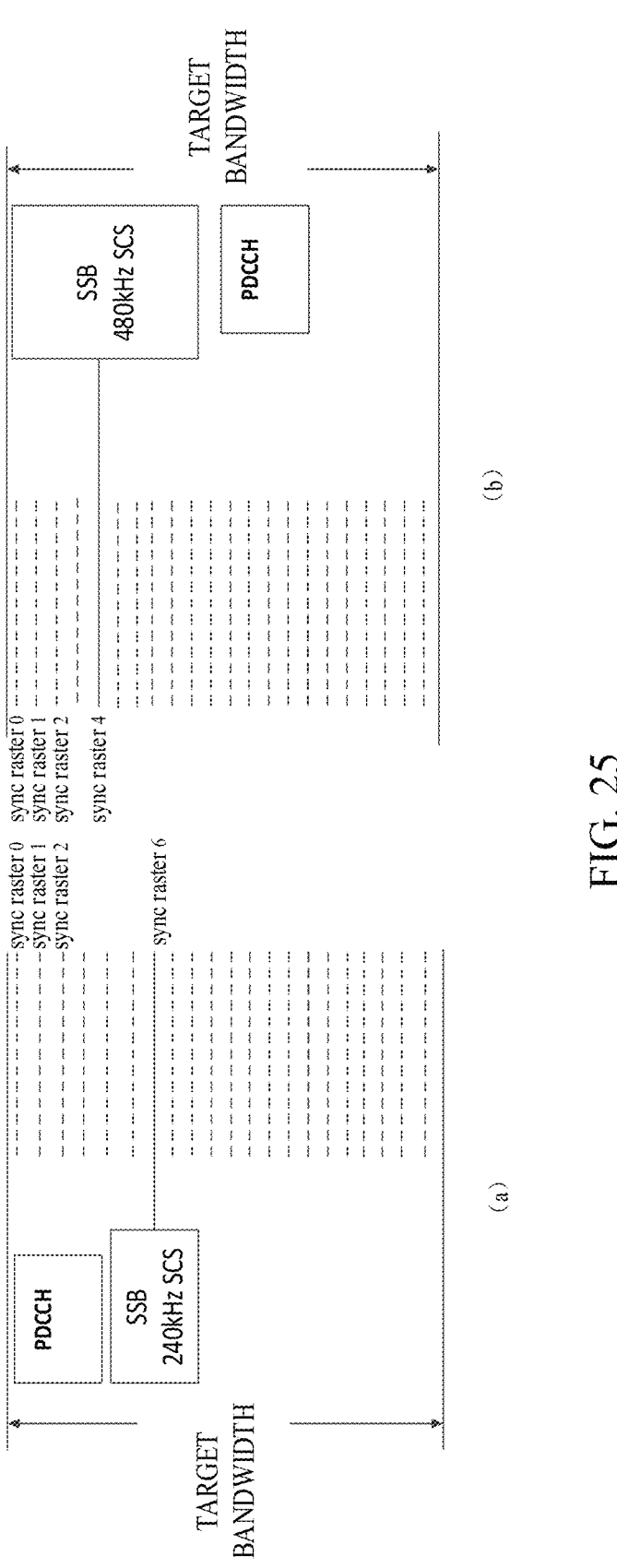

As illustrated in (a) of FIG. 25, when the ninth combination is the subcarrier spacing of the SSB being 240 kHz and the frequency position of the PDCCH being higher than that of the channel of the SSB, the position of the first synchronization raster in the target bandwidth is the twenty-seventh position, and the index of the twenty-seventh position is 6. As illustrated in (b) of FIG. 25, when the tenth combination is the subcarrier spacing of the SSB being 480 kHz and the frequency position of the PDCCH being lower than that of the channel of the SSB, the position of the first synchronization raster in the target bandwidth is the twenty-eighth position, and the index of the twenty-eighth position is 4. The twenty-seventh position is different from the twenty-eighth position.

For example, the associated information of the position of the first synchronization raster in the target bandwidth includes the subcarrier spacing of the SSB and the subcarrier spacing of the CORESET. If the subcarrier spacing of the SSB and the subcarrier spacing of the CORESET are an eleventh combination, the position of the first synchronization raster in the target bandwidth is a twenty-ninth position. If the subcarrier spacing of the SSB and the subcarrier spacing of the CORESET are a twelfth combination, the position of the first synchronization raster in the target bandwidth is a thirtieth position. The twenty-ninth position is different from the thirtieth position.

Figure 26:
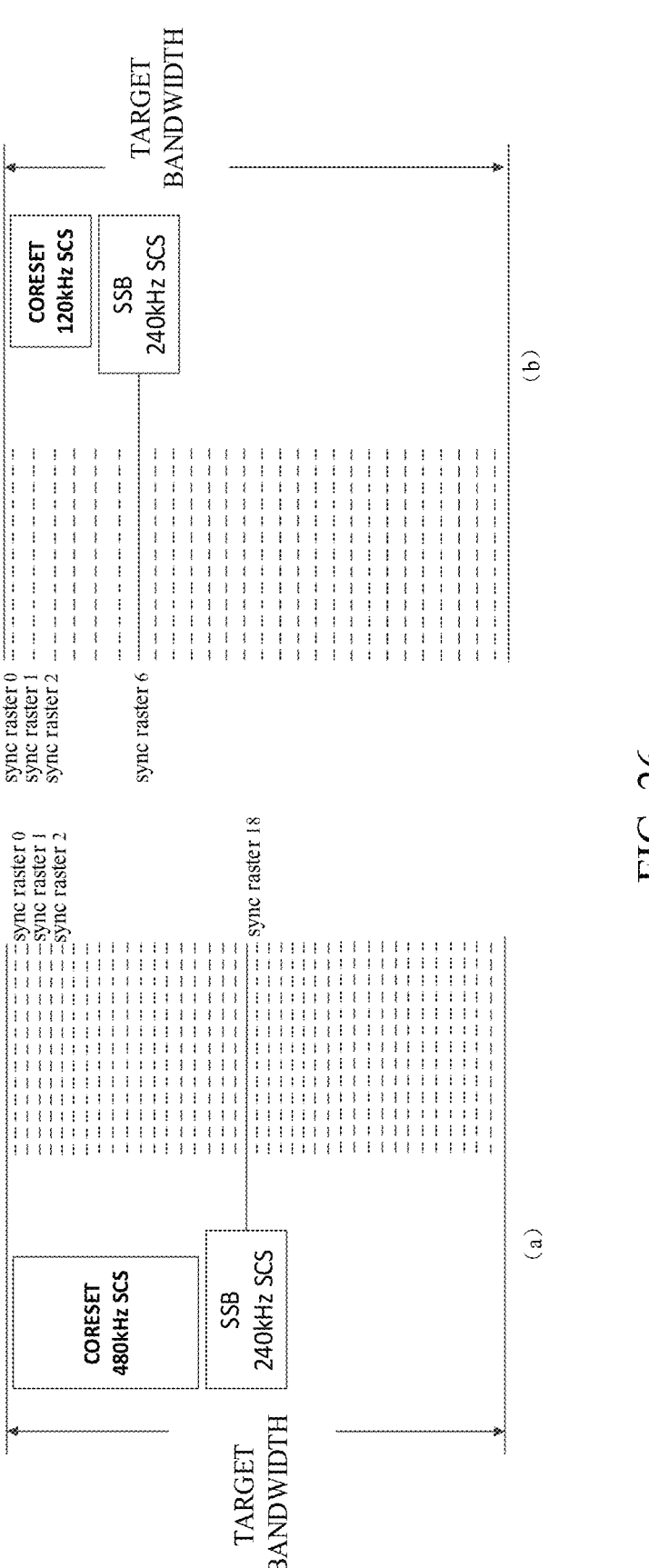

As illustrated in (a) of FIG. 26, when the eleventh combination is the subcarrier spacing of the SSB being 240 kHz and the subcarrier spacing of the CORESET being 480 kHz, the position of the first synchronization raster in the target bandwidth is the twenty-ninth position, and the index of the twenty-ninth position is 18. As illustrated in (b) of FIG. 26, when the twelfth combination is the subcarrier spacing of the SSB being 120 kHz and the subcarrier spacing of the CORESET being 240 kHz, the position of the first synchronization raster in the target bandwidth is the thirtieth position, and the index of the thirtieth position is 6. The twenty-ninth position is different from the thirtieth position.

Figure 27:
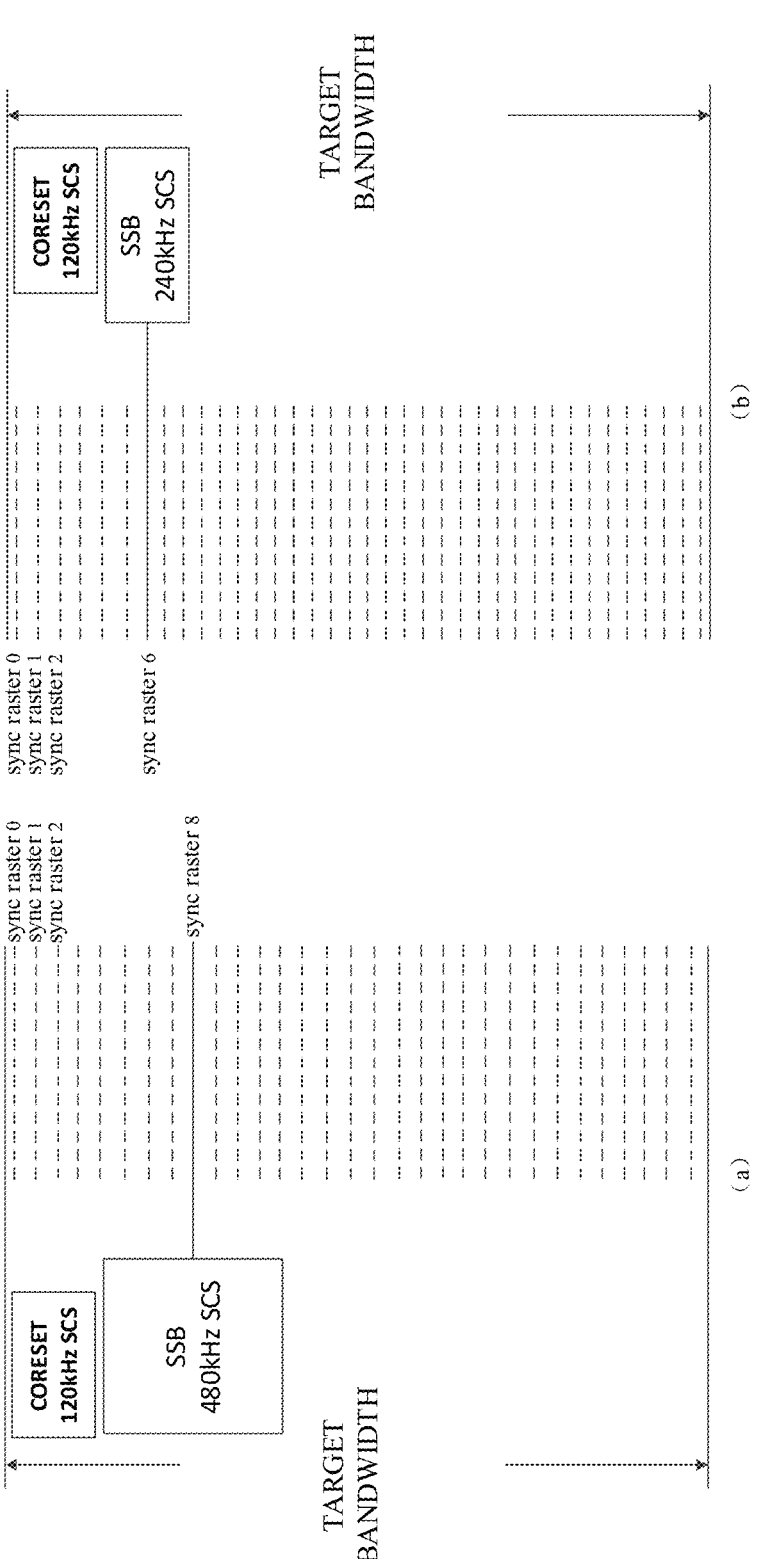

As illustrated in (a) of FIG. 27, when the eleventh combination is the subcarrier spacing of the SSB being 480 kHz and the subcarrier spacing of the CORESET being 120 kHz, the position of the first synchronization raster in the target bandwidth is the twenty-ninth position, and the index of the twenty-ninth position is 8. As illustrated in (b) of FIG. 27, when the twelfth combination is the subcarrier spacing of the SSB being 240 kHz and the subcarrier spacing of the CORESET being 120 kHz, the position of the first synchronization raster in the target bandwidth is the thirtieth position, and the index of the thirtieth position is 6. The twenty-ninth position is different from the thirtieth position.

Figure 28:
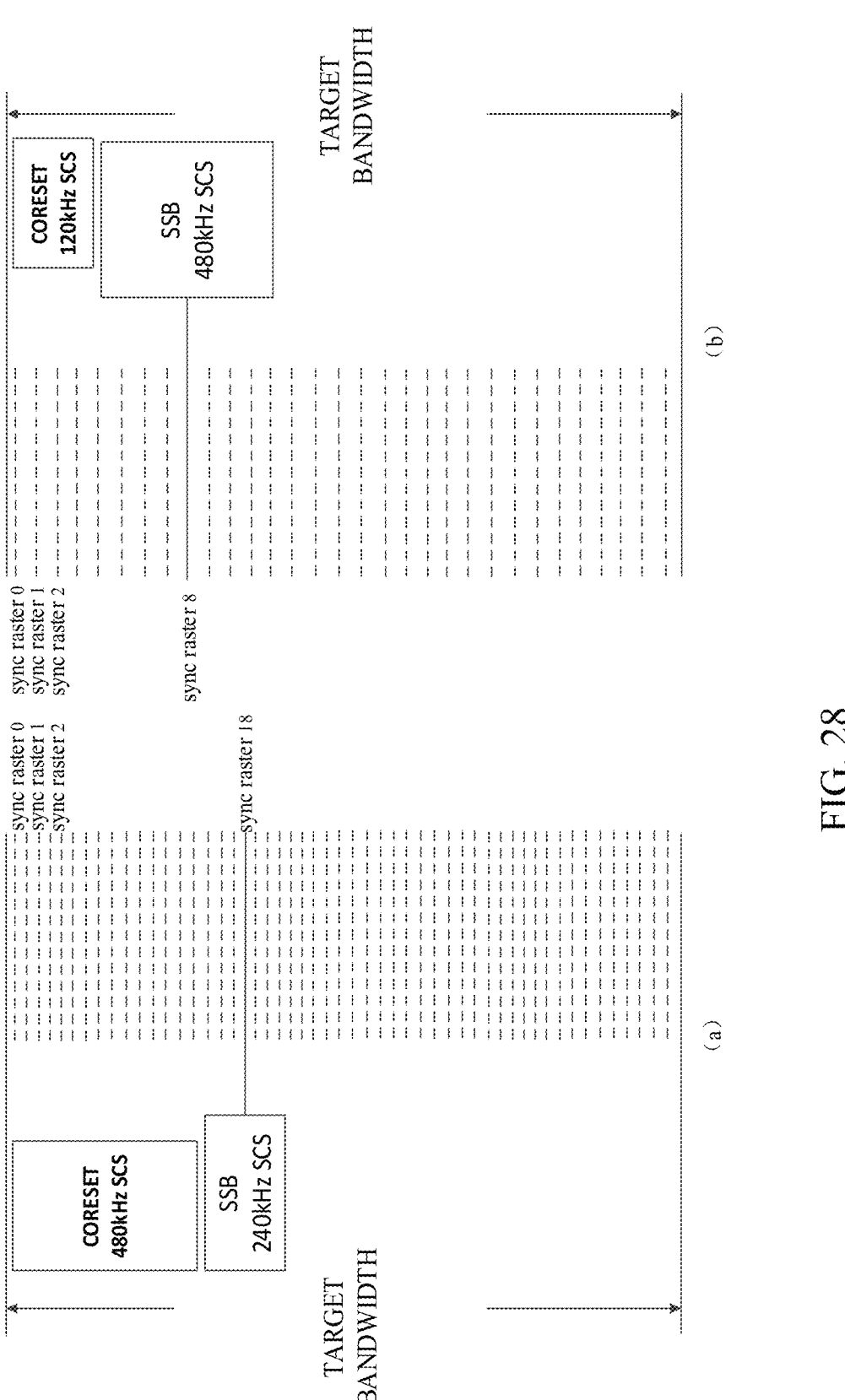

As illustrated in (a) of FIG. 28, when the eleventh combination is the subcarrier spacing of the SSB being 240 kHz and the subcarrier spacing of the CORESET being 480 kHz, the position of the first synchronization raster in the target bandwidth is the twenty-ninth position, and the index of the twenty-ninth position is 18. As illustrated in (b) of FIG. 28, when the twelfth combination is the subcarrier spacing of the SSB being 480 kHz and the subcarrier spacing of the CORESET being 120 kHz, the position of the first synchronization raster in the target bandwidth is the thirtieth position, and the index of the thirtieth position is 8. The twenty-ninth position is different from the thirtieth position.

Since the bandwidth size of the CORESET is related to the subcarrier spacing of the CORESET, for the example of the associated information of the position of the first synchronization raster in the target bandwidth including the subcarrier spacing of the SSB and the bandwidth size of the CORESET, reference may be made to the above example of the associated information of the position of the first synchronization raster in the target bandwidth including the subcarrier spacing of the SSB and the subcarrier spacing of the CORESET.

Since the size of target bandwidth is related to the subcarrier spacing of the SSB, for an example of the associated information of the position of the first synchronization raster in the target bandwidth including the size of the target bandwidth and the size of the reserved bandwidth at the boundary of the target bandwidth, reference may be made to the above example of the associated information of the position of the first synchronization raster in the target bandwidth including the subcarrier spacing of the SSB and the size of the reserved bandwidth at the boundary of the target bandwidth, which will not be repeated herein. For an example of the associated information of the position of the first synchronization raster in the target bandwidth including the size of the target bandwidth and the subcarrier spacing of the first channel, reference may be made to the above example of the associated information of the position of the first synchronization raster in the target bandwidth including the subcarrier spacing of the SSB and the subcarrier spacing of the first channel, which will not be repeated herein. For an example of the associated information of the position of the first synchronization raster in the target bandwidth including the size of the target bandwidth and the type of the first channel, reference may be made to the above example of the associated information of the position of the first synchronization raster in the target bandwidth including the subcarrier spacing of the SSB and the type of the first channel, which will not be repeated herein. For an example of the associated information of the position of the first synchronization raster in the target bandwidth including the size of the target bandwidth and the number of the first channels, reference may be made to the above example of the associated information of the position of the first synchronization raster in the target bandwidth including the subcarrier spacing of the SSB and the number of the first channels, which will not be repeated herein. For an example of the associated information of the position of the first synchronization raster in the target bandwidth including the size of the target bandwidth and the frequency position of the first channel, reference may be made to the above example of the associated information of the position of the first synchronization raster in the target bandwidth including the subcarrier spacing of the SSB and the frequency position of the first channel, which will not be repeated herein.

For example, the associated information of the position of the first synchronization raster in the target bandwidth includes the size of the reserved bandwidth and the subcarrier spacing of the first channel. If the size of the reserved bandwidth and the subcarrier spacing of the first channel is a thirteenth combination, the position of the first synchronization raster in the target bandwidth is a thirty-first position. If the size of the reserved bandwidth and the subcarrier spacing of the first channel are a fourteenth combination, the position of the first synchronization raster in the target bandwidth is a thirty-second position. The thirty-first position is different from the thirty-second position. The PDCCH is taken as an example of the first channel for description.

Figure 29:
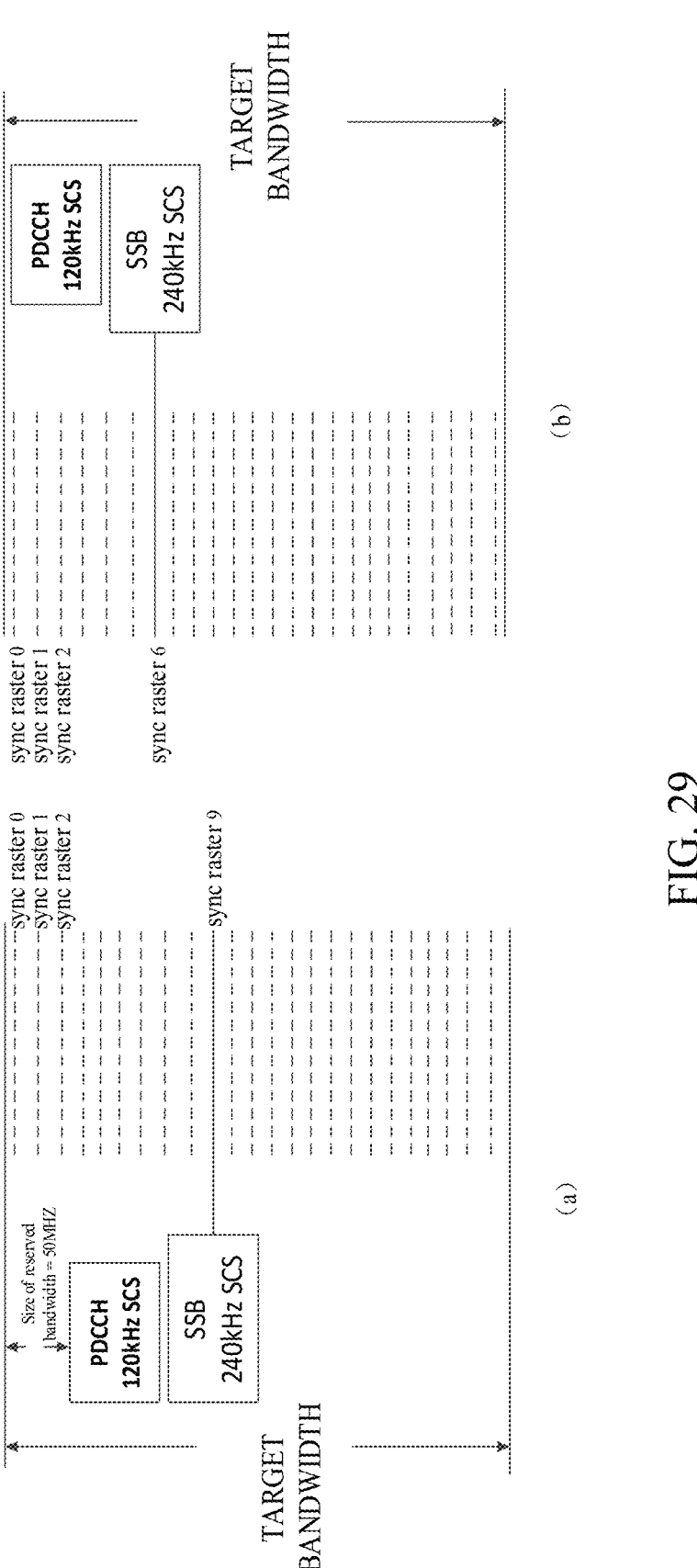

As illustrated in (a) of FIG. 29, when the thirteenth combination is the size of the reserved bandwidth being 50 MHz and the subcarrier spacing of the PDCCH being 120 kHz, the position of the first synchronization raster in the target bandwidth is the thirty-first position, and the index of the thirty-first position is 9. As illustrated in (b) of FIG. 29, when the fourteenth combination is the size of reserved bandwidth being 0 MHz and the subcarrier spacing of the PDCCH being 120 kHz, the position of the first synchronization raster in the target bandwidth is the thirty-second position, and the index of the thirty-second position is 6. The thirty-first position is different from the thirty-second position.

Figure 30:
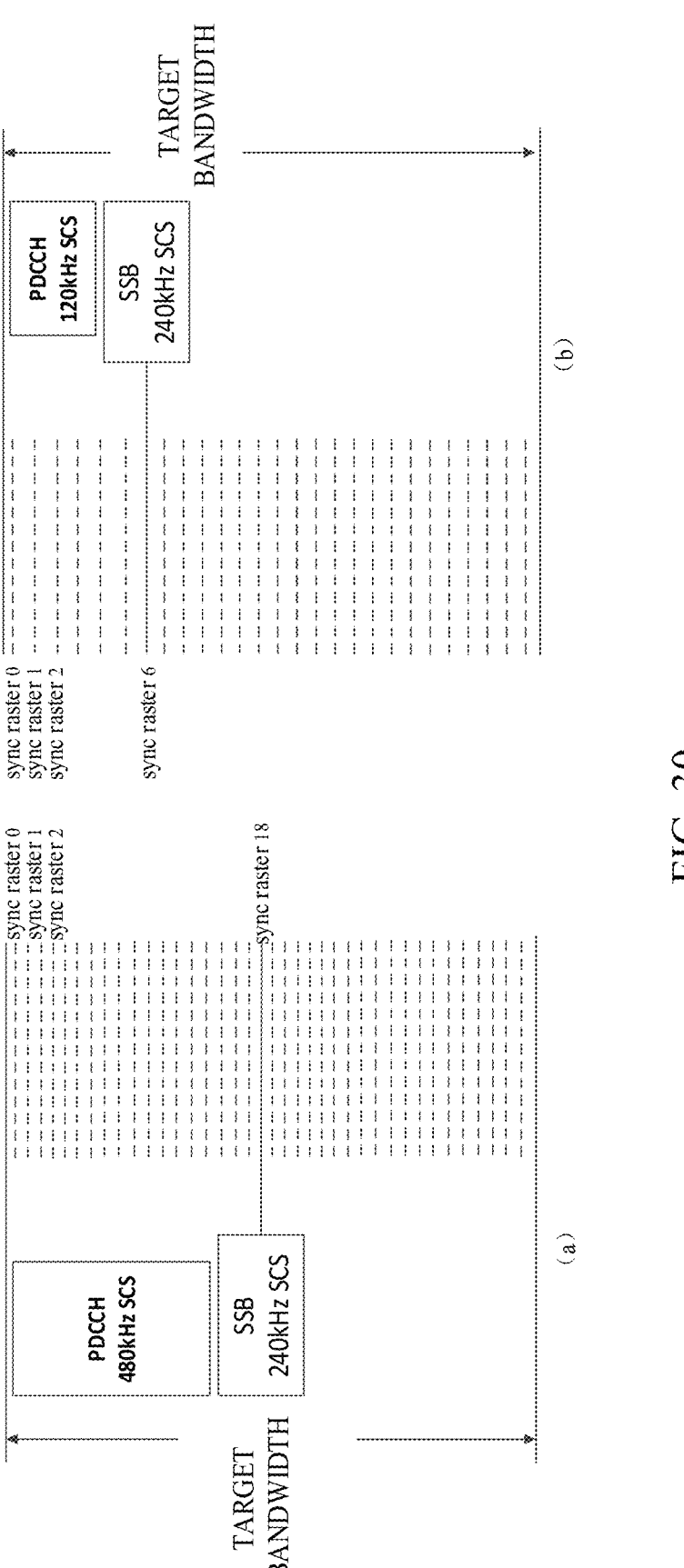

As illustrated in (a) of FIG. 30, when the thirteenth combination is the size of the reserved bandwidth being 0 MHz and the subcarrier spacing of the PDCCH being 480 kHz, the position of the first synchronization raster in the target bandwidth is the thirty-first position, and the index of the thirty-first position is 18. As illustrated in (b) of FIG. 30, when the fourteenth combination is the size of reserved bandwidth being 0 MHz and the subcarrier spacing of the PDCCH being 120 kHz, the position of the first synchronization raster in the target bandwidth is the thirty-second position, and the index of the thirty-second position is 6. The thirty-first position is different from the thirty-second position.

Figure 31:
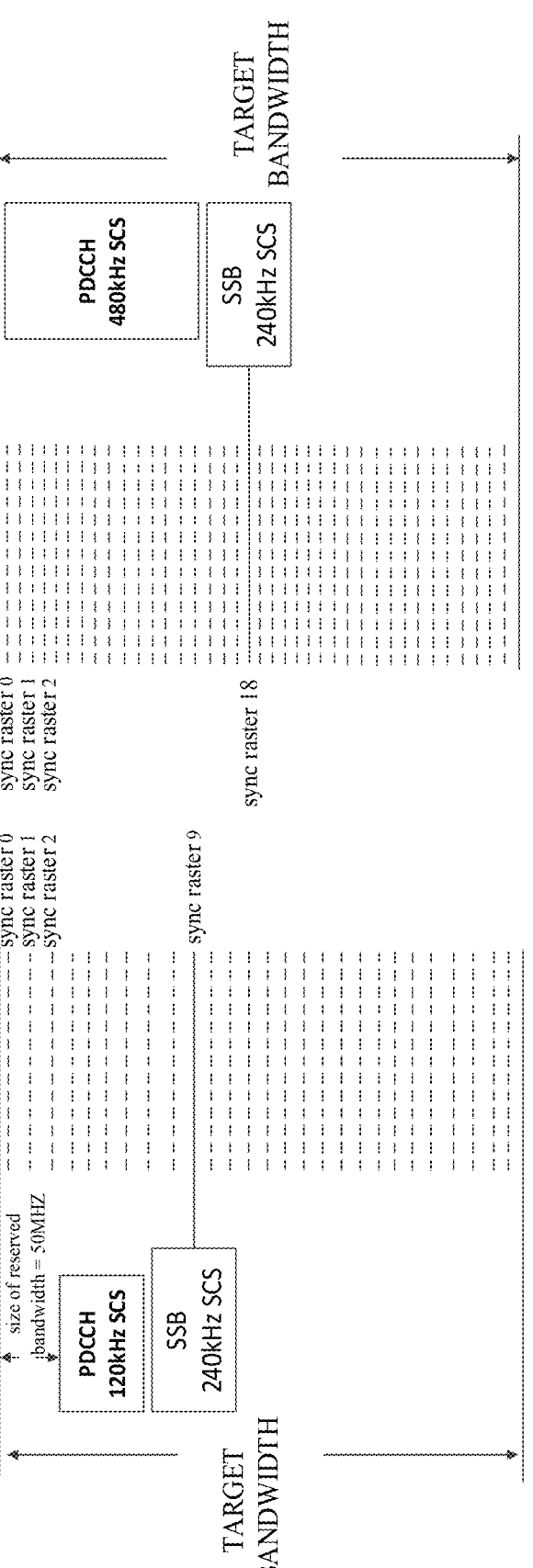

As illustrated in (a) of FIG. 31, when the thirteenth combination is the size of the reserved bandwidth being 50 MHz and the subcarrier spacing of the PDCCH being 120 kHz, the position of the first synchronization raster in the target bandwidth is the thirty-first position, and the index of the thirty-first position is 9. As illustrated in (b) of FIG. 31, when the fourteenth combination is the size of reserved bandwidth being 0 MHz and the subcarrier spacing of the PDCCH being 480 kHz, the position of the first synchronization raster in the target bandwidth is the thirty-second position, and the index of the thirty-second position is 18. The thirty-first position is different from the thirty-second position.

Since the bandwidth size of the first channel is related to the subcarrier spacing of the first channel, for an example of the associated information of the position of the first synchronization raster in the target bandwidth including the size of the reserved bandwidth and the bandwidth size of the first channel, reference may be made to the above example of the associated information of the position of the first synchronization raster in the target bandwidth including the size of the reserved bandwidth and the subcarrier spacing of the first channel, which will not be repeated herein.

For example, the associated information of the position of the first synchronization raster in the target bandwidth includes the size of the reserved bandwidth and the type of the first channel. If the size of the reserved bandwidth and the type of the first channel are a fifteenth combination, the position of the first synchronization raster in the target bandwidth is a thirty-third position. If the size of the reserved bandwidth and the type of the first channel are a sixteenth combination, the position of the first synchronization raster in the target bandwidth is a thirty-fourth position. The thirty-third position is different from the thirty-fourth position.

Figure 32:
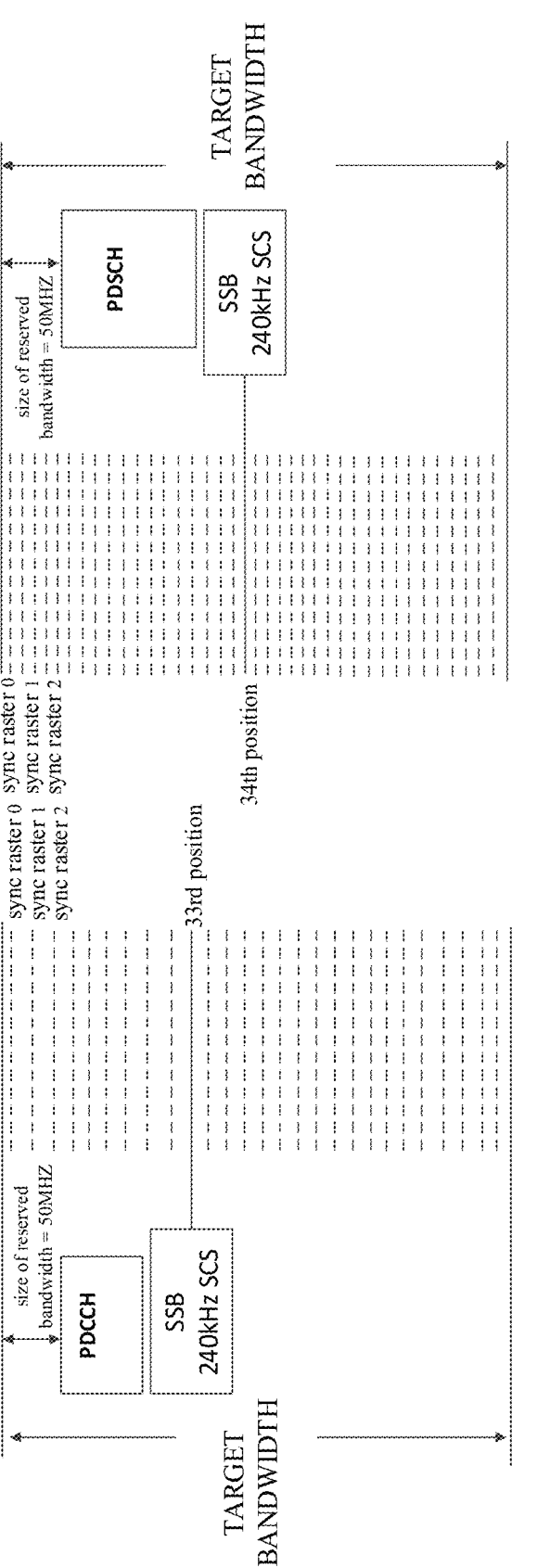

As illustrated in (a) of FIG. 32, when the fifteenth combination is the size of the reserved bandwidth being 50 MHz and the type of the first channel being the PDCCH, the position of the first synchronization raster in the target bandwidth is the thirty-third position. As illustrated in (b) of FIG. 32, when the fifteenth combination is the size of the reserved bandwidth being 50 MHz and the type of the first channel being the PDSCH, and the position of the first synchronization raster in the target bandwidth is the thirty-fourth position. The thirty-third position is different from the thirty-fourth position.

As illustrated in (a) of FIG. 32, when the fifteenth combination is the size of the reserved bandwidth being 50 MHz and the type of the first channel being the PDCCH, the position of the first synchronization raster in the target bandwidth is the thirty-third position. As illustrated in (b) of FIG. 31, when the fifteenth combination is the size of the reserved bandwidth being 50 MHz and the type of the first channel being the PDCCH, and the position of the first synchronization raster in the target bandwidth is the thirty-fourth position. The thirty-third position is different from the thirty-fourth position.

Figure 33:
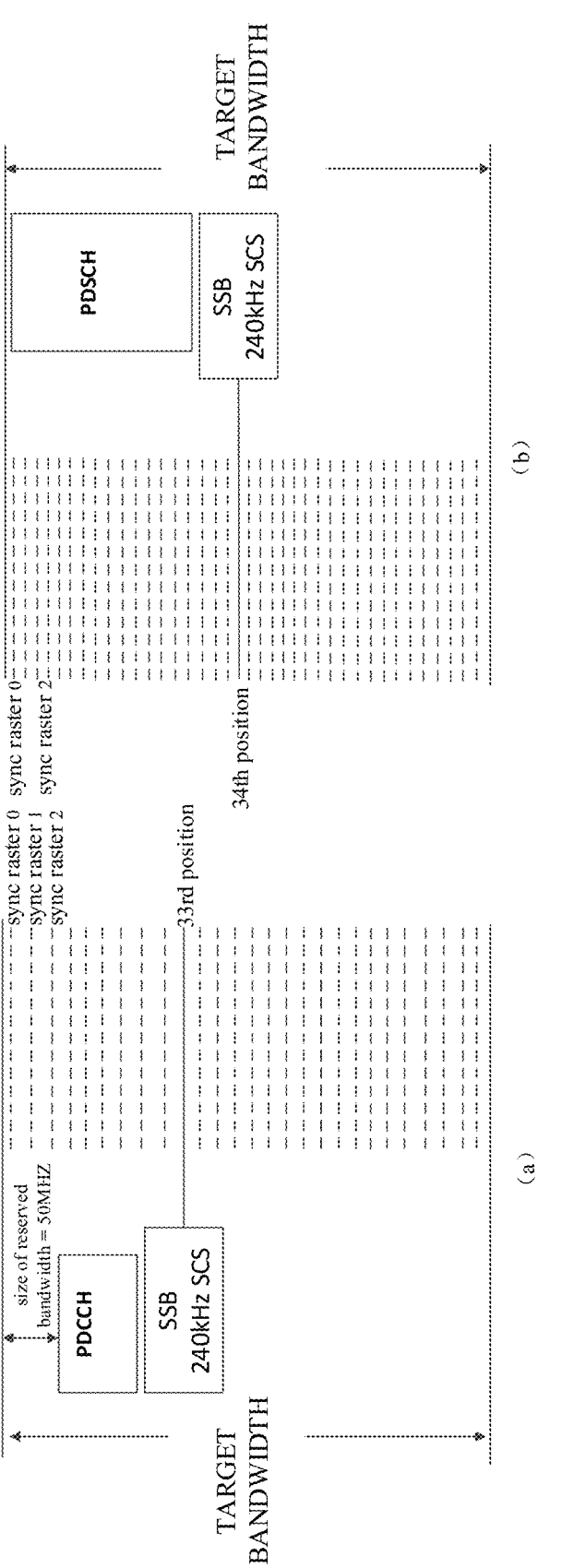

As illustrated in (a) of FIG. 33, when the fifteenth combination is the size of the reserved bandwidth being 50 MHz and the type of the first channel being the PDCCH, the position of the first synchronization raster in the target bandwidth is the thirty-third position. As illustrated in (b) of FIG. 33, when the fifteenth combination is the size of the reserved bandwidth being 0 MHz and the type of the first channel being the PDSCH, and the position of the first synchronization raster in the target bandwidth is the thirty-fourth position. The thirty-third position is different from the thirty-fourth position.

For example, the associated information of the position of the first synchronization raster in the target bandwidth includes the size of the reserved bandwidth and the number of first channels. If the size of the reserved bandwidth and the number of first channels are a seventeenth combination, the position of the first synchronization raster in the target bandwidth is a thirty-fifth position. If the size of the reserved bandwidth and the number of first channels are an eighteenth combination, the position of the first synchronization raster in the target bandwidth is a thirty-sixth position. The thirty-fifth position is different from the thirty-sixth position. The PDCCH is taken as an example of the first channel for description.

As illustrated in (a) of FIG. 13, when the seventeenth combination is the size of the reserved bandwidth being 0 MHz and the number of first channels being 1, the position of the first synchronization raster in the target bandwidth is the thirty-fifth position, and the index of the thirty-fifth position is 6. As illustrated in (b) of FIG. 13, when the eighteenth combination is the size of the reserved bandwidth being 0 MHz and the number of first channels being 0, the position of the first synchronization raster in the target bandwidth is the thirty-sixth position, and the index of the thirty-sixth position is 2. The thirty-fifth position is different from the thirty-sixth position.

Figure 34:
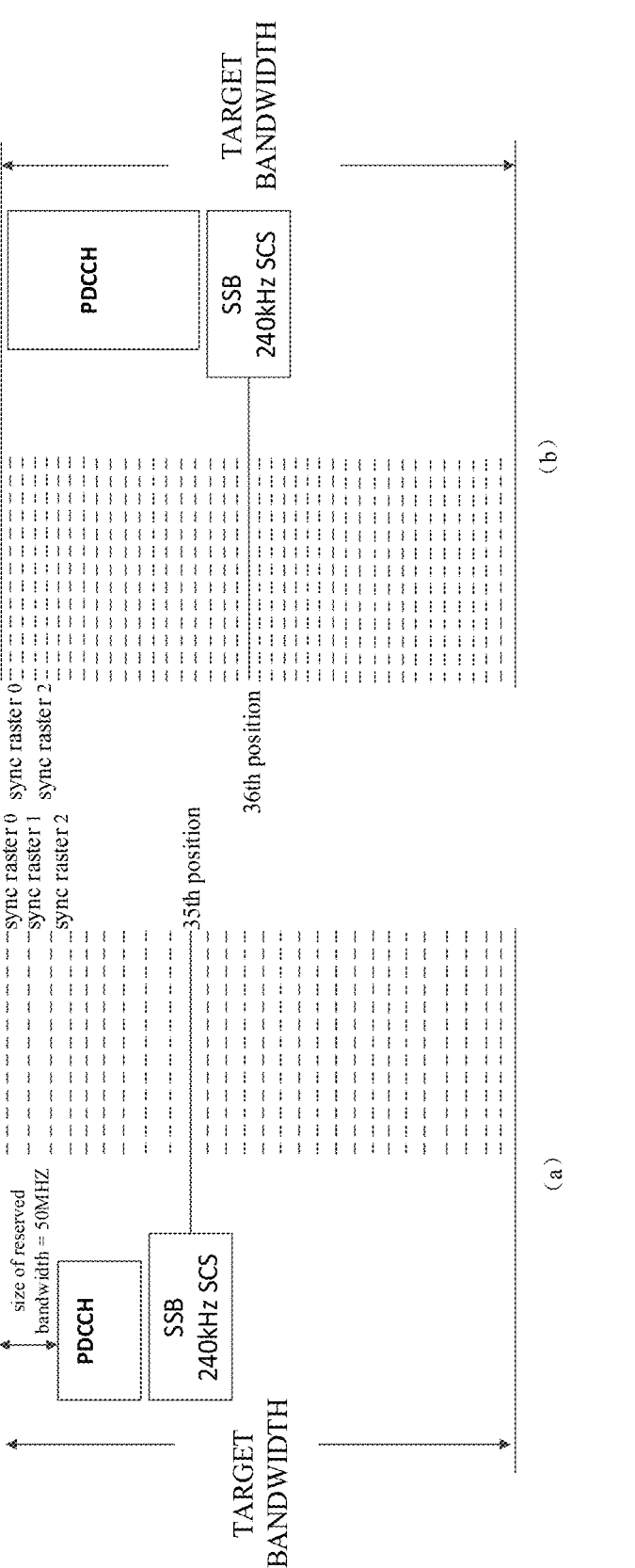

As illustrated in (a) of FIG. 34, when the seventeenth combination is the size of the reserved bandwidth being 50 MHz and the number of first channels being 1, the position of the first synchronization raster in the target bandwidth is the thirty-fifth position. As illustrated in (b) of FIG. 34, when the eighteenth combination is the size of the reserved bandwidth being 0 MHz and the number of first channels being 1, the position of the first synchronization raster in the target bandwidth is the thirty-sixth position. The thirty-fifth position is different from the thirty-sixth position.

Figure 35:
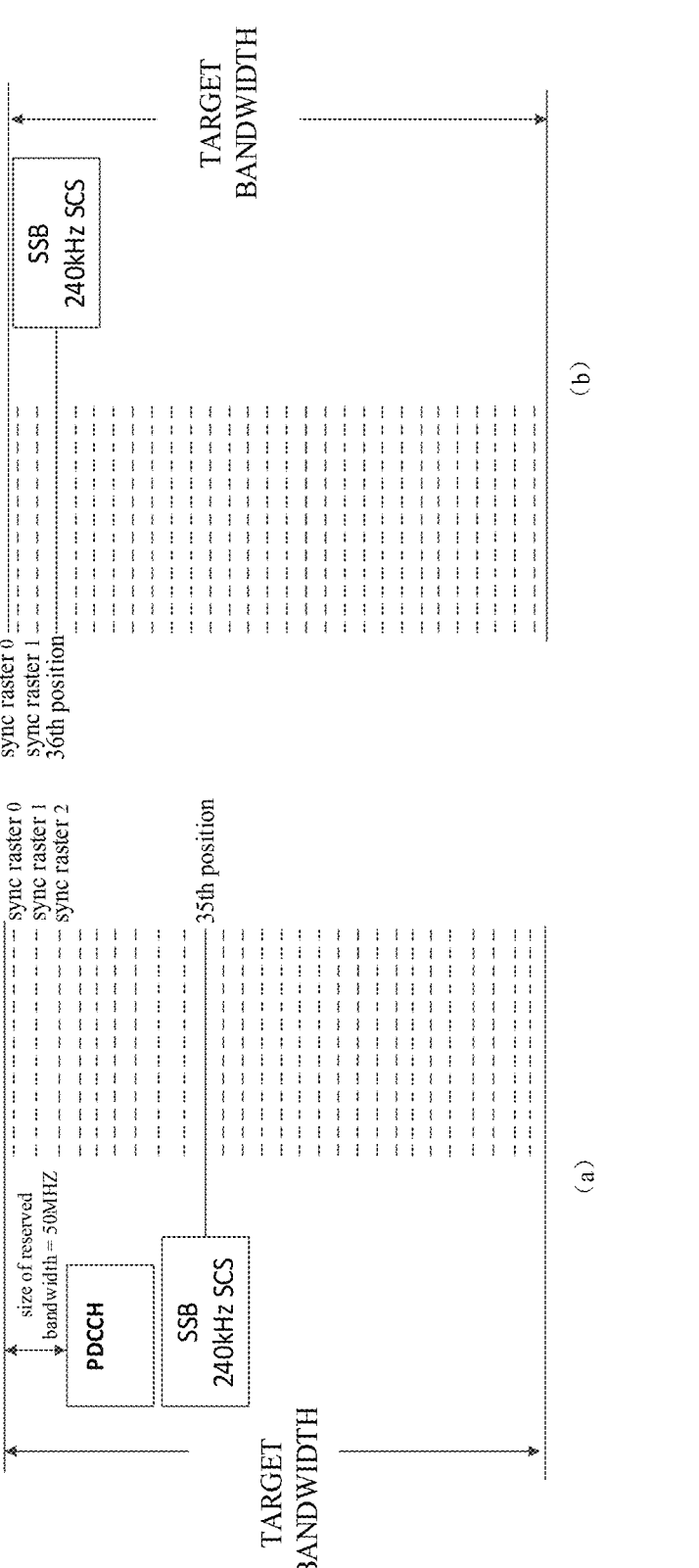

As illustrated in (a) of FIG. 35, when the seventeenth combination is the size of the reserved bandwidth being 50 MHz and the number of first channels being 1, the position of the first synchronization raster in the target bandwidth is the thirty-fifth position. As illustrated in (b) of FIG. 35, when the eighteenth combination is the size of the reserved bandwidth being 0 MHz and the number of first channels being 0, the position of the first synchronization raster in the target bandwidth is the thirty-sixth position. The thirty-fifth position is different from the thirty-sixth position.

For example, the associated information of the position of the first synchronization raster in the target bandwidth includes the size of the reserved bandwidth and the frequency position of the first channel. If the size of the reserved bandwidth and the frequency position of the first channel are a nineteenth combination, the position of the first synchronization raster in the target bandwidth is a thirty-seventh position. If the size of the reserved bandwidth and the frequency position of the first channel are a twentieth combination, the position of the first synchronization raster in the target bandwidth is a thirty-eighth position. The thirty-seventh position is different from the thirty-eighth position. The PDCCH is taken as an example of the first channel for description.

As illustrated in (a) of FIG. 15, when the nineteenth combination is the size of the reserved bandwidth being 0 MHz and the frequency position of the PDCCH being higher than that of the channel of the SSB, the position of the first synchronization raster in the target bandwidth is the thirty-seventh position, and the index of the thirty-seventh position is 6. As illustrated in (b) of FIG. 15, when the twentieth combination is the size of the reserved bandwidth being 0 MHz and the frequency position of the PDCCH being lower than that of the channel of the SSB, the position of the first synchronization raster in the target bandwidth is the thirty-eighth position, and the index of the thirty-eighth position is 2. The thirty-seventh position and the thirty-eighth position are different.

As illustrated in (a) of FIG. 15, when the nineteenth combination is the size of the reserved bandwidth being 0 MHz and the frequency position of the PDCCH being higher than that of the channel of the SSB, the position of the first synchronization raster in the target bandwidth is the thirty-seventh position, and the index of the thirty-seventh position is 6. As illustrated in (a) of FIG. 29, when the twentieth combination is the size of the reserved bandwidth being 50 MHz and the frequency position of the PDCCH being higher than that of the channel of the SSB, the position of the first synchronization raster in the target bandwidth is the thirty-eighth position, and the index of the thirty-eighth position is 9. The thirty-seventh position and the thirty-eighth position are different.

As illustrated in (b) of FIG. 15, when the nineteenth combination is the size of the reserved bandwidth being 0 MHz and the frequency position of the PDCCH being lower than that of the channel of the SSB, the position of the first synchronization raster in the target bandwidth is the thirty-seventh position, and the index of the thirty-seventh position is 2. As illustrated in (a) of FIG. 29, when the twentieth combination is the size of the reserved bandwidth being 50 MHz and the frequency position of the PDCCH being higher than that of the channel of the SSB, the position of the first synchronization raster in the target bandwidth is the thirty-eighth position, and the index of the thirty-eighth position is 9. The thirty-seventh position and the thirty-eighth position are different.

For an example of the associated information of the position of the first synchronization raster in the target bandwidth including the size of the reserved bandwidth and the subcarrier spacing of the CORESET, reference may be made to the above example of the associated information of the position of the first synchronization raster in the target bandwidth including the size of the reserved bandwidth and the subcarrier spacing of the first channel, which will not be repeated herein. For an example of the associated information of the position of the first synchronization raster in the target bandwidth including the size of the reserved bandwidth and the bandwidth size of the CORESET, reference may be made to the above example of the associated information of the position of the first synchronization raster in the target bandwidth including the size of the reserved bandwidth and the bandwidth size of the first channel, which will not be repeated herein.

For example, the associated information of the position of the first synchronization raster in the target bandwidth includes the subcarrier spacing of the first channel and the type of the first channel. If the subcarrier spacing of the first channel and the type of the first channel are a twenty-first combination, the position of the first synchronization raster in the target bandwidth is a thirty-ninth position. If the subcarrier spacing of the first channel and the type of the first channel are a twenty-second combination, the position of the first synchronization raster in the target bandwidth is a fortieth position. The thirty-ninth position is different from the fortieth position.

Figure 36:
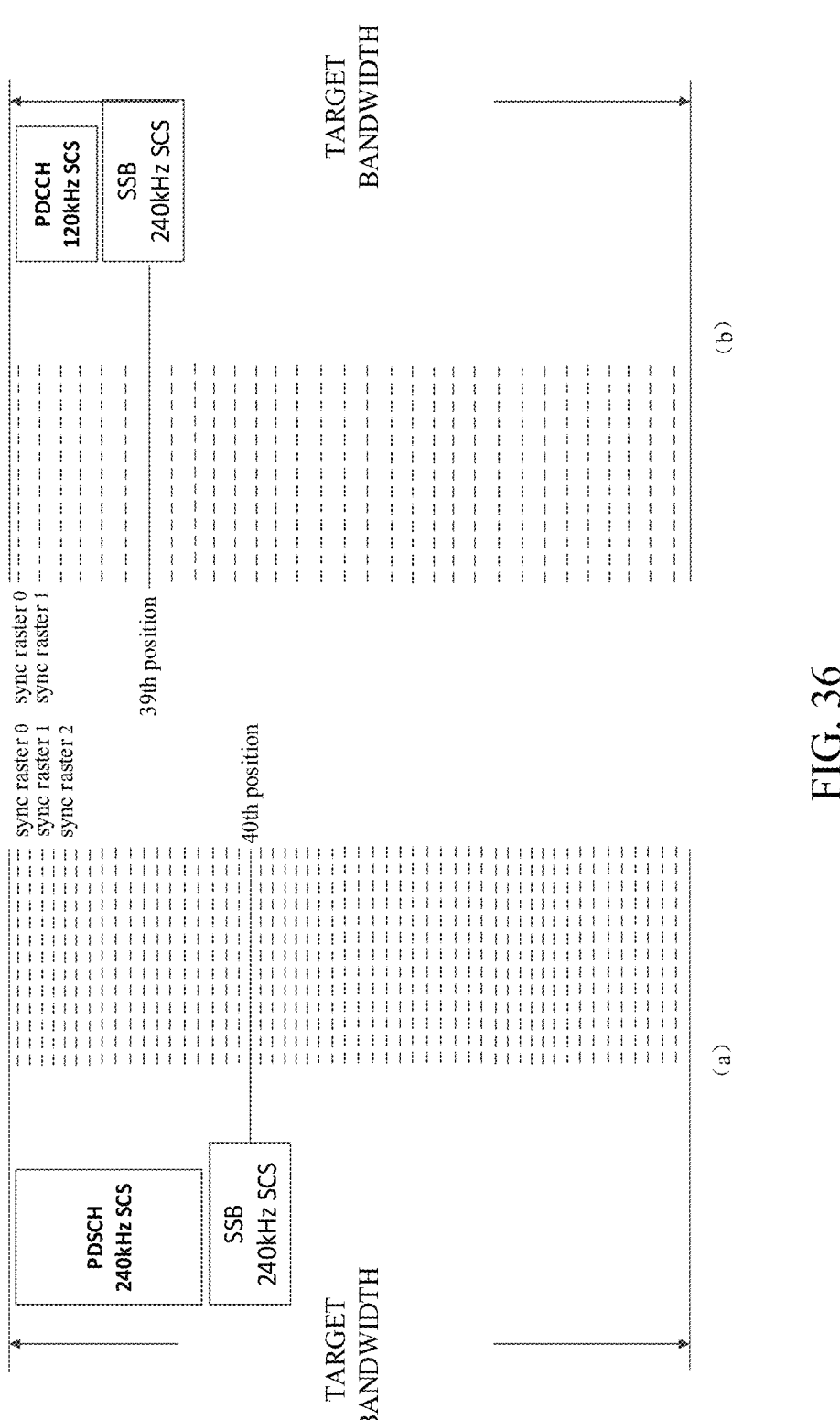

As illustrated in (a) of FIG. 36, when the twenty-first combination is the subcarrier spacing of the first channel being 240 kHz and the type of the first channel being the PDSCH, the position of the first synchronization raster in the target bandwidth is the thirty-ninth position. As illustrated in (b) of FIG. 36, when the twenty-first combination is the subcarrier spacing of the first channel being 120 kHz and the type of the first channel being the PDCCH, the position of the first synchronization raster in the target bandwidth is the fortieth position. The thirty-ninth position is different from the fortieth position.

For example, the associated information of the position of the first synchronization raster in the target bandwidth includes the subcarrier spacing of the first channel and the number of first channels. If the subcarrier spacing of the first channel and the number of first channels are a twenty-third combination, the position of the first synchronization raster in the target bandwidth is a forty-first position. If the subcarrier spacing of the first channel and the number of first channels are a twenty-fourth combination, the position of the first synchronization raster in the target bandwidth is a forty-second position. The forty-first position is different from the forty-second position. The PDCCH is taken as an example of the first channel for description.

Figure 37:
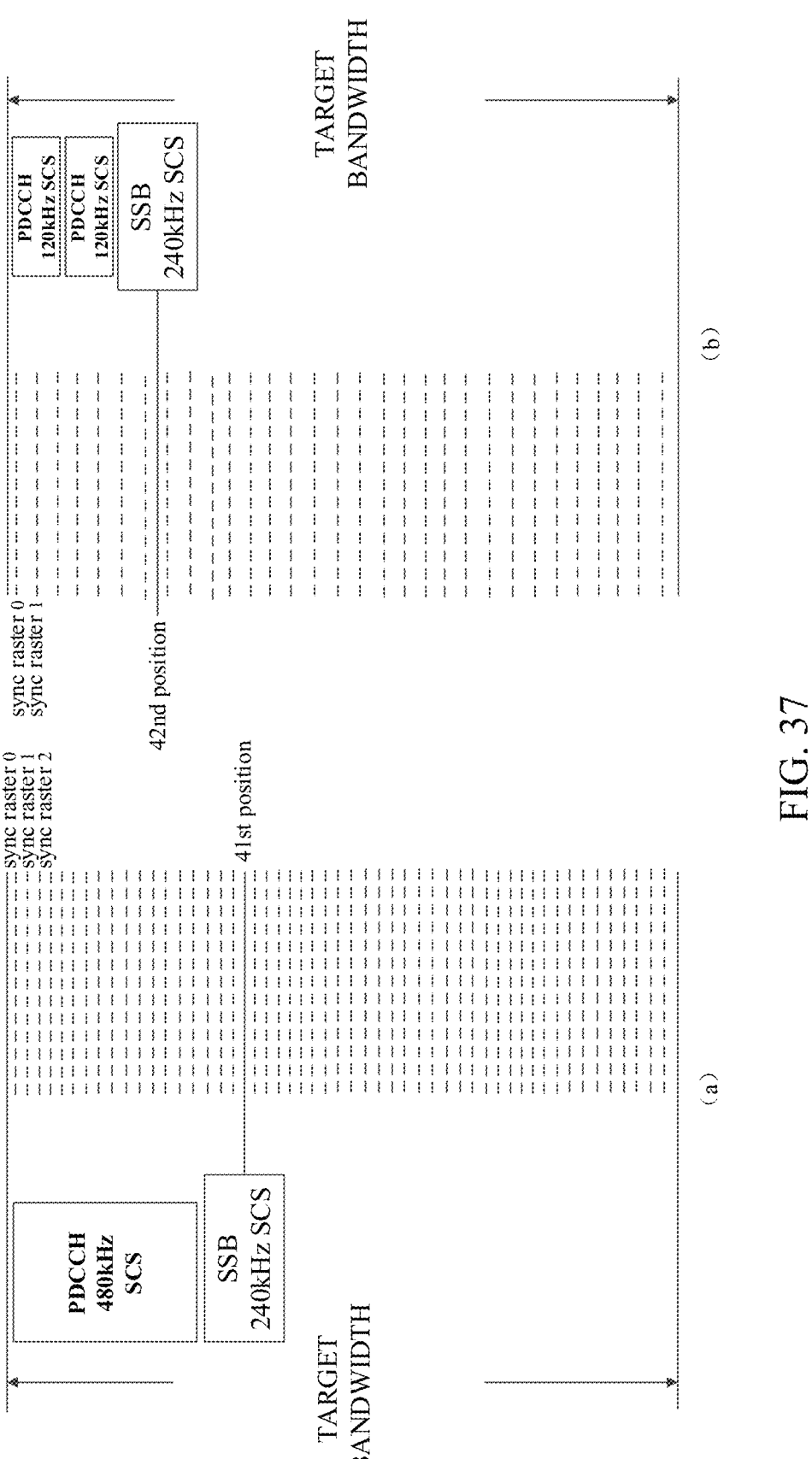

As illustrated in (a) of FIG. 37, when the twenty-third combination is the subcarrier spacing of the first channel being 480 kHz and the number of the first channels being 1, the position of the first synchronization raster in the target bandwidth is the forty-first position. As illustrated in (b) of FIG. 37, when the twenty-fourth combination is the subcarrier spacing of the first channel being 120 kHz and the number of the first channel being 2, the position of the first synchronization raster in the target bandwidth is the forty-second position. The forty-first position is different from the forty-second position.

For example, the associated information of the position of the first synchronization raster in the target bandwidth includes the subcarrier spacing of the first channel and the frequency position of the first channel. If the subcarrier spacing of the first channel and the frequency position of the first channel are a twenty-fifth combination, the position of the first synchronization raster in the target bandwidth is a forty-third position. If the subcarrier spacing of the first channel and the frequency position of the first channel are a twenty-sixth combination, the position of the first synchronization raster in the target bandwidth is a forty-fourth position. The forty-third position is different from the forty-fourth position. The PDCCH is taken as an example of the first channel for description.

Figure 38:
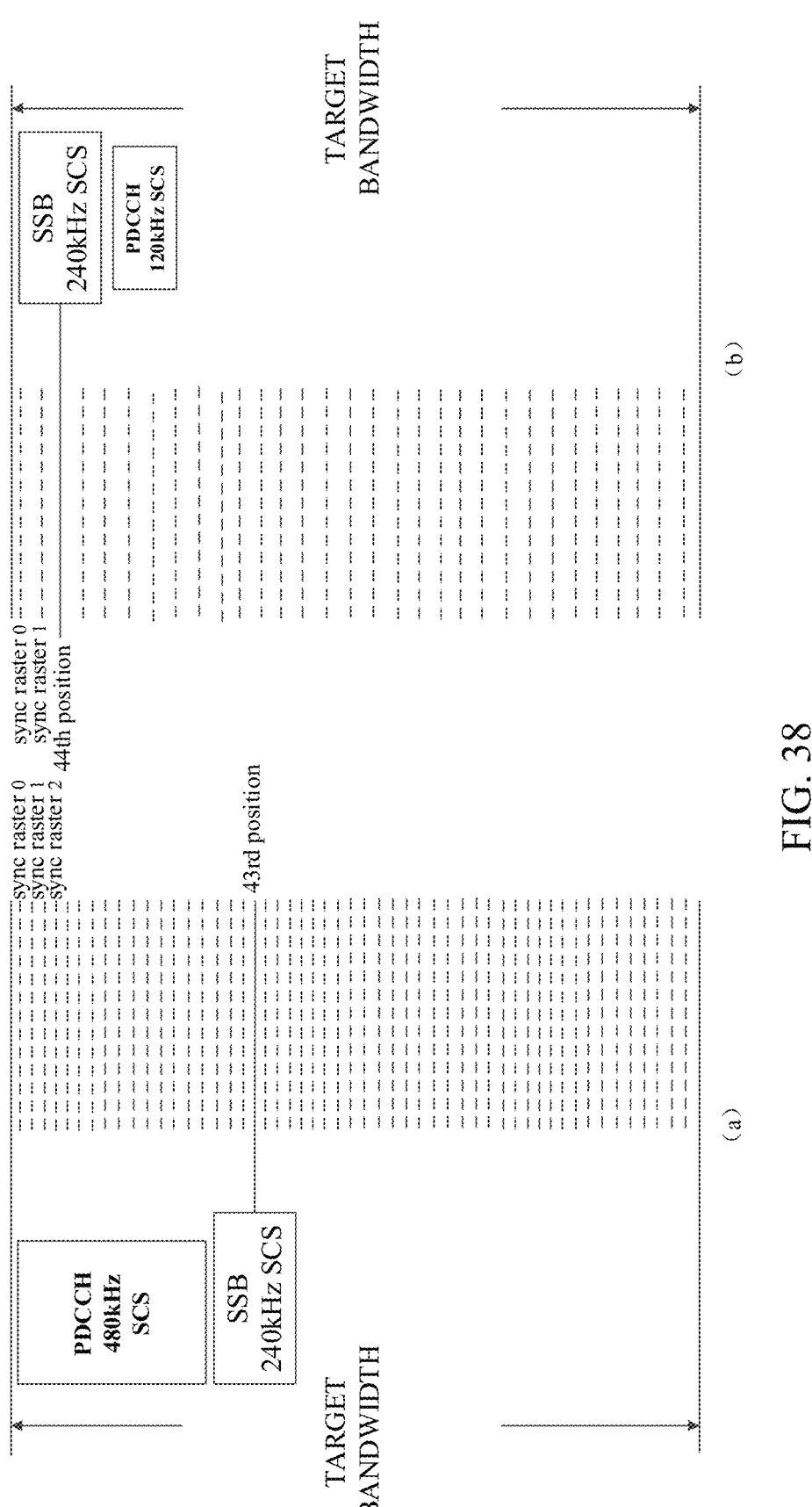

As illustrated in (a) of FIG. 38, when the twenty-fifth combination is the subcarrier spacing of the first channel being 480 kHz and the frequency position of the PDCCH is higher than that of the channel of the SSB, the position of the first synchronization raster in the target bandwidth is the forty-third position. As illustrated in (b) of FIG. 38, when the twenty-sixth combination is the subcarrier spacing of the first channel being 120 kHz and the frequency position of the PDCCH is lower than that of the channel of the SSB, the position of the first synchronization raster in the target bandwidth is the forty-fourth position. The forty-third position is different from the forty-fourth position.

For example, the associated information of the position of the first synchronization raster in the target bandwidth includes the type of the first channel and the number of the first channels. If the type of the first channel and the number of the first channels are a twenty-seventh combination, the position of the first synchronization raster in the target bandwidth is a forty-fifth position. If the type of the first channel and the number of the first channel are a twenty-eighth combination, the position of the first synchronization raster in the target bandwidth is a forty-sixth position. The forty-fifth position is different from the forty-sixth position.

Figure 39:
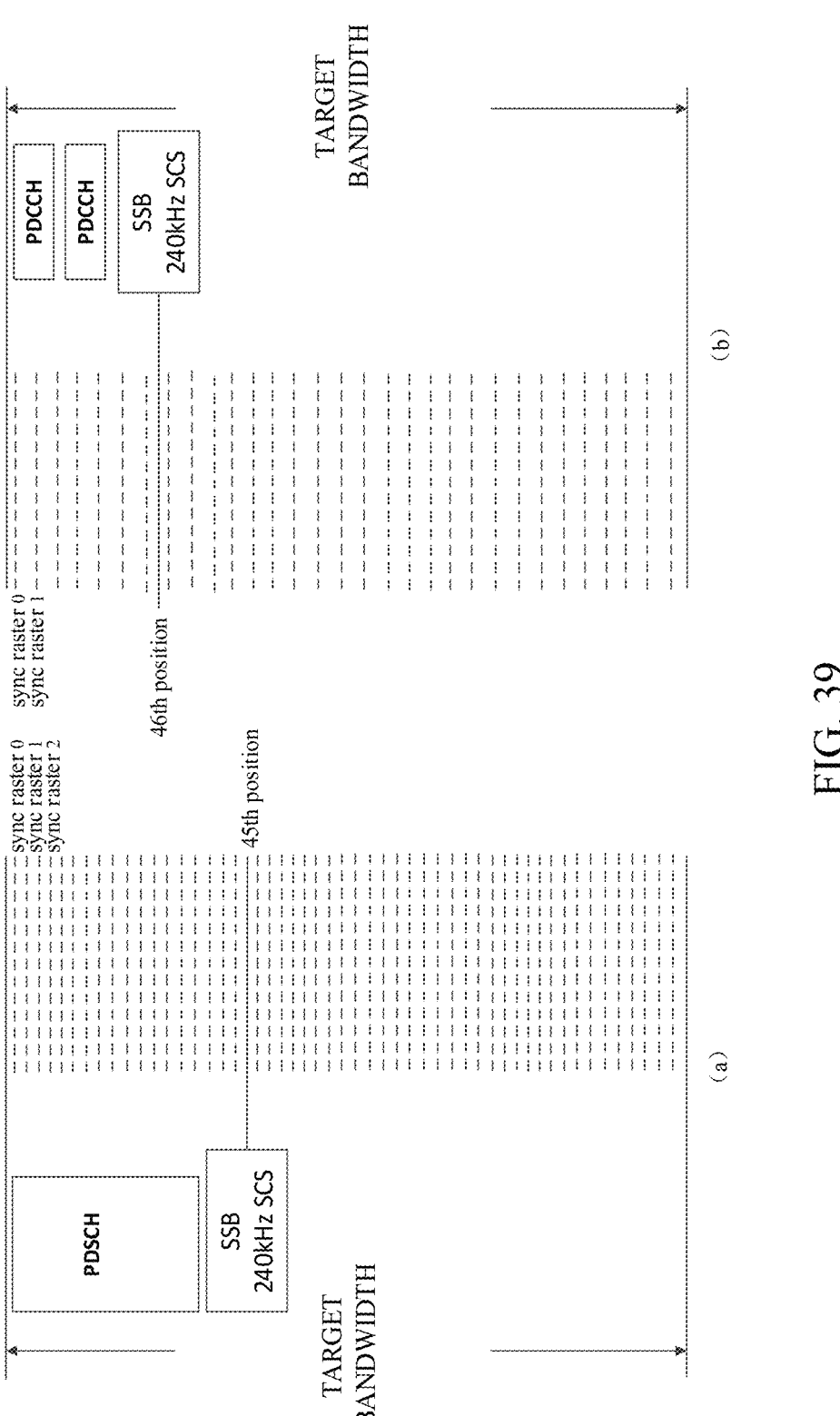

As illustrated in (a) of FIG. 39, when the twenty-seventh combination is the type of the first channel being the PDSCH and the number of the first channels being 1, the position of the first synchronization raster in the target bandwidth is the forty-fifth position. As illustrated in (b) of FIG. 39, when the twenty-eighth combination is the type of the first channel being the PDCCH and the number of the first channels being 2, the position of the first synchronization raster in the target bandwidth is the forty-sixth position. The forty-fifth position and the forty-sixth position are different.

For example, the associated information of the position of the first synchronization raster in the target bandwidth includes the type of the first channel and the frequency position of the first channels. If the type of the first channel and the frequency position of the first channel are a twenty-ninth combination, the position of the first synchronization raster in the target bandwidth is a forty-seventh position. If the type of the first channel and the frequency position of the first channels are a thirtieth combination, the position of the first synchronization raster in the target bandwidth is a forty-eighth position. The forty-seventh position is different from the forty-eighth position.

Figure 40:
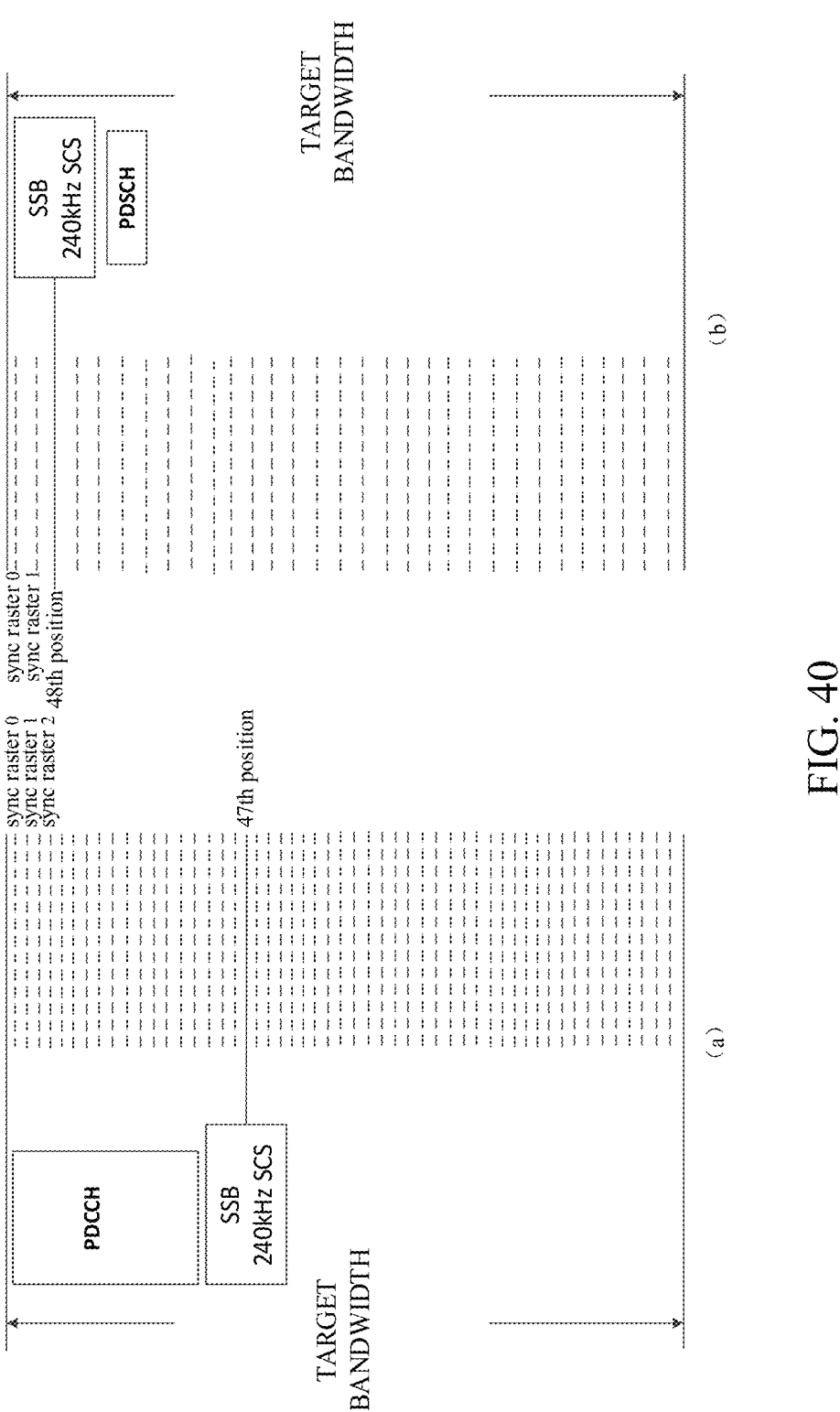

As illustrated in (a) of FIG. 40, when the twenty-ninth combination is the type of the first channel being the PDCCH and the frequency position of the first channel being higher than that of the channel of the SSB, the position of the first synchronization raster in the target bandwidth is the forty-seventh position. As illustrated in (b) of FIG. 40, when the thirtieth combination is the type of the first channel being the PDSCH and the frequency position of the first channel being lower than that of the channel of the SSB, the position of the first synchronization raster in the target bandwidth is the forty-eighth position. The forty-seventh position and the forty-eighth position are different.

For example, the associated information of the position of the first synchronization raster in the target bandwidth includes the number of first channels and the frequency position of the first channel. If the number of first channels and the frequency position of the first channel are a thirty-first combination, the position of the first synchronization raster in the target bandwidth is a forty-ninth position. If the number of first channels and the frequency position of the first channel are a thirty-second combination, the position of the first synchronization raster in the target bandwidth is a fifty position. The forty-ninth position is different from the fiftieth position. The PDCCH is taken as an example of the first channel for description.

Figure 41:
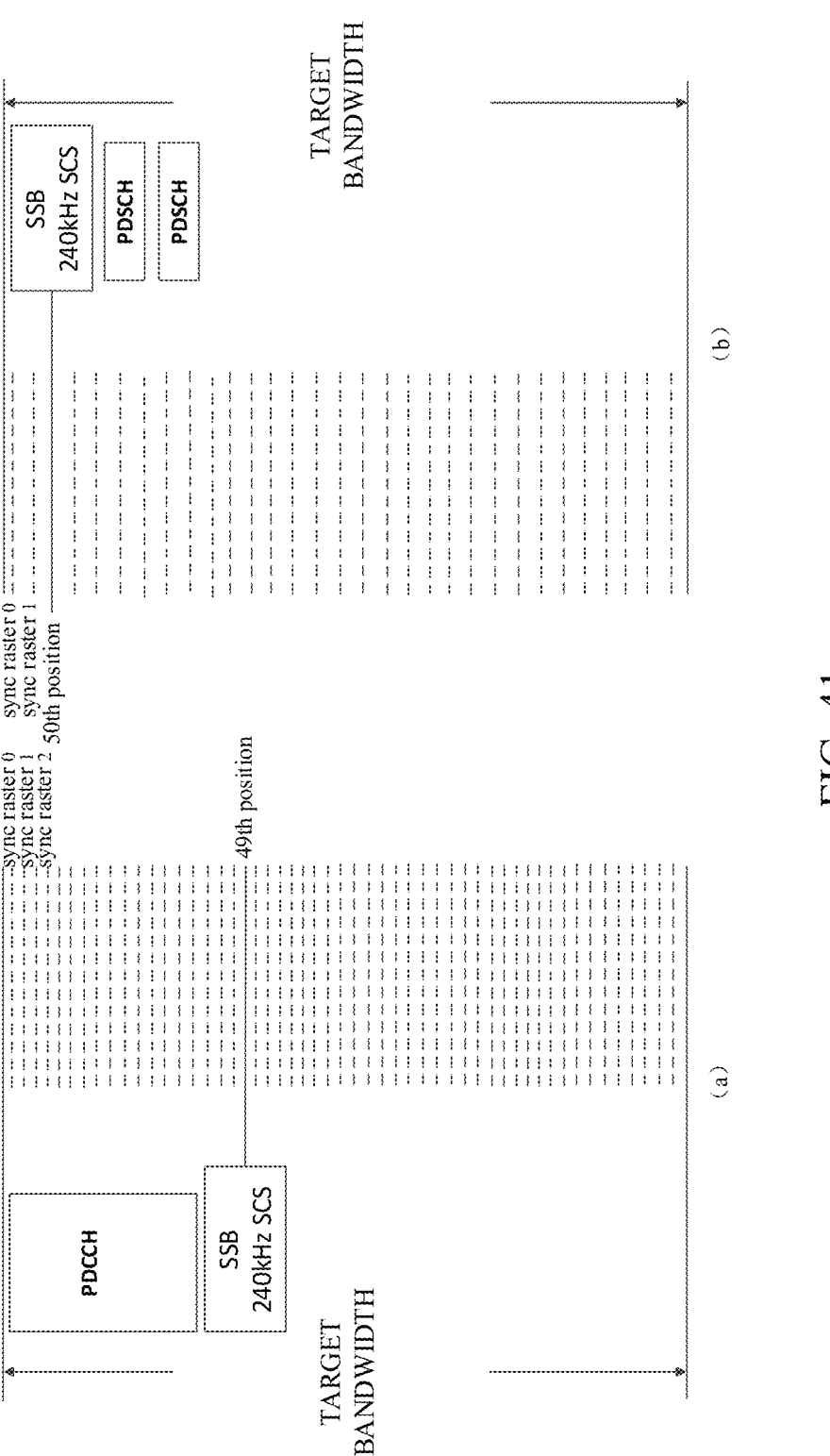

As illustrated in (a) of FIG. 41, when the thirty-first combination is the number of the first channels being 1 and the frequency position of the first channel being higher than that of the channel of the SSB, the position of the first synchronization raster in the target bandwidth is the forty-ninth position. As illustrated in (b) of FIG. 41, when the thirty-second combination is the number of the first channels being 2 and the frequency position of the first channel being lower than that of the channel of the SSB, the position of the first synchronization raster in the target bandwidth is the fifty position. The forty-ninth position is different from the fiftieth position.

For example, the associated information of the position of the first synchronization raster in the target bandwidth includes the subcarrier spacing of the SSB, the size of the reserved bandwidth at the boundary of the target bandwidth, and the information of the first channel in the target bandwidth. Here, the information of the first channel is the subcarrier spacing of the first channel for example, and reference for other examples may be made to this example, which will not be repeated herein. If the subcarrier spacing of the SSB, the size of the reserved bandwidth at the boundary of the target bandwidth, and the information of the first channel in the target bandwidth are a thirty-third combination, the position of the first synchronization raster in the target bandwidth is a fifty-first position. If the subcarrier spacing of the SSB, the size of the reserved bandwidth at the boundary of the target bandwidth, and the information of the first channel in the target bandwidth are a thirty-fourth combination, the position of the first synchronization raster in the target bandwidth is a fifty-second position. The fifty-first position is different from the fifty-second position. The PDCCH is taken as an example of the first channel for description.

Figure 42:
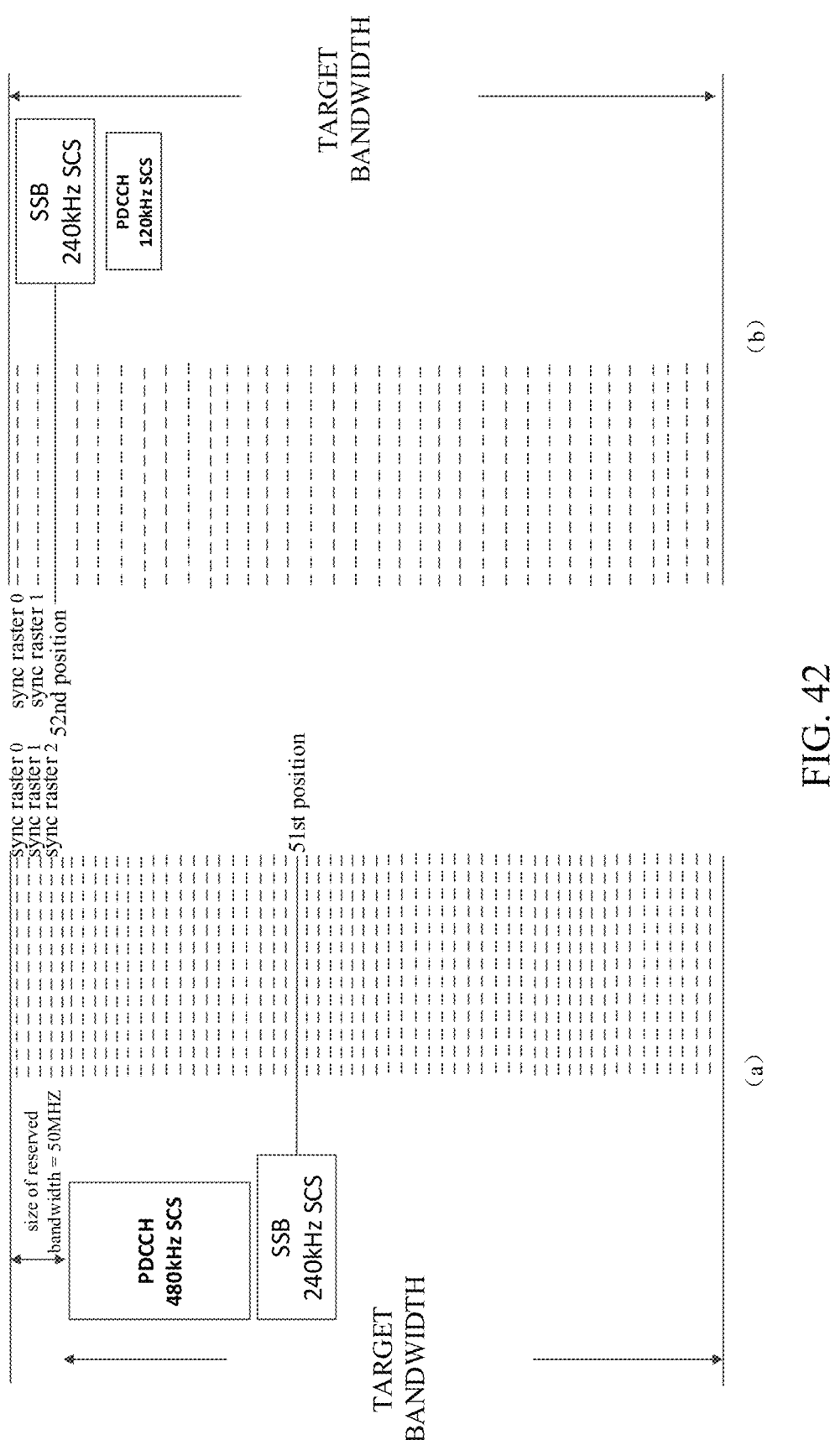

As illustrated in (a) of FIG. 42, when the thirty-third combination is the subcarrier spacing of the SSB being 480 kHz, the size of the reserved bandwidth at the boundary of the target bandwidth being 50 MHz, and the subcarrier spacing of the first channel in the target bandwidth being 960 kHz, the position of the first synchronization raster in the target bandwidth is the fifty-first position. As illustrated in (b) of FIG. 42, when the thirty-fourth combination is the subcarrier spacing of the SSB being 240 kHz, the size of the reserved bandwidth at the boundary of the target bandwidth being 0 MHz, and the subcarrier spacing of the first channel in the target bandwidth being 480 kHz, the position of the first synchronization raster in the target bandwidth is the fifty-second position. The fifty-first position is different from the fifty-second position.

At block 202, the terminal determines the frequency position of the SSB according to the position of the first synchronization raster in the target bandwidth.

The index of the frequency position of the SSB in the SSB resource position is the index of the position of the first synchronization raster in the target bandwidth. When the terminal determines the position of the first synchronization raster in the target bandwidth, the terminal determines the frequency position of the SSB. The frequency position(s) of the SSB is a position for transmitting the SSB. That is, the SSB may be received at these positions, but these positions are not necessarily the actual position at which the SSB is transmitted.

In a possible example, the SSB has multiple frequency positions. The terminal may determine the frequency position of the SSB according to the position of the first synchronization raster in the target bandwidth as follows. The terminal determines positions of one or more second synchronization rasters in the target bandwidth according to the position of the first synchronization raster in the target bandwidth, and determines the frequency positions of the SSB according to the position of the first synchronization raster in the target bandwidth and the positions of the one or more second synchronization rasters in the target bandwidth.

The positions of the one or more second synchronization rasters in the target bandwidth may be determined according to the position of the first synchronization raster in the target bandwidth as follows. The positions of the one or more second synchronization rasters in the target bandwidth are determined according to the position of the first synchronization raster in the target bandwidth and a frequency offset between the synchronization rasters.

Figure 43:
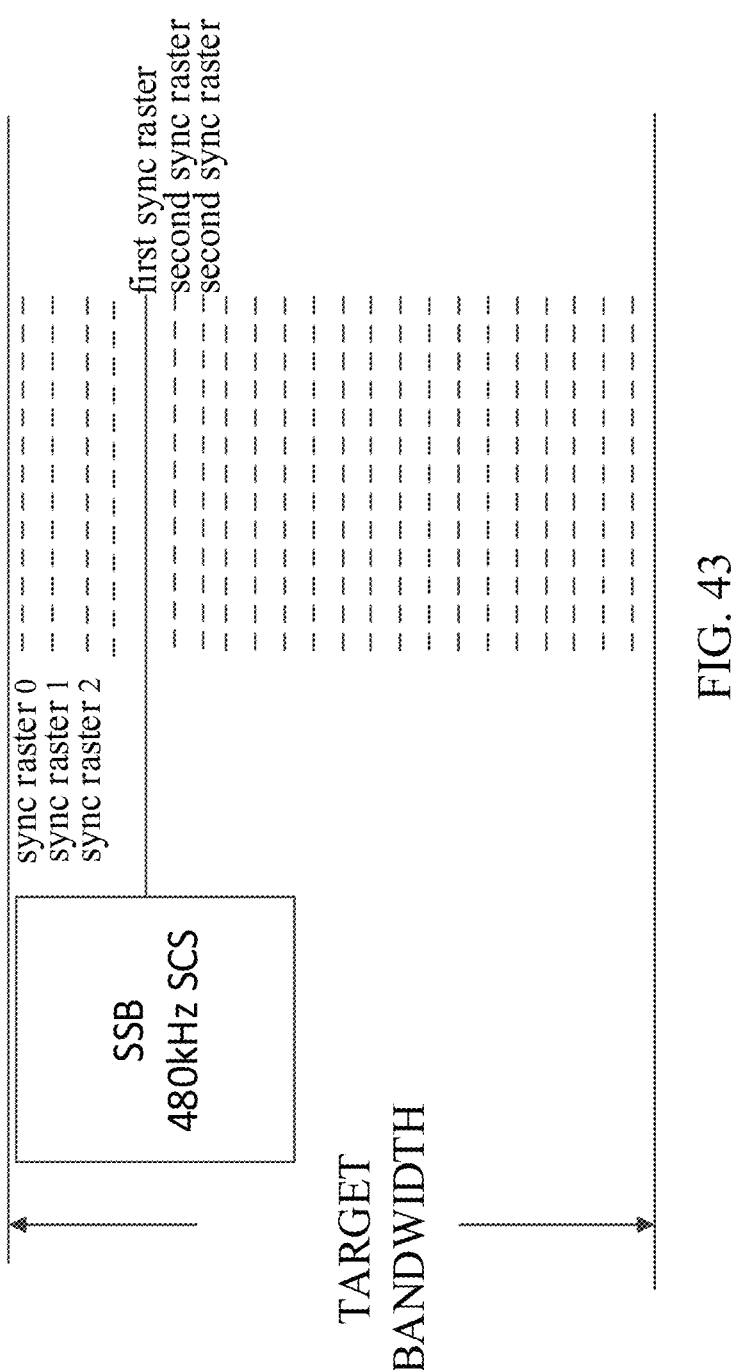
FIG. 43 is a schematic diagram illustrating a position of a second synchronization raster in a target bandwidth according to an implementation of the present disclosure.

As illustrated in FIG. 43, assuming that the position of the first synchronization raster in the target bandwidth is determined as A and the frequency offset between the synchronization rasters is B, then the position of the second synchronization raster adjacent to the first synchronization raster in the target bandwidth is A+B or A−B. As such, the position of the second synchronization raster in the target bandwidth is determined.

In a possible example, the terminal detects the SSB according to the frequency position of the SSB, and determines one or more of the following information according to a detection result of the SSB: the subcarrier spacing of the SSB, the size of the target bandwidth, and the information of the first channel. That is, when the terminal has determined the position for transmitting the SSB, according to whether the SSB is actually received at the position, the terminal can know the corresponding subcarrier spacing, the target bandwidth, and the information of the first channel that are used in the system. That is, when the terminal performs initial access, the size of the target bandwidth and the subcarrier spacing of the SSB that are used by the system are not known. However, since different target bandwidth sizes and/or different SCSs of the SSB correspond to different manners for determining the position of the first synchronization raster in the target bandwidth, the terminal blindly detects the SSB at the possible positions of the first synchronization raster corresponding to each manner, and if an SSB is detected at a certain position, the terminal can determine one or more of the following information according to the detection result of the SSB: the subcarrier spacing of the SSB, the size of the target bandwidth, and the information of the first channel.

In implementations of the present disclosure, a network device transmits an SSB, where a frequency position of the SSB is associated with a first synchronization raster. The first synchronization raster is associated with one or more of the following information: a subcarrier spacing of the SSB, a size of a target bandwidth, a size of a reserved bandwidth at a boundary of the target bandwidth, and information of a first channel in the target bandwidth, where a frequency range of the first channel does not overlap with the SSB. For details, reference may be made to the terminal side, which will not be repeatedly described herein.

In the solutions provided in the implementations of the present disclosure, the terminal can determine the position of the first synchronization raster in the target bandwidth, where the position of the first synchronization raster in the target bandwidth is associated with one or more of the subcarrier spacing of the SSB, the size of the target bandwidth, the size of the reserved bandwidth at the boundary of the target bandwidth, and the information of the first channel in the target bandwidth. The terminal may further determine the frequency position of the SSB according to the position of the first synchronization raster in the target bandwidth, so as to search for the SSB.

Figure 44:
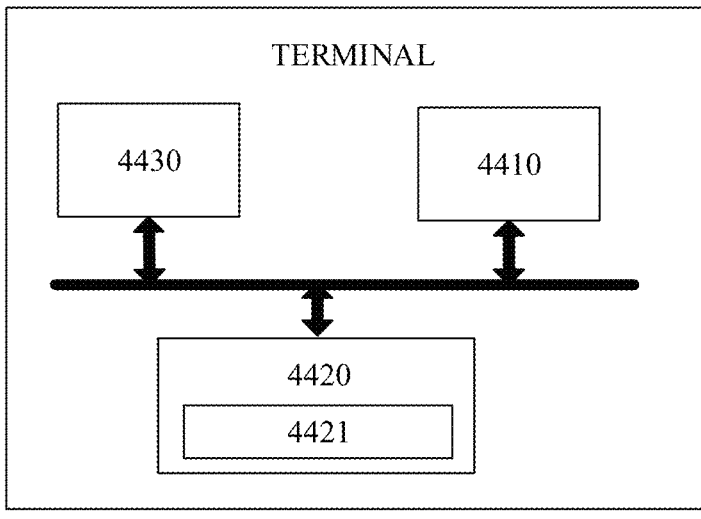
FIG. 44 is a schematic structural diagram of a terminal according to an implementation of the present disclosure.

Referring to FIG. 44, FIG. 44 is a schematic structural diagram of a terminal according to an implementation of the present disclosure. As illustrated in FIG. 44, the terminal may include a processor 4410 and a memory 4420. Optionally, the terminal may also include a transceiver 4430. The memory 4420 is configured to store a computer program or instructions 4421. The transceiver 4430 is configured to receive and transmit data. The processor 4410 is configured to invoke the computer program or instructions to perform the following operations. A position of a first synchronization raster in a target bandwidth is determined, where the first synchronization raster is used for determining a frequency position of an SSB in the target bandwidth, and the position of the first synchronization raster in the target bandwidth is associated with one or more of following information: a subcarrier spacing of the SSB, a size of the target bandwidth, a size of a reserved bandwidth at a boundary of the target bandwidth, and information of a first channel in the target bandwidth, where a frequency range of the first channel does not overlap with the SSB. The frequency position of the SSB is determined according to the position of the first synchronization raster in the target bandwidth.

In a possible design, the associated information of the position of the first synchronization raster in the target bandwidth includes the size of the target bandwidth.

In a possible design, when the size of the target bandwidth is a first value, the position of the first synchronization raster is a first position, and when the size of the target bandwidth is a second value, the position of the first synchronization raster is a second position different from the first position.

In a possible design, the first value is greater than the second value; and the first position is lower than the second position, or the first position is higher than the second position.

In a possible design, the associated information of the position of the first synchronization raster in the target bandwidth includes the subcarrier spacing of the SSB.

In a possible design, when the subcarrier spacing of the SSB is a first subcarrier spacing, the position of the first synchronization raster is a third position; and when the subcarrier spacing of the SSB is a second subcarrier spacing, the position of the first synchronization raster is a fourth position different from the third position.

In a possible design, the first subcarrier spacing is greater than the second subcarrier spacing; and the third position is lower than the fourth position, or the third position is higher than the fourth position.

In a possible design, the associated information of the position of the first synchronization raster in the target bandwidth includes the size of the reserved bandwidth.

In a possible design, when the size of the reserved bandwidth is a third value, the position of the first synchronization raster is a fifth position; and when the size of the reserved bandwidth is a fourth value, the position of the first synchronization raster is a sixth position different from the fifth position.

In a possible design, the third value is greater than the fourth value and the fourth value is greater than or equal to 0 hertz (Hz); and the fifth position is lower than the sixth position, or the fifth position is higher than the sixth position.

In a possible design, the transceiver 4430 is further configured to receive first indication information from a network device, the first indication information indicating the size of the reserved bandwidth.

In a possible design, the associated information of the position of the first synchronization raster in the target bandwidth includes the information of the first channel, the information of the first channel comprising one or more of following information: a subcarrier spacing of the first channel; a bandwidth size of the first channel; a type of the first channel; the number of the first channels; and a frequency position of the first channel. In a possible design, the first channel is a channel occupied by a control resource set (CORESET).

In a possible design, the information of the first channel includes a multiplexing pattern of the CORESET and the SSB, the multiplexing pattern representing a time-frequency position relationship between the CORESET and the SSB.

In a possible design, the information of the first channel includes a subcarrier spacing of the CORESET and/or a bandwidth size of the CORESET.

In a possible design, the first channel is a channel with a frequency position higher than the SSB in the target bandwidth.

In a possible design, the processor 4410 is configured to detect the SSB according to the frequency position of the SSB; and determine, according to a detection result of the SSB, one or more of the following information: the subcarrier spacing of the SSB, the size of the target bandwidth, and the information of the first channel.

In a possible design, the processor 4410 is configured to determine positions of one or more second synchronization rasters in the target bandwidth according to the position of the first synchronization raster in the target bandwidth; and determine the frequency position of the SSB according to the position of the first synchronization raster in the target bandwidth and the positions of one or more second synchronization rasters in the target bandwidth.

In a possible design, the processor 4410 is configured to determine the positions of one or more second synchronization rasters in the target bandwidth according to the position of the first synchronization raster in the target bandwidth and a frequency offset between synchronization rasters.

Figure 45:
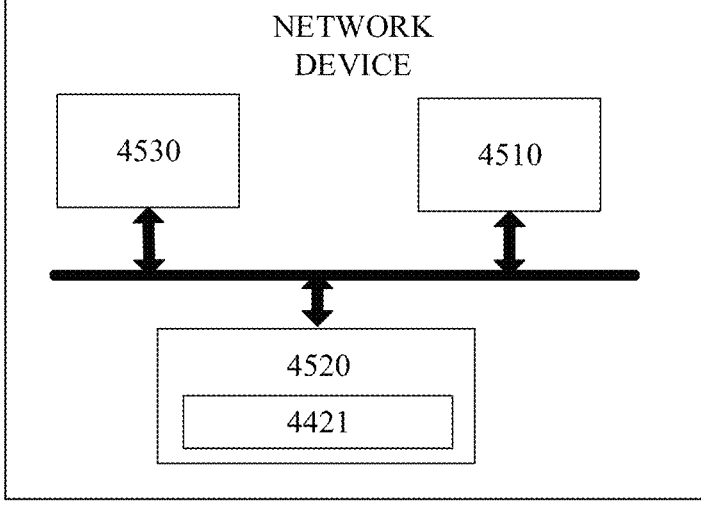
FIG. 45 is a schematic structural diagram of a network device according to an implementation of the present disclosure.

Referring to FIG. 45, FIG. 45 is a schematic structural diagram of a network device according to an implementation of the present disclosure. As illustrated in FIG. 45, the network device may include a processor 4510 and a memory 4520. Optionally, the terminal may also include a transceiver 4530. The memory 4520 is configured to store a computer program or instructions 4521. The transceiver 4530 is configured to receive and transmit data. The processor 4510 is configured to invoke the computer program or instructions to perform the following operations. An SSB is transmitted via the transceiver 4530, where a frequency position of the SSB is associated with a first synchronization raster, and the first synchronization raster is associated with one or more of following information: a subcarrier spacing of the SSB, a size of a target bandwidth, a size of a reserved bandwidth at a boundary of the target bandwidth, and information of a first channel in the target bandwidth, where a frequency range of the first channel does not overlap with the SSB.

In a possible design, the associated information of the position of the first synchronization raster in the target bandwidth includes the size of the target bandwidth.

In a possible design, the processor 4510 is further configured to determine a position of the first synchronization raster in the target bandwidth.

In a possible design, the position of the first synchronization raster in the target bandwidth is associated with one or more of following information: a subcarrier spacing of the SSB, a size of the target bandwidth, a size of a reserved bandwidth at a boundary of the target bandwidth, and information of a first channel in the target bandwidth, where a frequency range of the first channel does not overlap with the SSB.

In a possible design, when the size of the target bandwidth is a first value, the position of the first synchronization raster is a first position, and when the size of the target bandwidth is a second value, the position of the first synchronization raster is a second position different from the first position.

In a possible design, the first value is greater than the second value; and the first position is lower than the second position, or the first position is higher than the second position.

In a possible design, the associated information of the position of the first synchronization raster in the target bandwidth includes the subcarrier spacing of the SSB.

In a possible design, when the subcarrier spacing of the SSB is a first subcarrier spacing, the position of the first synchronization raster is a third position; and when the subcarrier spacing of the SSB is a second subcarrier spacing, the position of the first synchronization raster is a fourth position different from the third position.

In a possible design, the first subcarrier spacing is greater than the second subcarrier spacing; and the third position is lower than the fourth position, or the third position is higher than the fourth position.

In a possible design, the associated information of the position of the first synchronization raster in the target bandwidth includes the size of the reserved bandwidth.

In a possible design, when the size of the reserved bandwidth is a third value, the position of the first synchronization raster is a fifth position; and when the size of the reserved bandwidth is a fourth value, the position of the first synchronization raster is a sixth position different from the fifth position.

In a possible design, the third value is greater than the fourth value and the fourth value is greater than or equal to 0 hertz (Hz); and the fifth position is lower than the sixth position, or the fifth position is higher than the sixth position.

In a possible design, the transceiver 4530 is further configured to transmit first indication information to the terminal, the first indication information indicating the size of the reserved bandwidth.

In a possible design, the associated information of the position of the first synchronization raster in the target bandwidth includes the information of the first channel, the information of the first channel comprising one or more of following information: a subcarrier spacing of the first channel; a bandwidth size of the first channel; a type of the first channel; the number of the first channels; and a frequency position of the first channel.

In a possible design, the first channel is a channel occupied by a control resource set (CORESET).

In a possible design, the information of the first channel includes a multiplexing pattern of the CORESET and the SSB, the multiplexing pattern representing a time-frequency position relationship between the CORESET and the SSB.

In a possible design, the information of the first channel includes a subcarrier spacing of the CORESET and/or a bandwidth size of the CORESET.

In a possible design, the first channel is a channel with a frequency position higher than the SSB in the target bandwidth.

In a possible design, the processor 4510 is configured to determine positions of one or more second synchronization rasters in the target bandwidth according to the position of the first synchronization raster in the target bandwidth; and determine the frequency position of the SSB according to the position of the first synchronization raster in the target bandwidth and the positions of one or more second synchronization rasters in the target bandwidth.

In a possible design, the processor 4510 is configured to determine the positions of one or more second synchronization rasters in the target bandwidth according to the position of the first synchronization raster in the target bandwidth and a frequency offset between synchronization rasters.

Figure 46:
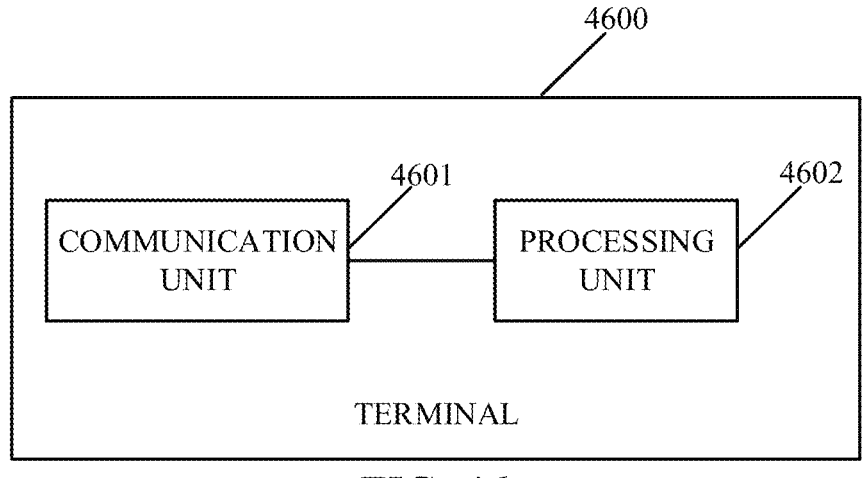
FIG. 46 is a schematic structural diagram of a terminal according to an implementation of the present disclosure.

Referring to FIG. 46, FIG. 46 is another possible schematic structural diagram of the terminal involved in the above implementations of the present disclosure. Referring to FIG. 46, the terminal 4600 may include a communication unit 4601 and a processing unit 4602. The units may perform corresponding function of the terminal in the above method implementations. The processing unit 4602 is configured to control and manage actions of the terminal, for example, to support the terminal in executing operations at 201 to 202 in FIG. 2, and/or other processes for the techniques described herein. The communication unit 4601 may be configured to support communication between the terminal and other devices, such as communication with network devices. Optionally, the terminal may also include a storing unit 4603 for storing program code and data of network devices.

The processing unit 4602 may be a processor or controller, such as a central processing unit (CPU), a general-purpose processor, a digital signal processor (DSP), an application specific integrated circuit (ASIC), a field programmable gate array (FPGA) or other programmable logic devices, transistor logic devices, hardware components, or any combination thereof. The processor can implement or execute various exemplary logical blocks, modules, and circuits described in conjunction with the content of the present disclosure. The processor may also be a combination of computing functions, such as a combination of one or more microprocessors, a combination of DSP and microprocessor, and so on. The communication unit 4601 may be a transceiver, transceiver circuit, RF chip, etc. The storing unit 4603 may be a memory.

The processing unit 4602 is configured to determine a position of a first synchronization raster in a target bandwidth, the first synchronization raster being used for determining a frequency position of an SSB in the target bandwidth, the position of the first synchronization raster in the target bandwidth being associated with one or more of following information: a subcarrier spacing of the SSB, a size of the target bandwidth, a size of a reserved bandwidth at a boundary of the target bandwidth, and information of a first channel in the target bandwidth, where a frequency range of the first channel does not overlap with the SSB.

The processing unit 4602 is configured to determine the frequency position of the SSB according to the position of the first synchronization raster in the target bandwidth.

In a possible design, the associated information of the position of the first synchronization raster in the target bandwidth includes the size of the target bandwidth.

In a possible design, when the size of the target bandwidth is a first value, the position of the first synchronization raster is a first position, and when the size of the target bandwidth is a second value, the position of the first synchronization raster is a second position different from the first position.

In a possible design, the first value is greater than the second value; and the first position is lower than the second position, or the first position is higher than the second position.

In a possible design, the associated information of the position of the first synchronization raster in the target bandwidth includes the subcarrier spacing of the SSB.

In a possible design, when the subcarrier spacing of the SSB is a first subcarrier spacing, the position of the first synchronization raster is a third position; and when the subcarrier spacing of the SSB is a second subcarrier spacing, the position of the first synchronization raster is a fourth position different from the third position.

In a possible design, the first subcarrier spacing is greater than the second subcarrier spacing; and the third position is lower than the fourth position, or the third position is higher than the fourth position.

In a possible design, the associated information of the position of the first synchronization raster in the target bandwidth includes the size of the reserved bandwidth.

In a possible design, when the size of the reserved bandwidth is a third value, the position of the first synchronization raster is a fifth position; and when the size of the reserved bandwidth is a fourth value, the position of the first synchronization raster is a sixth position different from the fifth position.

In a possible design, the third value is greater than the fourth value and the fourth value is greater than or equal to 0 hertz (Hz); and the fifth position is lower than the sixth position, or the fifth position is higher than the sixth position.

In a possible design, the communication unit 4601 is configured to receive first indication information from a network device, the first indication information indicating the size of the reserved bandwidth.

In a possible design, the associated information of the position of the first synchronization raster in the target bandwidth includes the information of the first channel, the information of the first channel comprising one or more of following information: a subcarrier spacing of the first channel; a bandwidth size of the first channel; a type of the first channel; the number of the first channels; and a frequency position of the first channel.

In a possible design, the first channel is a channel occupied by a control resource set (CORESET).

In a possible design, the information of the first channel includes a multiplexing pattern of the CORESET and the SSB, the multiplexing pattern representing a time-frequency position relationship between the CORESET and the SSB.

In a possible design, the information of the first channel includes a subcarrier spacing of the CORESET and/or a bandwidth size of the CORESET.

In a possible design, the first channel is a channel with a frequency position higher than the SSB in the target bandwidth.

In a possible design, the processing unit 4602 is configured to detect the SSB according to the frequency position of the SSB; and determine, according to a detection result of the SSB, one or more of the following information: the subcarrier spacing of the SSB, the size of the target bandwidth, and the information of the first channel.

In a possible design, the processing unit 4602 is configured to determine positions of one or more second synchronization rasters in the target bandwidth according to the position of the first synchronization raster in the target bandwidth; and determine the frequency position of the SSB according to the position of the first synchronization raster in the target bandwidth and the positions of one or more second synchronization rasters in the target bandwidth.

In a possible design, the processing unit 4602 is configured to determine the positions of one or more second synchronization rasters in the target bandwidth according to the position of the first synchronization raster in the target bandwidth and a frequency offset between synchronization rasters.

Figure 47:
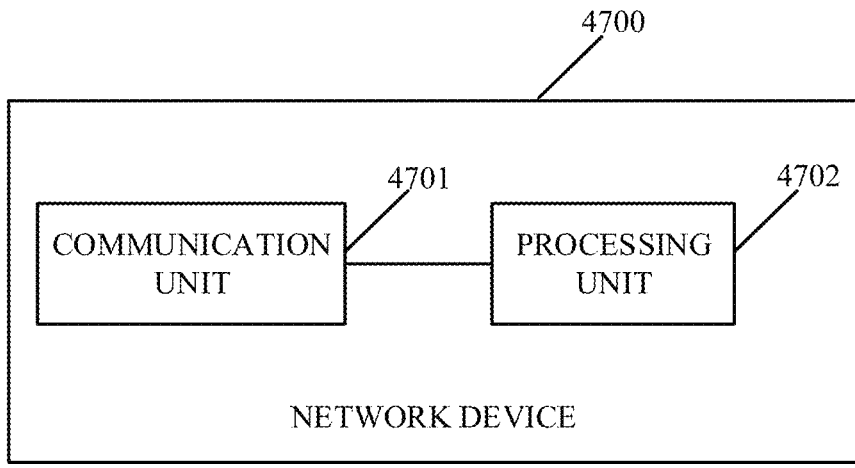
FIG. 47 is a schematic structural diagram of a network device according to an implementation of the present disclosure.

Referring to FIG. 47, FIG. 47 is another possible schematic structural diagram of the network device involved in the above implementations of the present disclosure. Referring to FIG. 47, the network device 4700 may include a communication unit 4701 and a processing unit 4702. The units may perform corresponding function of the network device in the above method implementations. The processing unit 4702 is configured to control and manage actions of the network device, for example, to support the network device in executing operations at 201 to 202 in FIG. 2, and/or other processes for the techniques described herein. The communication unit 4701 may be configured to support communication between the network device and other devices, such as communication with network devices. Optionally, the network device may also include a storing unit 4703 for storing program code and data of network devices.

The processing unit 4702 may be a processor or controller, such as a central processing unit (CPU), a general-purpose processor, a digital signal processor (DSP), an application specific integrated circuit (ASIC), a field programmable gate array (FPGA) or other programmable logic devices, transistor logic devices, hardware components, or any combination thereof. The processor can implement or execute various exemplary logical blocks, modules, and circuits described in conjunction with the content of the present disclosure. The processor may also be a combination of computing functions, such as a combination of one or more microprocessors, a combination of DSP and microprocessor, and so on. The communication unit 4701 may be a transceiver, transceiver circuit, RF chip, etc. The storing unit 4703 may be a memory.

The communication unit is configured to transmit an SSB, where a frequency position of the SSB is associated with a first synchronization raster, and the first synchronization raster is associated with one or more of following information: a subcarrier spacing of the SSB, a size of a target bandwidth, a size of a reserved bandwidth at a boundary of the target bandwidth, and information of a first channel in the target bandwidth, where a frequency range of the first channel does not overlap with the SSB.

In a possible design, the processing unit 4702 is configured to determine a position of the first synchronization raster in the target bandwidth.

In a possible design, the position of the first synchronization raster in the target bandwidth is associated with one or more of following information: a subcarrier spacing of the SSB, a size of the target bandwidth, a size of a reserved bandwidth at a boundary of the target bandwidth, and information of a first channel in the target bandwidth, where a frequency range of the first channel does not overlap with the SSB.

In a possible design, the associated information of the position of the first synchronization raster in the target bandwidth includes the size of the target bandwidth.

In a possible design, when the size of the target bandwidth is a first value, the position of the first synchronization raster is a first position, and when the size of the target bandwidth is a second value, the position of the first synchronization raster is a second position different from the first position.

In a possible design, the first value is greater than the second value; and the first position is lower than the second position, or the first position is higher than the second position.

In a possible design, the associated information of the position of the first synchronization raster in the target bandwidth includes the subcarrier spacing of the SSB.

In a possible design, when the subcarrier spacing of the SSB is a first subcarrier spacing, the position of the first synchronization raster is a third position; and when the subcarrier spacing of the SSB is a second subcarrier spacing, the position of the first synchronization raster is a fourth position different from the third position.

In a possible design, the first subcarrier spacing is greater than the second subcarrier spacing; and the third position is lower than the fourth position, or the third position is higher than the fourth position.

In a possible design, the associated information of the position of the first synchronization raster in the target bandwidth includes the size of the reserved bandwidth.

In a possible design, when the size of the reserved bandwidth is a third value, the position of the first synchronization raster is a fifth position; and when the size of the reserved bandwidth is a fourth value, the position of the first synchronization raster is a sixth position different from the fifth position.

In a possible design, the third value is greater than the fourth value and the fourth value is greater than or equal to 0 hertz (Hz); and the fifth position is lower than the sixth position, or the fifth position is higher than the sixth position.

In a possible design, the communication unit 4701 is further configured to transmit first indication information to the terminal, the first indication information indicating the size of the reserved bandwidth.

In a possible design, the associated information of the position of the first synchronization raster in the target bandwidth includes the information of the first channel, the information of the first channel comprising one or more of following information: a subcarrier spacing of the first channel; a bandwidth size of the first channel; a type of the first channel; the number of the first channels; and a frequency position of the first channel.

In a possible design, the first channel is a channel occupied by a control resource set (CORESET).

In a possible design, the information of the first channel includes a multiplexing pattern of the CORESET and the SSB, the multiplexing pattern representing a time-frequency position relationship between the CORESET and the SSB.

In a possible design, the information of the first channel includes a subcarrier spacing of the CORESET and/or a bandwidth size of the CORESET.

In a possible design, the first channel is a channel with a frequency position higher than the SSB in the target bandwidth.

In a possible design, the processing unit 4702 is configured to determine positions of one or more second synchronization rasters in the target bandwidth according to the position of the first synchronization raster in the target bandwidth; and determine the frequency position of the SSB according to the position of the first synchronization raster in the target bandwidth and the positions of one or more second synchronization rasters in the target bandwidth.

In a possible design, the processing unit 4702 is configured to determine the positions of one or more second synchronization rasters in the target bandwidth according to the position of the first synchronization raster in the target bandwidth and a frequency offset between synchronization rasters.

It can be understood that the division of the units in the implementations of the present disclosure is schematic, which is merely logical function division and may be other division in actual implementation. Various functional units in the implementations of the present disclosure may be integrated into one processing unit, or each of the units may exist alone physically, or two or more units may be integrated into one unit. The integrated unit may be implemented in a form of hardware, and may also be implemented in a form of a software functional unit.

Implementations of the present disclosure further provide a computer readable storage medium. The computer readable storage medium stores a computer program, so that when the computer program runs on a computer, partial or all of the steps described in the terminal or network device in the foregoing method implementations are performed.

Implementations of the present disclosure further provide a computer program product. The computer program product includes a computer program or an instruction, so that when the computer program product is run on a computer, partial or all of the steps described in a terminal or a network device in the foregoing method implementations are performed. The computer program product may be a software installation package.

It should be understood that the first, second, third and various numerical numbers involved herein are only used for distinguishing conveniently, and are not intended to limit the scope of the implementations of the present disclosure.

Those skilled in the art should appreciate that in one or more of the above examples, the functions described in the implementations of the present disclosure may be implemented wholly or in part by software, hardware, firmware, or any combination thereof. When implemented using software, it may be implemented in whole or in part in the form of a computer program product comprising one or more computer instructions. When the computer program instructions are loaded and executed on the computer, the processes or functions described in the implementations of the present disclosure are totally or partially generated. The computer may be a general purpose computer, a special purpose computer, a computer network, or other programmable apparatus. The computer instructions may be stored on or transmitted from one computer-readable storage medium to another, For example, the computer instructions may pass from a website, computer, server, or data center to a cable (e.g., coaxial cable, fiber, or digital subscriber line, (DSL)) or wireless (e.g., infrared, wireless, microwave, etc.) transmission to another website, computer, server, or data center. The computer readable storage medium may be any available medium that can be accessed by a computer, or a data storage device such as a server or a data center that includes one or more available media sets. The available media can be magnetic media (e.g., floppy discs, hard discs, magnetic tape), optical media (e.g., digital video disc (DVD)), or semiconductor media (e.g., solid state disk (SSD)), among others.

What is claimed is:

1. A method for determining a frequency position of a synchronization signal and physical broadcast channel (PBCH) block (SSB), applied to a terminal and comprising:

determining a position of a first synchronization raster in a target bandwidth, the first synchronization raster being used for determining a frequency position of an SSB in the target bandwidth, wherein the target bandwidth is a channel bandwidth, and the first synchronization raster is an only synchronization raster in the target bandwidth, wherein the position of the first synchronization raster in the target bandwidth is associated with following information:

a subcarrier spacing of the SSB and a size of the target bandwidth; and determining the frequency position of the SSB according to the position of the first synchronization raster in the target bandwidth.

2. The method of claim 1, wherein:

when the size of the target bandwidth is a first value, the position of the first synchronization raster is a first position; and when the size of the target bandwidth is a second value, the position of the first synchronization raster is a second position different from the first position.

3. The method of claim 2, wherein:

the first value is greater than the second value; and the first position is lower than the second position, or the first position is higher than the second position.

4. The method of claim 1, wherein:

when the subcarrier spacing of the SSB is a first subcarrier spacing, the position of the first synchronization raster is a third position;

when the subcarrier spacing of the SSB is a second subcarrier spacing, the position of the first synchronization raster is a fourth position different from the third position;

the first subcarrier spacing is greater than the second subcarrier spacing; and the third position is lower than the fourth position, or the third position is higher than the fourth position.

5. The method of claim 1, wherein associated information of the position of the first synchronization raster in the target bandwidth further comprises a size of the reserved bandwidth at a boundary of the target bandwidth;

wherein:

when the size of the reserved bandwidth is a third value, the position of the first synchronization raster is a fifth position;

when the size of the reserved bandwidth is a fourth value, the position of the first synchronization raster is a sixth position different from the fifth position;

the third value is greater than the fourth value and the fourth value is greater than or equal to 0 hertz (Hz); and the fifth position is lower than the sixth position, or the fifth position is higher than the sixth position;

wherein the method further comprises:

receiving first indication information from a network device, the first indication information indicating the size of the reserved bandwidth.

6. The method of claim 1, wherein associated information of the position of the first synchronization raster in the target bandwidth further comprises the information of a first channel in the target bandwidth, wherein a frequency range of the first channel does not overlap with the SSB, wherein the information of the first channel comprising one or more of following information:

a subcarrier spacing of the first channel;

a bandwidth size of the first channel;

a type of the first channel;

a number of the first channels; and a frequency position of the first channel;

wherein the first channel is a channel occupied by a control resource set (CORESET).

7. The method of claim 6, wherein the information of the first channel comprises a multiplexing pattern of the CORE-SET and the SSB, the multiplexing pattern representing a time-frequency position relationship between the CORE-SET and the SSB.

8. The method of claim 6, wherein the information of the first channel comprises a subcarrier spacing of the CORE-SET and/or a bandwidth size of the CORESET.

9. The method of claim 6, wherein the first channel is a channel with a frequency position higher than the SSB in the target bandwidth.

10. The method of claim 1, wherein the SSB has a plurality of frequency positions, and determining the frequency position of the SSB according to the position of the first synchronization raster in the target bandwidth comprises:

determining positions of one or more second synchronization rasters in the target bandwidth according to the position of the first synchronization raster in the target bandwidth; and determining the frequency positions of the SSB according to the position of the first synchronization raster in the target bandwidth and the positions of the one or more second synchronization rasters in the target bandwidth.

11. The method of claim 10, wherein determining the positions of the one or more second synchronization rasters in the target bandwidth according to the position of the first synchronization raster in the target bandwidth comprises:

determining the positions of the one or more second synchronization rasters in the target bandwidth according to the position of the first synchronization raster in the target bandwidth and a frequency offset between synchronization rasters.

12. A method for determining a frequency position of a synchronization signal and physical broadcast channel (PBCH) block (SSB), applied to a network device and comprising:

transmitting an SSB, a frequency position of the SSB being associated with a first synchronization raster, the first synchronization raster is an only synchronization raster in a target bandwidth, and the target bandwidth is a channel bandwidth, wherein the first synchronization raster is associated with following information:

a subcarrier spacing of the SSB and a size of a target bandwidth.

13. The method of claim 12, wherein:

when the size of the target bandwidth is a first value, a position of the first synchronization raster is a first position; and when the size of the target bandwidth is a second value, the position of the first synchronization raster is a second position different from the first position.

14. The method of claim 12, wherein:

when the subcarrier spacing of the SSB is a first subcarrier spacing, a position of the first synchronization raster is a third position;

when the subcarrier spacing of the SSB is a second subcarrier spacing, the position of the first synchronization raster is a fourth position different from the third position;

the first subcarrier spacing is greater than the second subcarrier spacing; and the third position is lower than the fourth position, or the third position is higher than the fourth position.

15. A terminal, comprising:

a processor and a memory, the processor being configured to execute a computer program or instructions stored in the memory to cause the terminal to:

determine a position of a first synchronization raster in a target bandwidth, the first synchronization raster being used for determining a frequency position of a synchronization signal and physical broadcast channel (PBCH) block (SSB) in the target bandwidth, wherein the target bandwidth is a channel bandwidth, and the first synchronization raster is an only synchronization raster in the target bandwidth, wherein the position of the first synchronization raster in the target bandwidth is associated with the following information:

a subcarrier spacing of the SSB and a size of the target bandwidth; and determine the frequency position of the SSB according to the position of the first synchronization raster in the target bandwidth.

16. The terminal of claim 15, wherein:

when the size of the target bandwidth is a first value, the position of the first synchronization raster is a first position; and when the size of the target bandwidth is a second value, the position of the first synchronization raster is a second position different from the first position.

17. The terminal of claim 15, wherein:

when the subcarrier spacing of the SSB is a first subcarrier spacing, the position of the first synchronization raster is a third position;

when the subcarrier spacing of the SSB is a second subcarrier spacing, the position of the first synchronization raster is a fourth position different from the third position;

the first subcarrier spacing is greater than the second subcarrier spacing; and the third position is lower than the fourth position, or the third position is higher than the fourth position.

18. A network device, comprising:

a processor and a memory, the processor being configured to execute a computer program or instructions stored in the memory to cause the network device to implement a method for determining a frequency position of a synchronization signal and physical broadcast channel (PBCH) block (SSB), applied to a network device and comprising:

transmitting an SSB, a frequency position of the SSB being associated with a first synchronization raster, the first synchronization raster is an only synchronization raster in a target bandwidth, and the target bandwidth is a channel bandwidth, wherein the first synchronization raster is associated with the following information:

a subcarrier spacing of the SSB and a size of a target bandwidth.

19. The network device of claim 18, wherein:

when the size of the target bandwidth is a first value, a position of the first synchronization raster is a first position; and when the size of the target bandwidth is a second value, the position of the first synchronization raster is a second position different from the first position.

20. The network device of claim 18, wherein:

when the subcarrier spacing of the SSB is a first subcarrier spacing, a position of the first synchronization raster is a third position;

when the subcarrier spacing of the SSB is a second subcarrier spacing, the position of the first synchronization raster is a fourth position different from the third position;

the first subcarrier spacing is greater than the second subcarrier spacing; and the third position is lower than the fourth position, or the third position is higher than the fourth position.

\* \* \* \* \*